(12) United States Patent
Masuda et al.

(10) Patent No.: US 12,375,836 B2
(45) Date of Patent: Jul. 29, 2025

(54) PHOTOELECTRIC CONVERSION APPARATUS, PHOTOELECTRIC CONVERSION SYSTEM, AND PHOTOELECTRIC CONVERSION METHOD

(71) Applicant: CANON KABUSHIKI KAISHA, Tokyo (JP)

(72) Inventors: Keita Masuda, Tokyo (JP); Atsushi Shimada, Kanagawa (JP); Yasuhiro Kato, Tokyo (JP); Keisuke Takahashi, Tokyo (JP); Takeshi Shimada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 18/453,345

(22) Filed: Aug. 22, 2023

(65) Prior Publication Data
US 2024/0080592 A1 Mar. 7, 2024

(30) Foreign Application Priority Data

Sep. 2, 2022 (JP) .................. 2022-140207

(51) Int. Cl.
H04N 25/78 (2023.01)
H04N 25/616 (2023.01)
(Continued)

(52) U.S. Cl.
CPC .......... *H04N 25/78* (2023.01); *H04N 25/616* (2023.01); *H04N 25/63* (2023.01); *H04N 25/65* (2023.01);
(Continued)

(58) Field of Classification Search
CPC ...... H04N 25/78; H04N 25/616; H04N 25/63; H04N 25/65; H04N 25/767; H04N 25/677
See application file for complete search history.

(56) References Cited

U.S. PATENT DOCUMENTS 9,294,699 B2    3/2016  Muto et al.
10,567,747 B2   2/2020  Hayashi et al.
(Continued)

FOREIGN PATENT DOCUMENTS

JP    2011-044813 A    3/2011
JP    2014-140152 A    7/2014
(Continued)

OTHER PUBLICATIONS

U.S. Appl. No. 18/453,342, filed Aug. 22, 2023 (First Named Inventor: Takeshi Shimada).
(Continued)

*Primary Examiner* — Nicholas G Giles
(74) *Attorney, Agent, or Firm* — Venable LLP

(57) ABSTRACT

A photoelectric conversion apparatus includes a pixel array having a plurality of column signal lines which are divided into a plurality of groups, a readout circuit configured to read out signals from the pixel array via the plurality of column signal lines. A holding unit includes one first region and a plurality of second regions. A plurality of first correction values respectively corresponding to the plurality of columns are stored in the first region. Each second region is associated with a readout condition for reading signals from each pixel unit of the pixel array by the readout circuit, and a plurality of second correction values respectively corresponding to the plurality of groups are stored in each second region.

14 Claims, 38 Drawing Sheets

(51) Int. Cl.
*H04N 25/63* (2023.01)
*H04N 25/65* (2023.01)
*H04N 25/677* (2023.01)
*H04N 25/767* (2023.01)
*H04N 25/778* (2023.01)

(52) U.S. Cl.
CPC ......... *H04N 25/677* (2023.01); *H04N 25/767* (2023.01); *H04N 25/778* (2023.01)

(56) References Cited

U.S. PATENT DOCUMENTS

| | | | |
|---|---|---|---|
| 11,070,755 | B2 | 7/2021 | Takahashi |
| 11,425,325 | B2 | 8/2022 | Kasugai et al. |
| 11,700,465 | B2 * | 7/2023 | Nagaki ................ H04N 25/77 348/216.1 |
| 11,716,551 | B2 * | 8/2023 | Iwahara ............... H04N 25/677 348/222.1 |
| 2014/0104465 | A1 | 4/2014 | Yamashita |
| 2017/0208268 | A1 | 7/2017 | Shin |
| 2017/0257592 | A1 | 9/2017 | Higuchi |
| 2020/0314360 | A1 | 10/2020 | Sakai et al. |
| 2020/0336681 | A1 | 10/2020 | Kobuse et al. |
| 2020/0344431 | A1 | 10/2020 | Kobuse et al. |
| 2022/0232178 | A1 * | 7/2022 | Iwahara ................. H04N 25/78 |
| 2022/0408036 | A1 | 12/2022 | Ashida et al. |
| 2023/0007194 | A1 * | 1/2023 | Nagaki ................ H04N 17/002 |
| 2023/0199347 | A1 | 6/2023 | Kato |
| 2023/0209217 | A1 | 6/2023 | Shimada et al. |

FOREIGN PATENT DOCUMENTS

| | | |
|---|---|---|
| JP | 2017-158062 A | 9/2017 |
| JP | 2019-022096 A | 2/2019 |
| JP | 2020-061669 A | 4/2020 |
| JP | 2020-167544 A | 10/2020 |
| JP | 2020-182057 A | 11/2020 |
| JP | 2020-191543 A | 11/2020 |
| JP | 2021-106375 A | 7/2021 |
| WO | 2013/008598 A1 | 1/2013 |
| WO | 2016/098404 A1 | 6/2016 |

OTHER PUBLICATIONS

U.S. Appl. No. 18/453,343, filed Aug. 22, 2023 (First Named Inventor: Keisuke Takahashi).

* cited by examiner

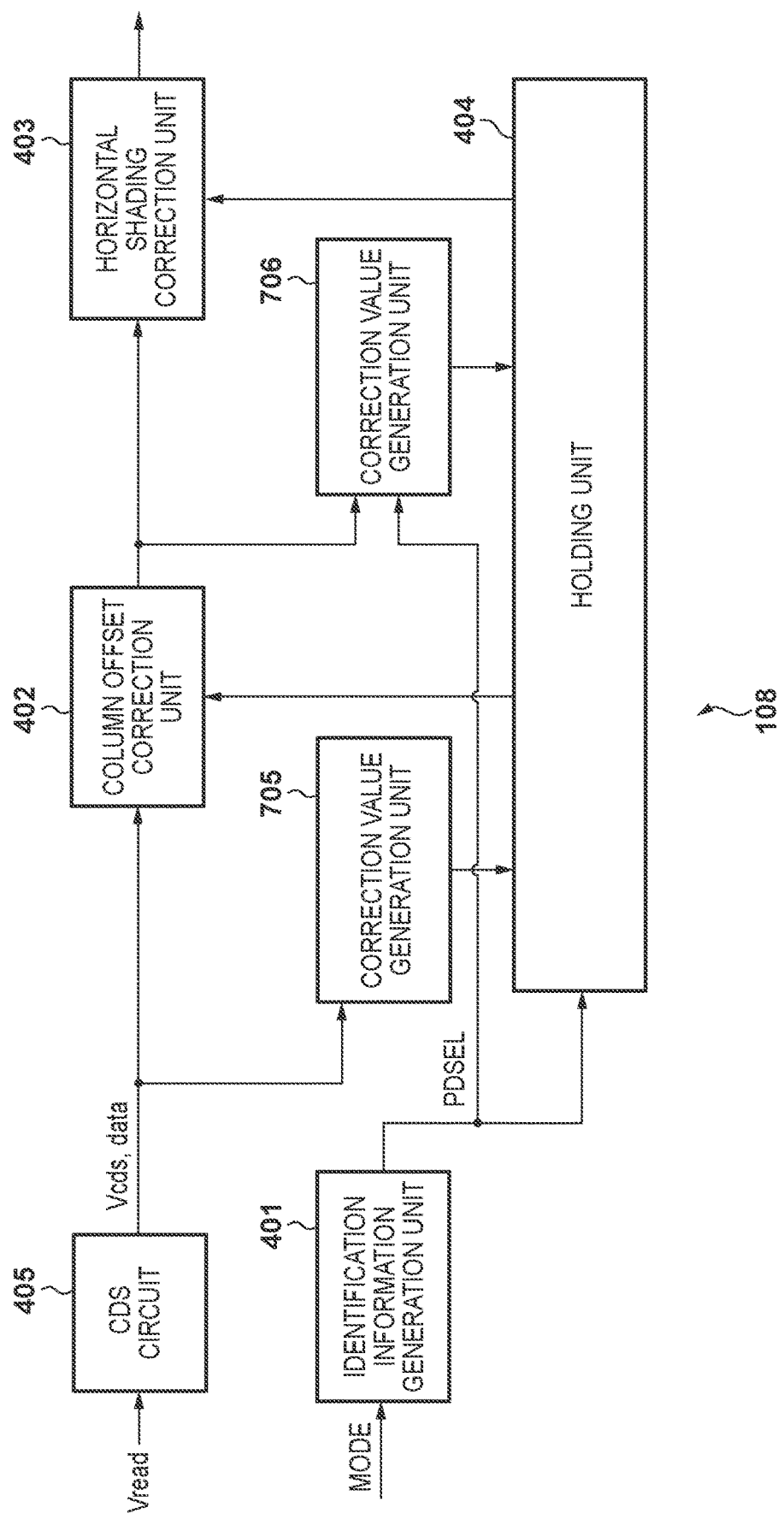

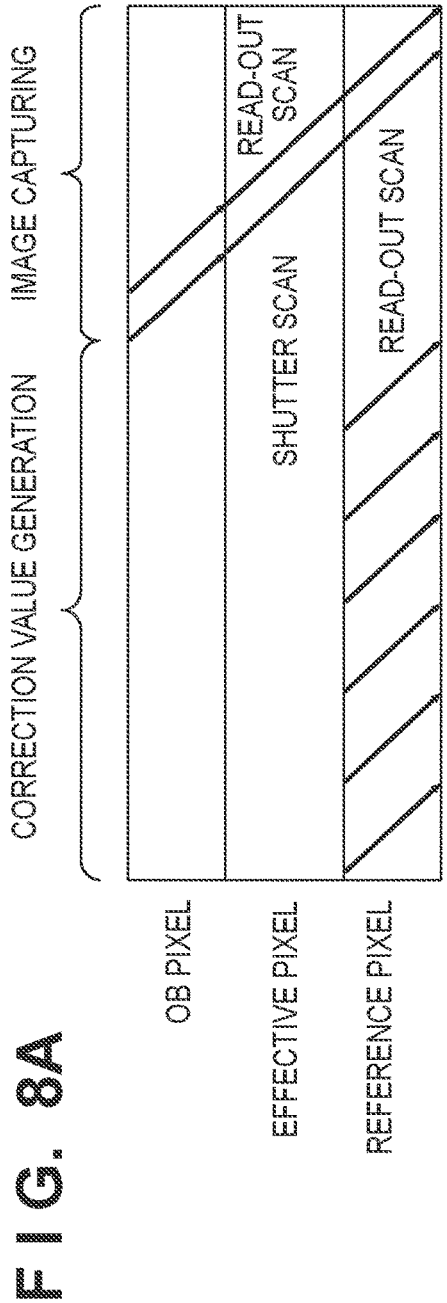
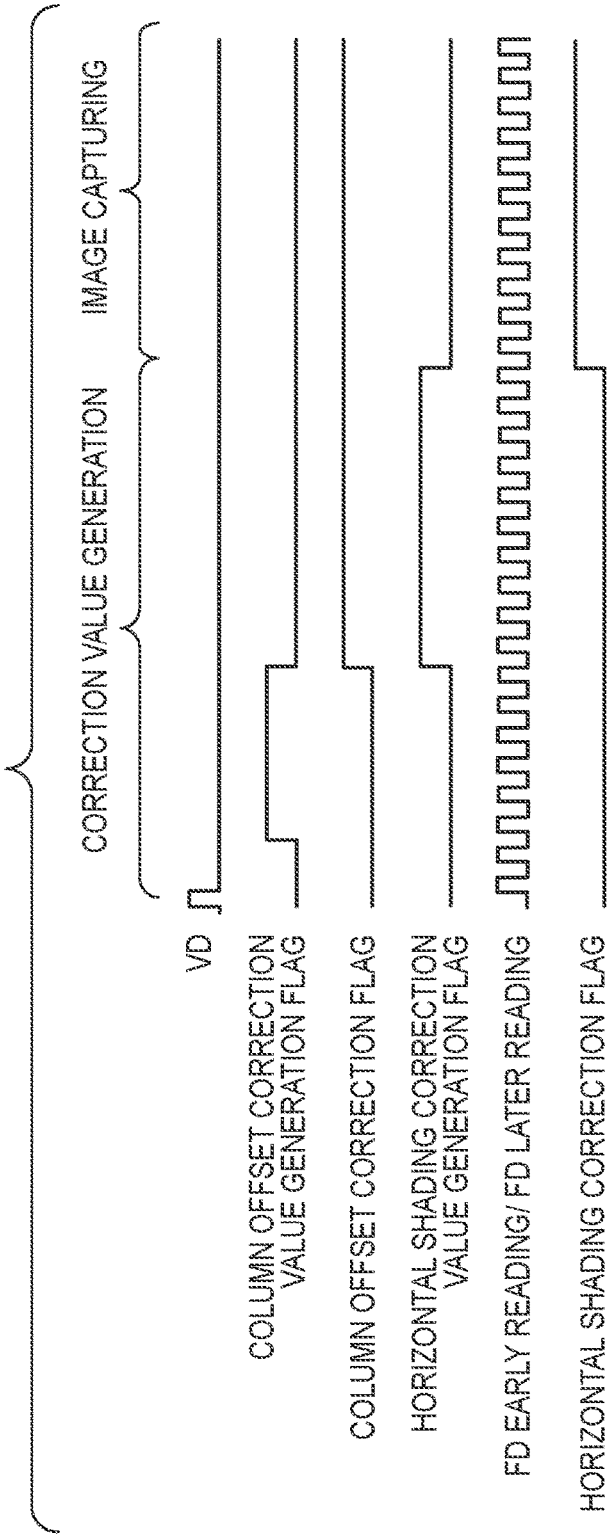
FIG. 8A
FIG. 8B

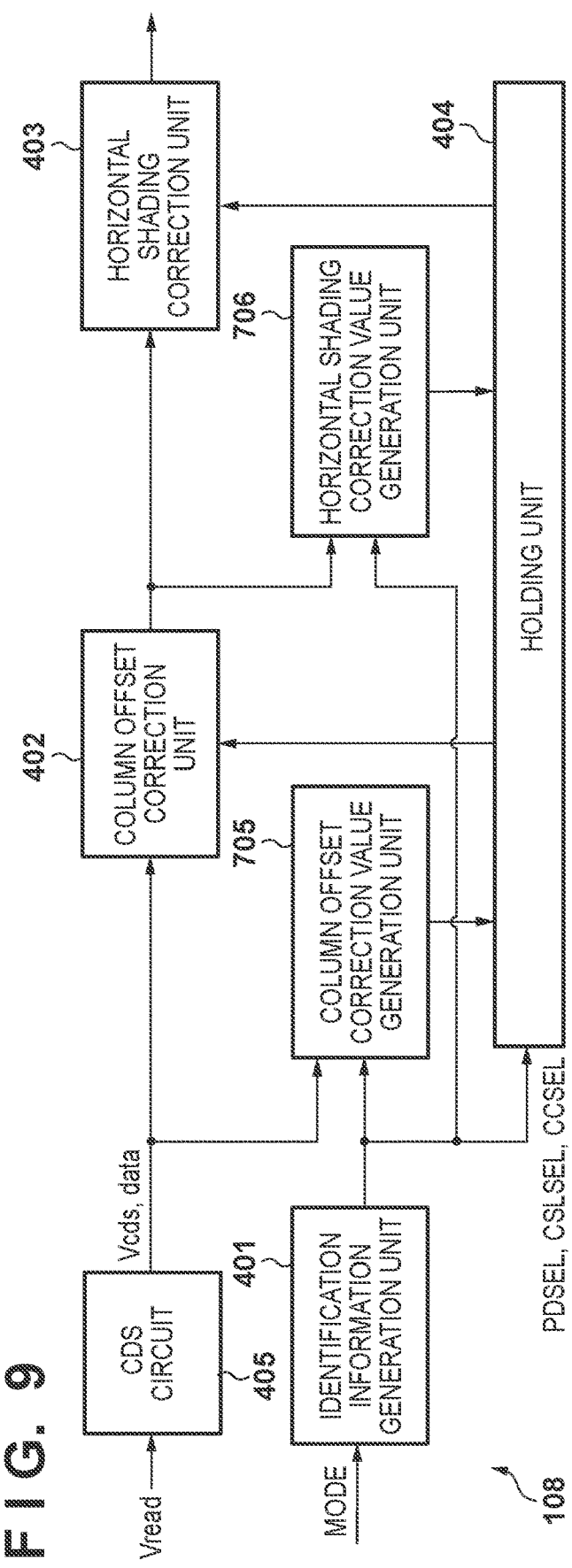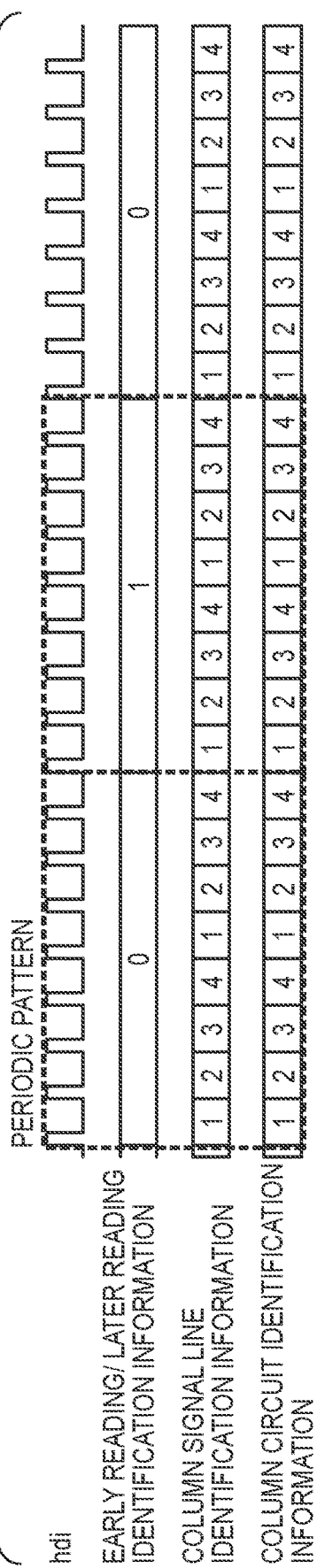

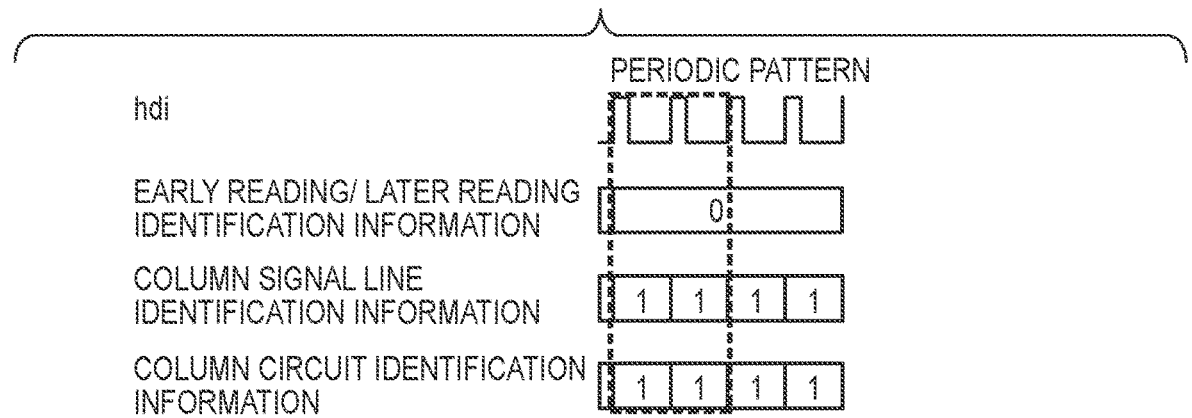
F I G. 11
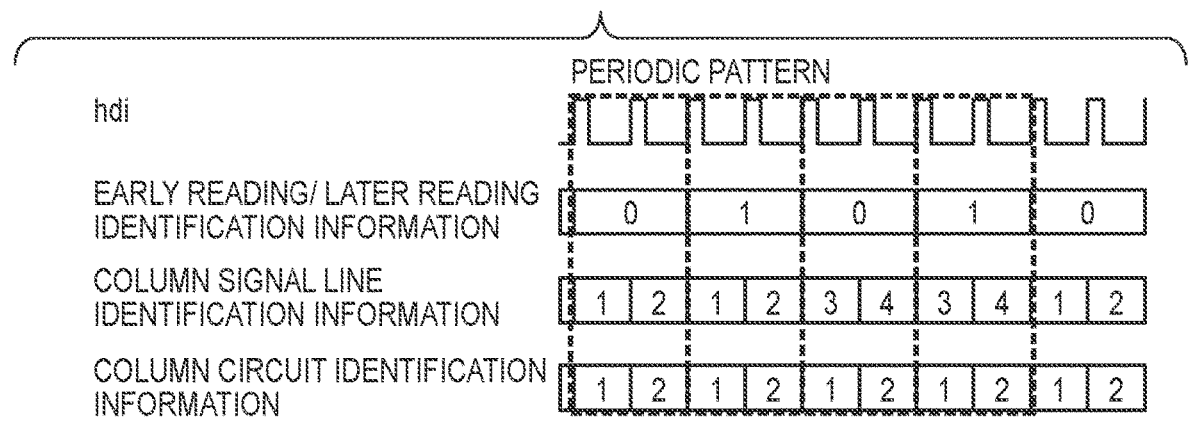
F I G. 12
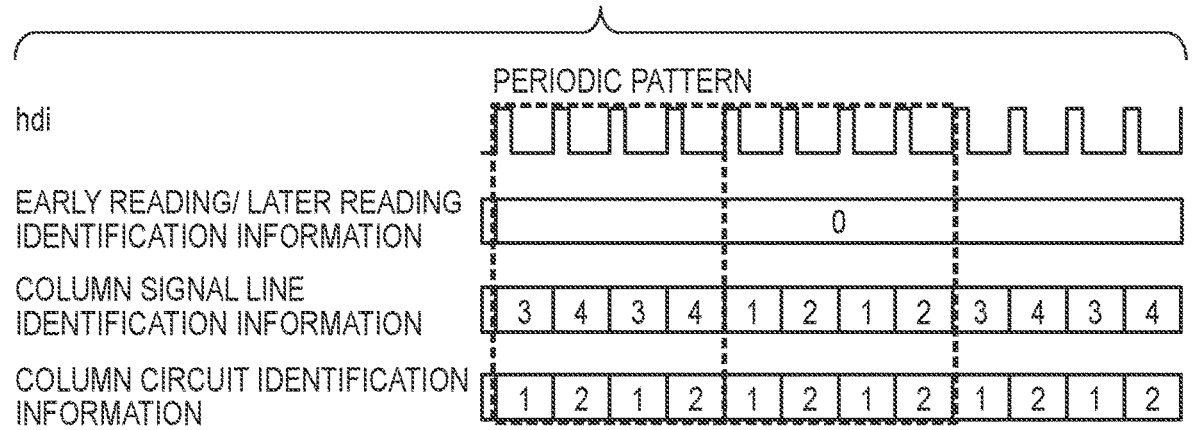
F I G. 13

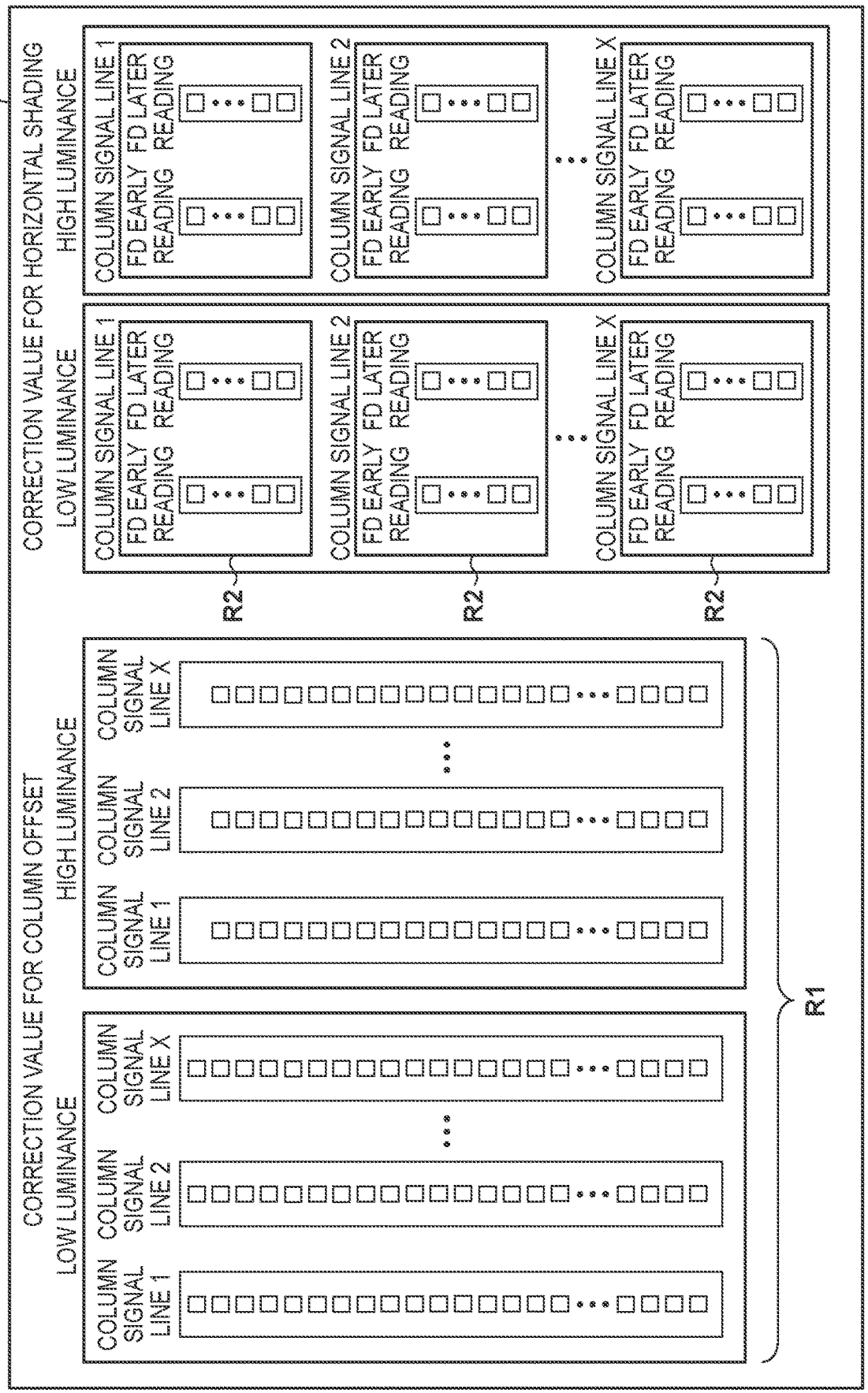

F I G. 44B
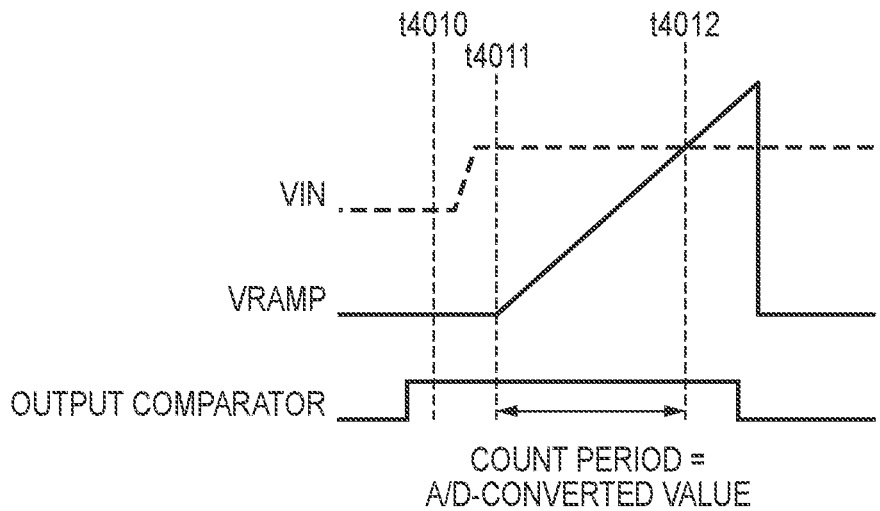
F I G. 45
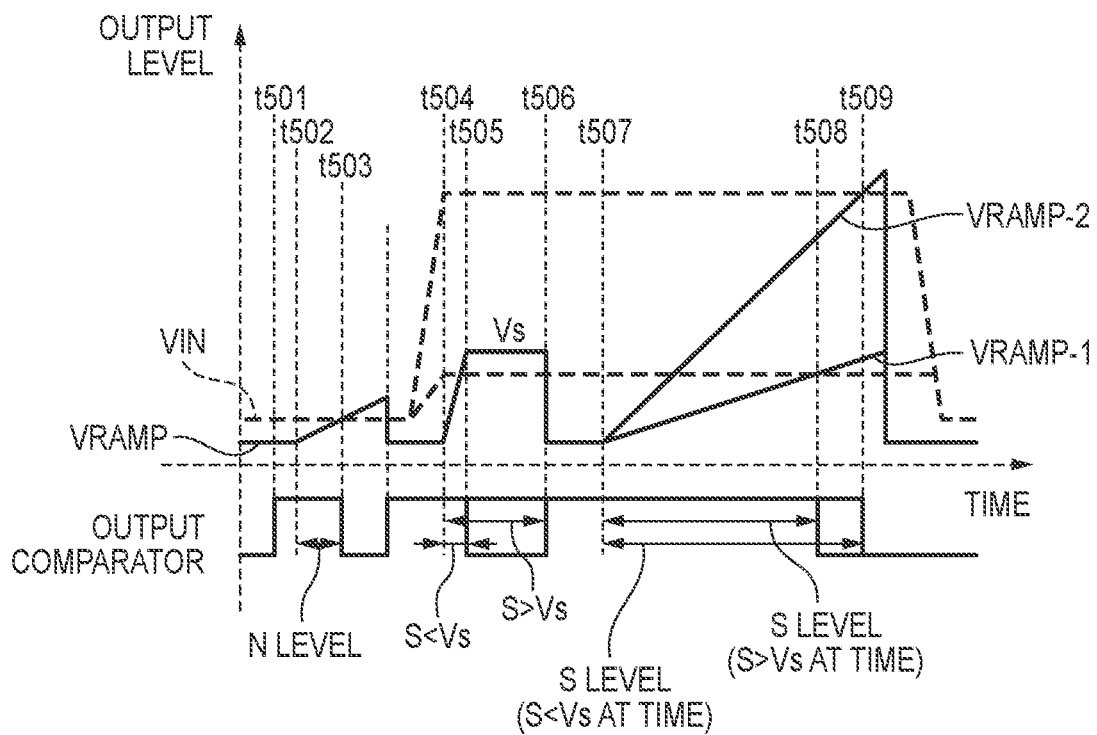

PHOTOELECTRIC CONVERSION APPARATUS, PHOTOELECTRIC CONVERSION SYSTEM, AND PHOTOELECTRIC CONVERSION METHOD

BACKGROUND OF THE INVENTION

Field of the Invention

The present invention relates to a photoelectric conversion apparatus, a photoelectric conversion system, and a photoelectric conversion method.

Description of the Related Art

In order to suppress an increase in size of a memory that holds correction coefficients for correcting shading, there is known a solid-state image capturing apparatus that divides a pixel array portion into blocks and obtains and holds correction coefficients for respective blocks. Japanese Patent Laid-Open No. 2020-61669 discloses a technique of dividing a pixel array portion into a plurality of regions based on the distribution of a dark current, holding dark current values at the boundaries among the plurality of regions as correction values for dark current correction, and performing correction using these correction values. The technique described in Japanese Patent Laid-Open No. 2020-61669 is understood to be incompatible with correction of a characteristic variation on a column basis that occurs among a plurality of column circuits which read out signals from the pixel array portion.

Among the plurality of column circuits which read out signals from the pixel array portion, a noise component which changes on a column basis can be generated due to the characteristic variation among the columns. In addition, through examination by the present inventor, it has been found that in the arrangement including a pixel in which a plurality of photoelectric conversion elements share one floating diffusion, shading corresponding to the readout condition for reading out signals from the respective photoelectric conversion elements occurs due to the pixel structure and the like. Considering the above problems, in order to correct the noise component with high accuracy, it is desirable to hold the correction coefficient for each column for each readout condition. However, with such an approach, the scale of the memory required for the correction can be enormous.

SUMMARY OF THE INVENTION

The present invention provides a technique advantageous in achieving both correction of a noise component and reduction of the circuit scale of the memory required for the correction.

One of aspects of the present invention provides a photoelectric conversion apparatus comprising a pixel array including a plurality of pixel units arranged so as to form a plurality of rows and a plurality of columns, and a plurality of column signal lines; a readout circuit configured to read out signals from the pixel array via the plurality of column signal lines; a vertical scanning unit; a holding unit; and a signal processing unit configured to process signals read out by the readout circuit, wherein each pixel unit includes a predetermined number of photoelectric conversion elements, a floating diffusion, and transfer transistors of the predetermined number arranged so as to be capable of connecting the predetermined number of photoelectric conversion elements and the floating diffusion, the plurality of columns are divided into a plurality of groups, the holding unit includes one first region and a plurality of second regions, a plurality of first correction values respectively corresponding to the plurality of columns are stored in the first region, each second region is associated with a readout condition for reading out signals from each pixel unit by the readout circuit, and a plurality of second correction values respectively corresponding to the plurality of groups are stored in each second region, the vertical scanning unit selects a readout target photoelectric conversion element from the predetermined number of photoelectric conversion elements in each pixel unit arranged in a readout target row of the plurality of rows, and the signal processing unit performs, on signals read out via the plurality of column signal lines by the readout circuit from the photoelectric conversion elements selected by the vertical scanning unit, first correction based on the plurality of first correction values stored in the first region, and second correction based on the plurality of second correction values stored in the second region, of the plurality of second regions, corresponding to the readout condition for reading out signals from the selected photoelectric conversion element.

Further features of the present invention will become apparent from the following description of exemplary embodiments with reference to the attached drawings.

BRIEF DESCRIPTION OF THE DRAWINGS

FIG. 7 is a view exemplarily showing the arrangement of a signal processing unit in a photoelectric conversion apparatus according to the second embodiment;

FIGS. 8A and 8B are views exemplarily showing operations of the photoelectric conversion apparatus according to the second embodiment;

FIG. 9 is a view exemplarily showing the arrangement of a signal processing unit in a photoelectric conversion apparatus according to the third embodiment;

FIG. 10 is a view showing one drive mode in the photoelectric conversion apparatus according to the third embodiment;

FIG. 11 is a view showing one drive mode in the photoelectric conversion apparatus according to the third embodiment;

FIG. 12 is a view showing one drive mode in the photoelectric conversion apparatus according to the third embodiment;

FIG. 13 is a view showing one drive mode in the photoelectric conversion apparatus according to the third embodiment;

FIG. 20 is a view exemplarily showing the arrangement of a holding unit in the photoelectric conversion apparatus according to the fourth embodiment;

FIGS. 44A and 44B are views for explaining the arrangement and principle of A/D conversion of the third disclosure;

FIG. 45 is a view exemplarily showing the operation of a column circuit in the first embodiment of the third disclosure;

DESCRIPTION OF THE EMBODIMENTS

Figure 1:
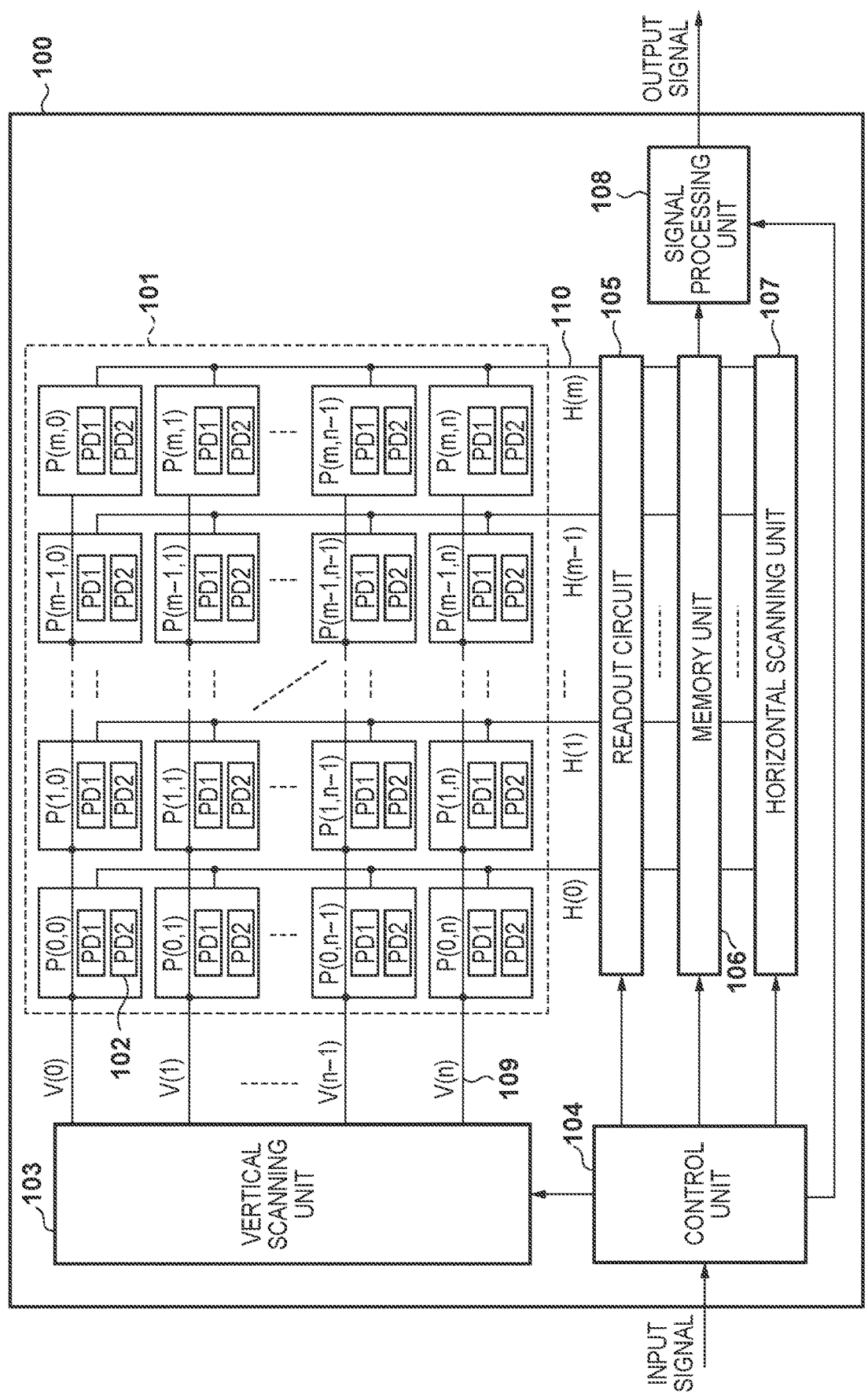
FIG. 1 is a view exemplarily showing the arrangement of a photoelectric conversion apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted. In the attached drawings, "A" at the beginning of the reference numerals can be replaced with "B", and "B" at the beginning of the reference numerals can be replaced with "A".

First Disclosure

With reference to FIGS. 1 to 6, a photoelectric conversion apparatus 100 according to the first embodiment of the first disclosure will be described below. The photoelectric conversion apparatus 100 may be composed of a chip formed by one semiconductor layer or semiconductor substrate, may be composed of a chip formed by a plurality of semiconductor layers or semiconductor substrates, or may be composed of a plurality of chips. The photoelectric conversion apparatus 100 can be formed as an image sensor or an apparatus including an image sensor.

FIG. 1 exemplarily shows the arrangement of the photoelectric conversion apparatus 100 according to the first embodiment. The photoelectric conversion apparatus 100 can include a pixel array 101 which includes a plurality of pixel units 102 arranged so as to form a plurality of rows and a plurality of columns. In order to distinguish the pixel units 102 from a plurality of reference pixel units and a plurality of OB pixel units, the pixel units 102 can also be referred to as effective pixels. The plurality of reference pixel units can be arranged in the pixel array 101 so as to form at least one reference pixel unit row and at least one reference pixel unit column. The plurality of OB pixel units can be arranged in the pixel array 101 so as to form at least one OB pixel unit row and at least one OB pixel unit column. The pixel array 101 can include a plurality of column signal lines 110. Each column of the pixel array 101 can be assigned with at least one column signal line 110. The photoelectric conversion apparatus 100 can also include a readout circuit 105 that reads out signals of the pixel array 101. The readout circuit 105 can have a function of reading out a signal of the pixel array 101 with a first gain, and a function of reading out a signal of the pixel array 101 with a second gain different from the first gain. The readout circuit 105 may be understood to have a function of reading out signals of the pixel array 101 with a plurality of gains different from each other. The readout circuit 105 can include a plurality of column circuits, and each column circuit can be configured to read out signals of the pixel array 101 through at least one column signal line 110.

The photoelectric conversion apparatus 100 can include a signal processing unit 108 that performs a correlated double sampling process (CDS process) and a correction process on signals read out from the pixel unit 102 (effective pixel) in the pixel array 101 by the readout circuit 105. The photoelectric conversion apparatus 100 can further include a vertical scanning unit 103, a control unit 104, and a horizontal scanning unit 107. In an arrangement example, the signal processing unit 108 can form a part of the photoelectric conversion apparatus 100. In another arrangement example, the signal processing unit 108 does not form a part of the photoelectric conversion apparatus 100. In this case, a system including the photoelectric conversion apparatus 100 and the signal processing unit 108 can be understood as a photoelectric conversion system. In such a photoelectric conversion system, the function of the signal processing unit 108 may be provided by a computer such as a personal computer, may be provided by a processor such as an ASIC, or may be implemented by another arrangement.

In the example shown in FIG. 1, the plurality of pixel units 102 forming the pixel array 101 are arranged so as to form a matrix of m columns and n rows. The pixel unit 102 can also be written as a pixel unit P(i, j) to indicate its position. i indicates the column where the pixel unit P(i, j) is arranged, and j indicates the row where the pixel unit P(i, j) is arranged. The vertical scanning unit 103 selects one row from n rows by n sets of row selection lines 109 (V(j) (j=1 to n)). Selecting a row means selecting m pixel units 102 arranged in the row. The signals of the pixel units 102 arranged in the selected row can be read out by the readout circuit 105 via the column signal lines 110 (H(i) (i=1 to m)). Readout by the readout circuit 105 includes a process of converting (that is, A/D-converting) a plurality of analog signals output from the pixel units 102 to the column signal lines 110 into a plurality of digital signals in parallel, and the plurality of digital signals are temporarily stored in a memory unit 106. The readout circuit 105 may include an amplification circuit and the like. The amplification circuit can amplify the signal output from the pixel unit 102. The plurality of digital signals stored in the memory unit 106 can be then sequentially selected by the horizontal scanning unit 107 and supplied to the signal processing unit 108. The signal processing unit 108 processes the digital signals supplied as described above, and outputs signals obtained by the process. The control unit 104 can acquire setting information for setting the image capturing condition and the like in image capturing by the photoelectric conversion apparatus 100, and supply a control signal corresponding to the image capturing condition to each component included in the photoelectric conversion apparatus 100. The control unit 104 can be configured to control the vertical scanning unit 103, the readout circuit 105, the memory unit 106, the horizontal scanning unit 107, and the signal processing unit 108 based on the setting information.

Figure 2:
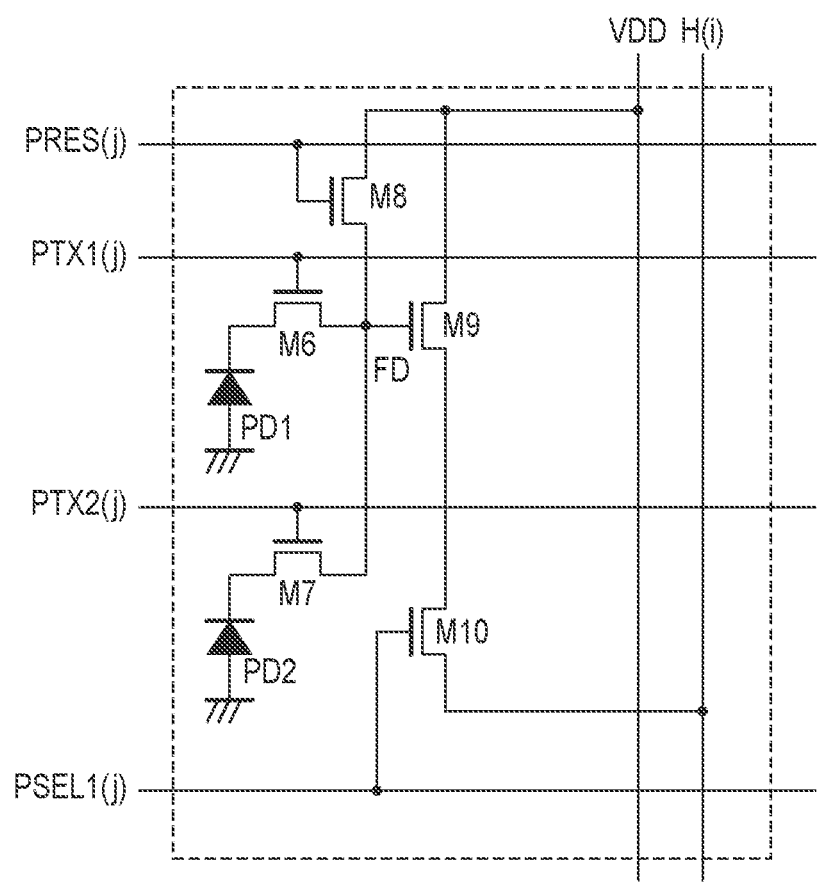
FIG. 2 is a view exemplarily showing the arrangement of a pixel unit.

FIG. 2 exemplarily shows the arrangement of the pixel unit 102 (P(i, j)). The pixel unit 102 can include a predetermined number (two in this example) of photoelectric conversion elements PD1 and PD2, and a floating diffusion FD shared by the predetermined number of photoelectric conversion elements. The pixel unit 102 can also include transfer transistors M6 and M7 of the predetermined number arranged so as to be capable of connecting the predetermined number of photoelectric conversion elements PD1 and PD2 and the floating diffusion FD. The pixel unit 102 can also include a reset transistor M8, an amplification transistor M9, and a selection transistor M10. Each of the photoelectric conversion elements PD1 and PD2 performs photoelectric conversion, thereby generating electric charges corresponding to the incident light amount. The photoelectric conversion elements PD1 and PD2 are, for example, photodiodes. The transfer transistor M6 transfers the electric charges generated by photoelectric conversion in the photoelectric conversion element PD1 to the floating diffusion FD. The transfer transistor M7 transfers the electric charges generated by photoelectric conversion in the photoelectric conversion element PD2 to the floating diffusion FD. The electric charges transferred to the floating diffusion FD are converted into a potential by an electrostatic capacitance included in the floating diffusion FD. The amplification transistor M9 outputs a signal corresponding to the potential of the floating diffusion FD to the column signal line H(i) (110). The reset transistor M8 resets the potential of the floating diffusion FD to a predetermined potential.

The row selection line 109 (V(j)) includes a first transfer control line PTX1(j), a second transfer control line PTX2(j), a reset control line PRES(j), and a row selection line PSEL(j) used to control the transfer transistors M6 and M7, the reset transistor M8, and the selection transistor M10. Note that a first transfer signal and a second transfer signal respectively supplied to the first transfer control line PTX1(j) and the second transfer control line PTX2(j) are also identified as PTX1(j) and PTX2(j), respectively. Further, a reset control signal and a row selection signal respectively supplied to the reset control line PRES(j) and the row selection line PSEL(j) are also identified as PRES(j) and PSEL(j), respectively. The drains of the reset transistor M8 and the amplification transistor M9 are electrically connected to a pixel power supply potential VDD. The source of the amplification transistor M9 is electrically connected to a current source (not shown) via the selection transistor M10 and the column signal line H(i), and the amplification transistor M9 can operate as a source follower circuit. Note that each transistor is formed by an n-channel transistor in the example shown in FIG. 2, but may be formed by a p-channel transistor.

The first transfer control line PTX1(j) supplies the first transfer control signal PTX1(j) to the gate of the first transfer transistor M6 in the jth row. The second transfer control line PTX2(j) supplies the second transfer control signal PTX2(j) to the gate of the second transfer transistor M7 in the jth row. The reset control line PRES(j) supplies the reset control signal PRES(j) to the gate of the reset transistor M8 in the jth row. The row selection line PSEL(j) supplies the row selection signal PSEL(j) to the gate of the selection transistor M10 in the jth row.

In the example shown in FIG. 2, one pixel unit 102 includes two photoelectric conversion elements, but this is merely an example. For example, the pixel unit 102 can be formed as a pixel unit for distance measurement. In an arrangement example in this case, the first photoelectric conversion element PD1 can be replaced with two photoelectric conversion elements used to detect the phase difference, and the second photoelectric conversion element PD2 can be replaced with two photoelectric conversion elements used to detect the phase difference.

Figure 3:
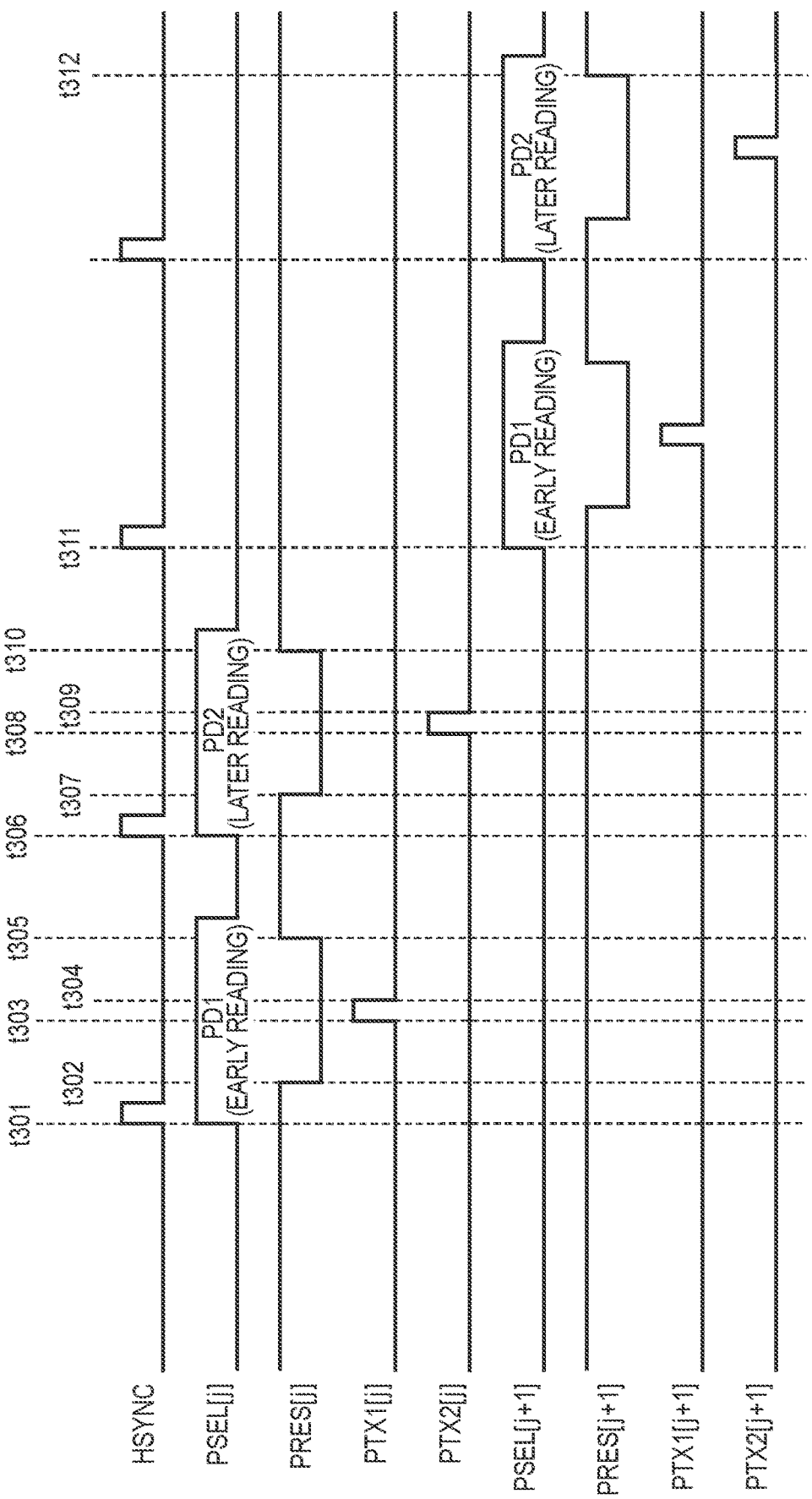
FIG. 3 is a view exemplarily showing an operation of reading out signals from a pixel array by a readout circuit in the photoelectric conversion apparatus.

Next, with reference to FIG. 3, an operation of reading out signals from the pixel array 101 by the readout circuit 105 in the photoelectric conversion apparatus 100 will be described. FIG. 3 exemplarily shows a timing chart of the operation of reading out signals from the pixel array 101. Here, the operation of reading out signals from the pixel unit 102 in the jth row and the pixel unit 102 in the (j+1)th row by the vertical scanning unit 103 is representatively shown. Note that signals shown in FIG. 3 are high-active signals.

At time t301, a horizontal synchronization signal HSYNC is activated to high level, and the vertical scanning unit 103 activates, to high level, the row selection signal PSEL(j) of the jth row as the readout target row. If the row selection signal PSEL(j) is activated to high level, the selection transistor M10 of the pixel unit 102 in the jth row as the readout target row is set in the ON state, and the n pixel units 102 in the jth row are electrically connected to the column signal lines 110 (H(i) (i=1 to m)).

Until time t302, the reset control signal PRES(j) is kept at high level by the vertical scanning unit 103, so that the reset transistor M8 of the pixel unit 102 in the jth row is kept in the ON state. Thus, the floating diffusion FD is reset at the pixel power supply potential VDD. At time t302, the vertical scanning unit 103 inactivates the reset control signal PRES(j) to low level, and the reset transistor M8 is set in the OFF state. Thus, the reset of the floating diffusion FD is released. Since the selection transistor M10 is kept in the ON state, an output signal corresponding to the gate potential of the amplification transistor M9 at the time of release of the reset of the floating diffusion FD is output to the column signal line H(i). The pixel signal output from the pixel unit 102 at time t302, that is, the reset level is referred to as an N level (noise level).

At time t303, the vertical scanning unit 103 activates the first transfer control signal PTX1(j) to high level. Thus, the first transfer transistor M6 is set in the ON state, and electric charges generated by photoelectric conversion in the first photoelectric conversion element PD1 are transferred to the floating diffusion FD. A pixel signal corresponding to the electric charges generated in the photoelectric conversion element PD1 is output to the column signal line H(i). The pixel signal output from the pixel unit 102 at time t303, that is, the optical signal level is referred to as an S level.

At time t304, the vertical scanning unit 103 inactivates the first transfer control signal PTX1(j) to low level. Thus, the first transfer transistor M6 is set in the OFF state. Even after the first transfer transistor M6 is set in the OFF state, the S level continues to be output to the column signal line H(i). Since readout of signals from the first photoelectric conversion element PD1 comes earlier in the order of using the floating diffusion FD, readout of signals from the first photoelectric conversion element PD1 is referred to as FD early-reading.

Readout of signals from the second photoelectric conversion element PD2 is performed from time t306 to time t310. The readout method (drive method) is similar to the readout of signals from the first photoelectric conversion element PD1. Since readout of signals from the second photoelectric conversion element PD2 comes later in the order of using the floating diffusion FD, redout of signals from the second photoelectric conversion element PD2 is referred to as FD later-reading.

Subsequently, from time t311 to time t312, readout of signals from the pixel unit 102 in the (j+1)th row is performed. In the example shown in FIG. 3, each time the horizontal synchronization signal HYNC is activated to high level, FD-early reading and FD-later reading are switched. However, both FD-early reading and FD-later reading may be performed in accordance with one activation of the horizontal synchronization signal HYNC.

The operation as described above is performed from the first row to the nth row, thereby reading out pixel signals for one frame. The signal processing unit 108 includes a CDS circuit that performs the CDS process of calculating the difference between the S level and the N level. This CDS process can remove the fixed pattern noise.

The pixel signal after the CDS process by the CDS circuit of the signal processing unit 108 includes a noise component that changes in the horizontal direction (row direction) (that is, varies among columns). The noise component can depend on, for example, the characteristic variation among the plurality of column circuits forming the readout circuit 105 and the characteristic variation among a plurality of memories forming the memory unit. The noise component can also depend on a dark current generated in the photoelectric conversion element, the difference between the distances from the plurality of column circuits to the signal processing unit 108, the readout order of signals from the plurality (predetermined number) of photoelectric conversion elements in the pixel unit 102, and the like.

In this specification, for the sake of convenience, of the variations in the noise component, the variation occurring on a column basis is referred to as a column variation, and the variation occurring on a larger unit basis is referred to as horizontal shading. The main component of the column variation is the noise component generated in the readout circuit 105, so the column variation is substantially not influenced by the pixel units 102. Therefore, the column variation can be considered as a component independent of the readout conditions such as FD-early reading and FD-later reading.

The horizontal shading will be described below. The component concerning FD-early reading and the component concerning FD-later reading can be different in the direct distance from the column signal line 110. For example, the component concerning FD-early reading and the component concerning FD-later reading can be different in the direct distance between the photoelectric conversion element and the column signal line 110, or in the direct distance between the gate of the transfer transistor and the column signal line 110. Therefore, the parasitic capacitance added to the column signal line 110 can change between the component concerning FD-early reading and the component concerning FD-later reading. Accordingly, the magnitude of the noise component can change between the pixel signal obtained by FD-early reading and the pixel signal obtained by FD-later reading. That is, even in the same row, the shape (distribution) of the horizontal shading in multiple pixel signals obtained by FD-early reading can be different from the shape (distribution) of the horizontal shading in multiple pixel signals obtained by FD-later reading. Thus, in order to effectively correct the horizontal shading, FD-early reading and FD-later reading (that is, the order of reading out signals of each photoelectric conversion element from the pixel unit) should be considered.

Figure 4:
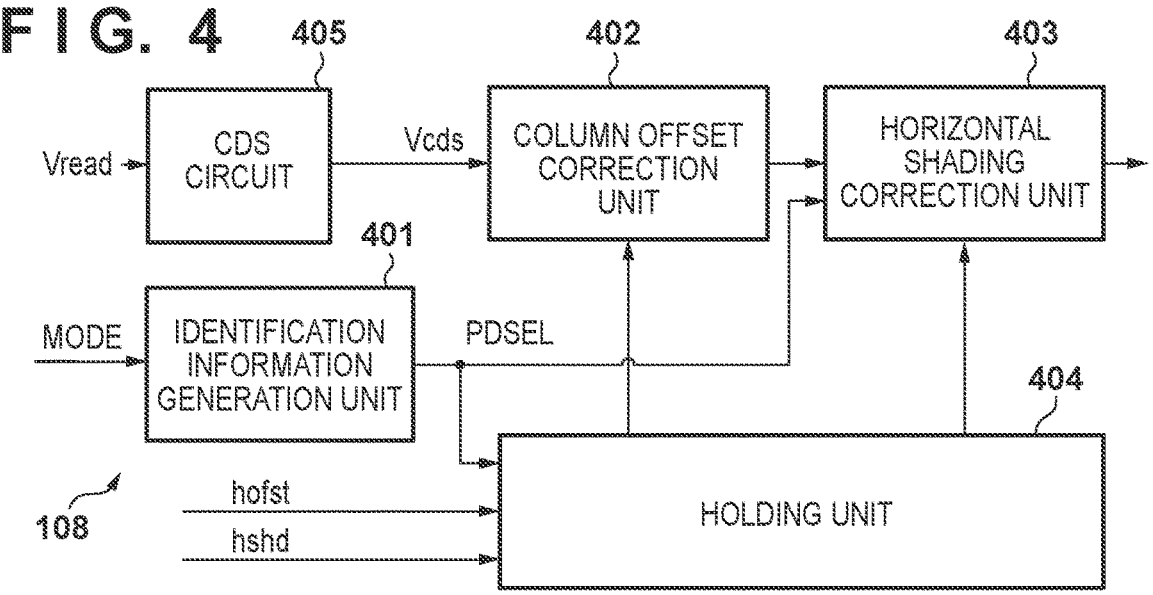
FIG. 4 is a view exemplarily showing the arrangement of a signal processing unit in the photoelectric conversion apparatus according to the first embodiment.

FIG. 4 exemplarily shows the arrangement of the signal processing unit 108. The signal processing unit 108 can include, for example, a CDS circuit 405, an identification information generation unit 401, a column offset correction unit 402, a horizontal shading correction unit 403, and a holding unit 404. In the period of reading out signals from the pixel unit 102 in the pixel array 101, the CDS circuit 405 is supplied with the S level and the N level read out from the pixel unit 102 in the pixel array 101 by the readout circuit 105 and held by the memory unit 106. The CDS circuit 405 performs the CDS process to calculate the difference between the S level and the N level, thereby generating a pixel signal Vcds, and supplies the pixel signal Vcds to the column offset correction unit 402. The identification information generation unit 401 generates, based on drive mode information MODE supplied from the control unit 104, identification information PDSEL indicating whether the pixel signal Vcds to be corrected is the signal read out by FD-early reading or the signal read out by FD-later reading. The identification information PDSEL can also be identification information indicating the readout target among the plurality (predetermined number) of photoelectric conversion elements PD1 and PD2. Alternatively, the identification information PDSEL can be information indicating the readout order of each of the plurality (predetermined number) of photoelectric conversion elements PD1 and PD2. The identification information PDSEL can be supplied to the holding unit 404 and the horizontal shading correction unit 403. The identification information PDSEL can be updated every horizontal synchronization period (to be referred to as hd hereinafter). For example, for FD-early reading, "0" can be generated as the identification information PDSEL, and for FD-later reading, "1" can be generated as the identification information PDSEL. Based on the identification information, it can be determined whether the pixel signal Vcds to be processed is the signal read out by FD-early reading or the signal read out by FD-later reading.

The holding unit 404 can be formed by, for example, a memory such as an SRAM. The holding unit 404 holds column offset data hofst for correcting the column offset, and horizontal shading data hshd for correcting the horizontal shading. In an example, the column offset data hofst and the horizontal shading data hshd can be generated before shipping of the photoelectric conversion apparatus 100, and supplied to the photoelectric conversion apparatus 100. In an example, the column offset data hofst and the horizontal shading data hshd can be prepared in an external apparatus, generated before shipping of the photoelectric conversion apparatus 100, and provided to or incorporated in the photoelectric conversion apparatus 100.

Figure 5:
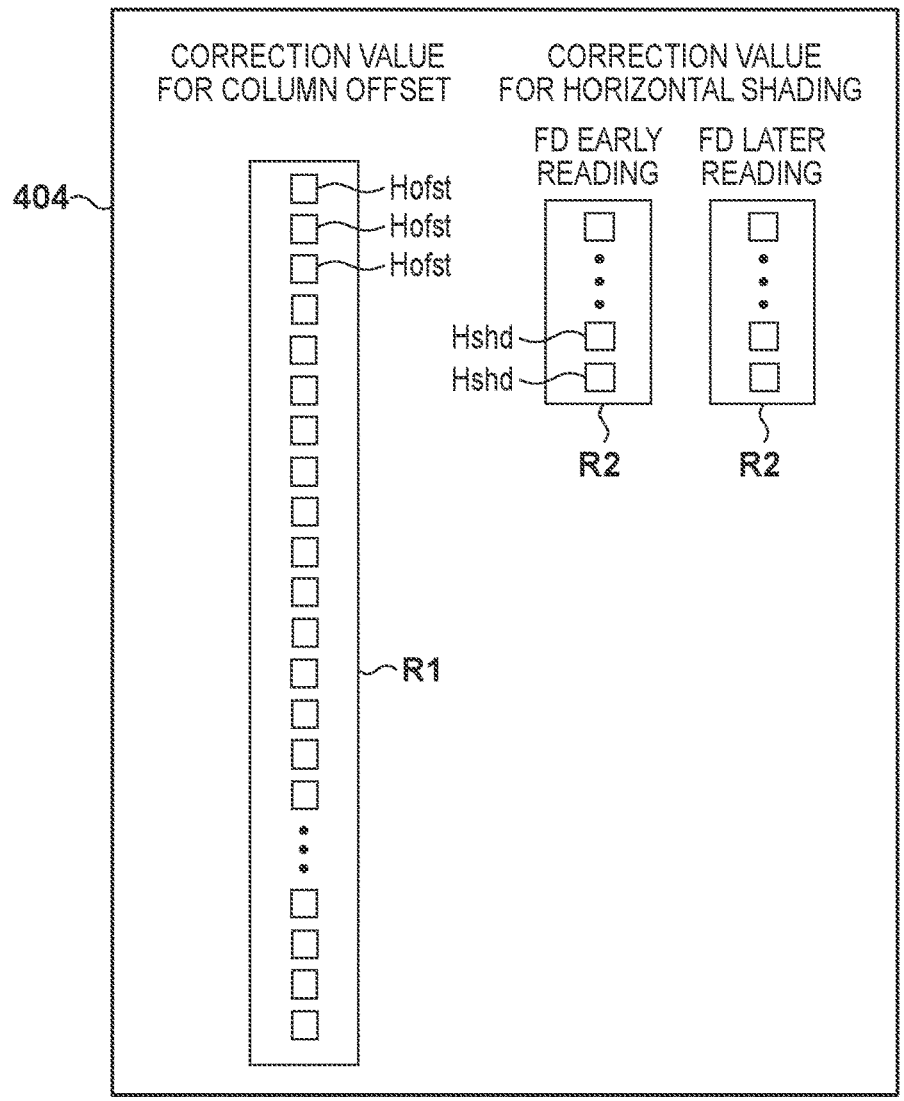
FIG. 5 is a view exemplarily showing the arrangement of a holding unit in the photoelectric conversion apparatus according to the first embodiment.

The plurality of columns of the pixel array 101 are divided into a plurality of groups. As schematically shown in FIG. 5, the holding unit 404 includes one first region R1, and second regions R2 of the number equal to the number (predetermined number) of the photoelectric conversion elements PD1 and PD2 included in one pixel unit 102. In the first region R1, a plurality of column offset data hofst can be stored as a plurality of first correction values respectively corresponding to the plurality columns of the pixel array 101. Each second region R2 is associated with the readout condition for reading signals from each pixel unit 102 by the readout circuit 105. In each second region R2, the plurality of horizontal shading data hshd can be stored as a plurality of second correction values respectively corresponding to the plurality of groups.

The column offset correction unit 402 corrects the pixel signal Vcds output from the CDS circuit 405 based on the column offset data hofst supplied from the holding unit 404. In an example, the column offset correction unit 402 adds the column offset data hofst supplied from the holding unit 404 to the pixel signal Vcds output from the CDS circuit 405. The correction by the column offset correction unit 402 is irrelevant to the value of the identification information PDSEL generated by the identification information generation unit 401. That is, the column offset data hofst is common to FD-early reading and FD-later reading. Considering that the pixel signal Vcds is the signal read out from the photoelectric conversion element PD1 or PD2 of the pixel unit P(i, j), the column offset data hofst can be data associated with the pixel unit P(i, j). Since the column offset data hofst is data for correcting the variation on a column basis, the variation on a column basis is corrected through correction by the column offset correction unit 402.

According to the first embodiment, since the column offset data common to FD-early reading and FD-later reading is held without holding the column offset data for FD-early reading and the column offset data for FD-later reading, the scale of the holding unit 404 can be decreased. The column offset correction unit 402 can be understood as a function of performing, on the signals read out by the readout circuit 105 via the plurality of column signal lines from the photoelectric conversion elements selected by the vertical scanning unit 103, first correction based on the plurality of first correction values stored in the first region.

The horizontal shading correction unit 403 generates, based on the horizontal shading data hshd supplied from the holding unit 404, the correction value corresponding to the identification information PDSEL generated by the identification information generation unit 401, and corrects the pixel signal using the correction value. The horizontal shading correction unit 403 can be understood as a function of performing second correction based on the plurality of second correction values stored in the second region, of the predetermined number of second regions, corresponding to the readout condition for reading signals from the photoelectric conversion element selected by the vertical scanning unit 103.

Figure 6:
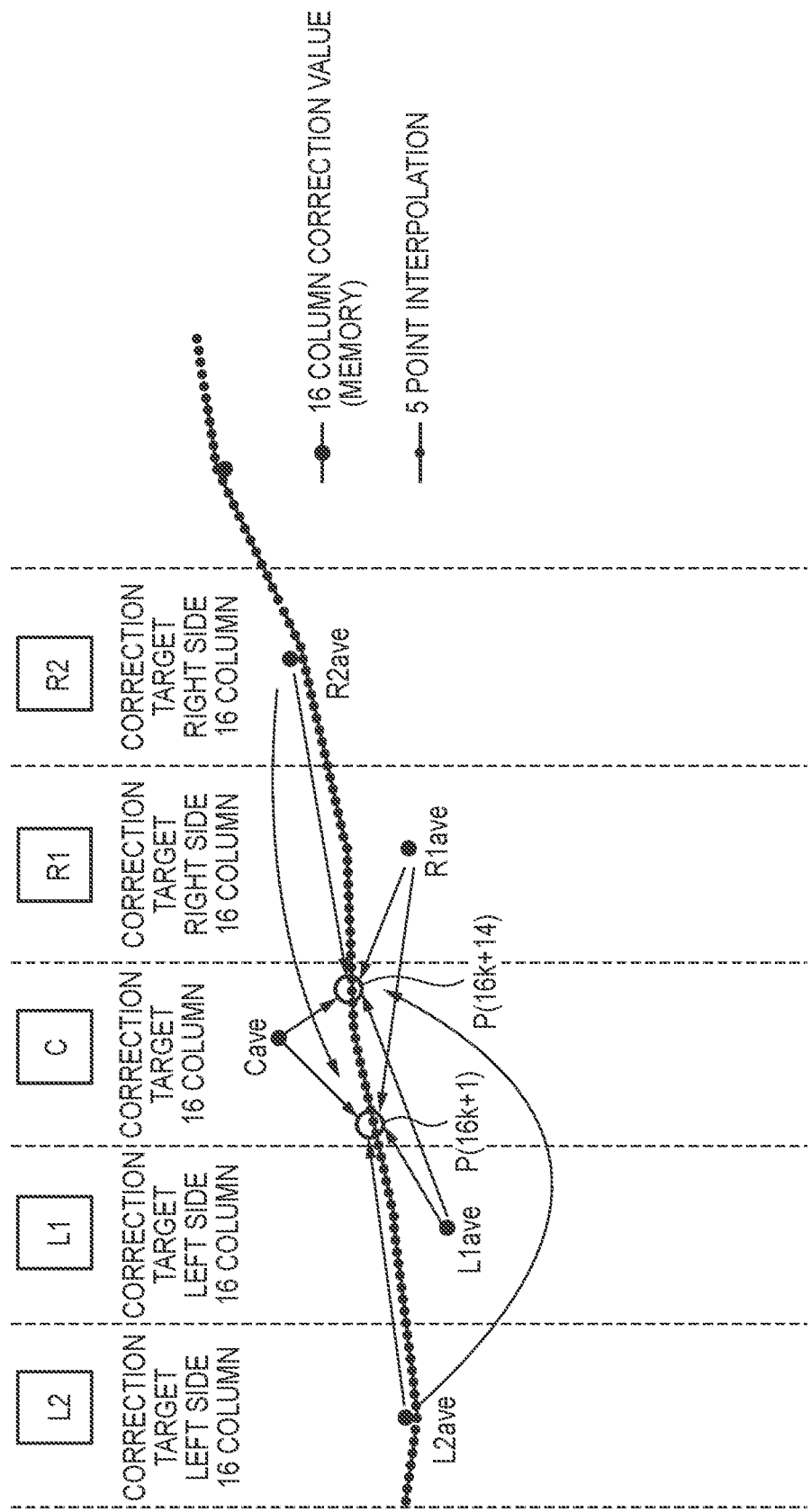
FIG. 6 is a view exemplarily showing correction in a horizontal shading correction unit.

FIG. 6 schematically shows the second correction by the horizontal shading correction unit 403. In this example, the plurality of columns of the pixel array 101 are divided into a plurality of groups, and each group is composed of 16 columns. In one second region R2 of the holding unit 404, the plurality of second correction values hshd are stored. In the example shown in FIG. 6, the pixel signal Vcds of the pixel unit P(i, j) is corrected using the second correction value (16k+n) generated based on Cave, L2ave, L1ave, R1ave, and R2ave selected from the plurality of second correction values hshd based on the value of i.

Here, Cave is the second correction value hshd assigned to a group C to which the pixel unit P(i, j) belongs. For example, Cave is the average value of values obtained by performing the CDS process by the CDS circuit 405 on the signals read out by the readout circuit 105 from the reference pixel units (to be described later) arranged in 16 columns forming the group C. L2ave and L1ave are the second correction values hshd respectively assigned to two groups L2 and L1 on the left side of the group C. L2ave is the average value of values obtained by performing the CDS process by the CDS circuit 405 on the signals read out by the readout circuit 105 from the reference pixel units arranged in 16 columns forming the group L2. L1ave is the average value of values obtained by performing the CDS process by the CDS circuit 405 on the signals read out by the readout circuit 105 from the reference pixel units arranged in 16 columns forming the group L1. R1ave and R2ave are the second correction values hshd respectively assigned to two groups R1 and R2 on the right side of the group C. R1ave is the average value of values obtained by performing the CDS process by the CDS circuit 405 on the signals read out by the readout circuit 105 from the reference pixel units arranged in 16 columns forming the group R1. R2ave is the average value of values obtained by performing the CDS process by the CDS circuit 405 on the signals read out by the readout circuit 105 from the reference pixel units arranged in 16 columns forming the group R2.

In this example, the horizontal shading correction unit 403 generates, based on five correction values Cave, L2ave, L1ave, R1ave, and R2ave, correction data P(16k+n) by linear interpolation in accordance with equation (1). Further, the horizontal shading correction unit 403 corrects, based on the correction data P(16k+n), the pixel signal output from the column offset correction unit 402. In an example, the horizontal shading correction unit 403 adds the correction data P(16k+n) to the pixel signal output from the column offset correction unit 402.

$$P(16k+n) = \frac{(L2_{ave}*L2[n] + L1_{ave}*L1[n] + C_{ave}*C[n] + R1_{ave}*R1[n] + R2_{ave}*R2[n])}{(L2[n] + L1[n] + C[n] + R1[n] + R2[n])} \quad (1)$$

Here, P(16k+n) is the correction data, k is an integer, n is an integer of 0 to 15, and L[n], C[n], and R[n] are interpolation parameters.

In some cases, some of L2ave, L1ave, R1ave, and R2ave do not exist. For example, when generating the correction data for correcting the pixel signal of the pixel unit belonging to the second group from the left end of the pixel array 101, L2ave does not exist. In such a case, for example, exception handling such as using L1ave as L2ave can be performed. Note that the process expressed by equation (1) is an example. Another equation may be applied, or another interpolation method may be used. According to the first embodiment, horizontal shading depending on FD-early reading and FD-later reading is corrected based on the correction data obtained by interpolation of the correction values given to the group to which the pixel to be corrected belongs and groups close to the group. Thus, it is possible to effectively remove the noise component while decreasing the scale of the holding unit 404.

Note that in the first embodiment, there is no restriction on the order of correction by the column offset correction unit 402 and correction by the horizontal shading correction unit 403.

With reference to FIGS. 7 to 8B, a photoelectric conversion apparatus 100 according to the second embodiment will be described below. Matters not mentioned as the second embodiment can follow the first embodiment. FIG. 7 exemplarily shows the arrangement of a signal processing unit 108 in the photoelectric conversion apparatus 100 according to the second embodiment. The second embodiment is advantageous in a case in which the column variation and the horizontal shading are not constant in time but fluctuates in accordance with the drive mode and/or temperature characteristics.

In the second embodiment, the signal processing unit 108 can include a first correction value generation unit 705 that generates column offset data hofst for correcting a column offset, and stores the column offset data hofst in a holding unit 404. The signal processing unit 108 can also include a second correction value generation unit 706 that generates horizontal shading data hshd for correcting horizontal shading, and stores the horizontal shading data hshd in the holding unit 404.

To generate the column offset data hofst and the horizontal shading data hshd, a plurality of reference pixel units, each of which outputs a noise level, can be used. The plurality of reference pixel units can be arranged so as to include at least the reference pixel units arranged in the columns identical to a plurality of columns of an effective pixel region 702. In other words, at least one reference pixel unit can be connected to each column signal line 110. The reference pixel unit can have an arrangement obtained by removing photoelectric conversion elements from a pixel unit 102. In addition, the reference pixel unit is shielded from light by a light shielding film. That is, the reference pixel unit can include a floating diffusion FD, a predetermined number of transfer transistors M6 and M7, a reset transistor M8, an amplification transistor M9, and a selection transistor M10.

A control unit 104 can execute a correction value generation operation to generate the column offset data hofst and the horizontal shading data hshd. Here, the period of reading out signals from the pixel unit 102 or the reference pixel unit in a pixel array 101 includes a first period and a second period. In the first period, a noise level is read out from the pixel unit 102, and a first noise level is read out from the reference pixel unit. In the second period, an optical signal level is read out from the pixel unit 102 in a state in which the transfer transistor is turned on, and a second noise level is read out from the reference pixel unit.

In the correction value generation operation of generating the column offset data hofst and the horizontal shading data hshd, a readout circuit 105 reads out the first noise level and the second noise level in the first period and the second period, respectively, from the reference pixel unit in the pixel array 101. A CDS circuit 405 performs a CDS process on the first noise level and the second noise level read out by the readout circuit 105, thereby generating noise level data data, and supplies the noise level data data to the first correction value generation unit 705.

The first correction value generation unit 705 processes the noise level data data supplied from the CDS circuit 405, thereby generating the first correction value hofst for correcting the column offset. The first correction value generation unit 705 generates the first correction value hofst, for example, in accordance with equation (2):

$$\text{hofst\_col\_i} = \sum \left\{ \frac{\text{data}}{N} + \frac{\text{data}}{N} + \ldots + \frac{\text{data}}{N} \right\} \quad (2)$$

Here, in equation (2), hofst_col_i # is the first correction value hofst for correcting the column offset of the ith column, N is the integration count (sampling count), and data is the noise level data data of the ith column. Equation (2) means that the noise level data data of the single line is sampled N times, and the average value thereof is calculated.

The noise level data data may include flaw data of white flaw, black flaw, or the like. Hence, a circuit for correcting flaw data may be added. More specifically, a normal range is decided based on a reference value, and data falling outside the normal range can be determined as flaw data. The data determined as flaw data may be, for example, replaced with the reference value or deleted.

To generate the column offset data hofst and the horizontal shading data hshd, the pixel unit 102 may be used instead of the reference pixel unit. In this case, in the first period, the first noise level can be read out from the pixel unit 102 while keeping the transfer transistor in the OFF state, and in the second period, the second noise level can be read out from the pixel unit 102 while keeping the transfer transistor in the OFF state.

The second correction value generation unit 706 processes the noise level data data supplied from the CDS circuit 405 via the column offset correction unit 402, thereby generating the second correction value hshd for correcting the horizontal shading. The second correction value generation unit 706 generates the second correction value hshd, for example, in accordance with equations (3) and (4). Here, the second correction value generation unit 706 generates, based on identification information PDSEL, the second correction value hshd for FD-early reading and the second correction value hshd for FD-later reading.

$$\text{hshd\_16col\_ave\_k} = \sum \left\{ \frac{\text{data1}}{NG} + \frac{\text{data2}}{NG} + \ldots + \frac{\text{data}N}{NG} \right\} \quad (3)$$

$$\text{hshd\_k} = \quad (4)$$
$$\sum \left\{ \frac{\text{hshd\_16col\_ave1}}{N} + \frac{\text{hshd\_16col\_ave2}}{N} + \ldots + \frac{\text{hshd\_16col\_aveN}}{N} \right\}$$

The plurality of columns of the pixel array 101 are divided into a plurality of groups (p groups) from the first group to the pth group. The second correction value hshd is generated for each group. In equation (3), NG is the number of columns belonging to the kth group (NG is 16 in this example). hshd_16col_ave_k is the average value of noise level data data read out by the readout circuit 105 from NG columns belonging to the kth group and having undergone the CDS process in the CDS circuit 405. In equation (4), hshd_k is the second correction value for the kth group. More specifically, the second correction value hshd_k is obtained by averaging hshd_16col_ave_k for the kth group obtained N times in accordance with equation (3).

FIGS. 8A and 8B exemplarily show the sequence of the correction value generation operation and the image capturing operation. In the correction value generation operation, the readout circuit 105 sequentially reads out signals from the reference pixel units in the plurality of columns of the pixel array 101, and the first correction value generation unit 705 and the second correction value generation unit 706 generate the first correction value and the second correction value, respectively. In the image capturing operation, the readout circuit 105 reads out signals from the plurality of pixel units 102 in the pixel array 101, and the signal processing unit 108 can process the signals. In the signal processing unit 108, the optical signal level and noise level read out from the pixel array 101 by the readout circuit 105 undergo the CDS process by the CDS circuit 405, and then corrected by a column offset correction unit 402 and a horizontal shading correction unit 403.

The period of executing the correction value generation operation can include a period of generating the first correction value (column offset correction value) and a period of generating the second correction value (horizontal shading correction value). The former is the period in which a "column offset correction value generation flag" is at high level, and the latter is the period in which a "horizontal shading correction value generation flag" is at high level. In the period of generating the first correction value, the second correction value is not generated. In the period of generating the second correction value, the first correction value is not generated. Increasing N (integration count) in each of equations (2) and (4) means increasing the time required for generating the correction value, but increasing N is advantageous in removing the random noise component. It is preferable that, after the first correction value (column offset correction value) is generated, the noise level data data is corrected using the first correction value, and the second correction value (horizontal shading correction value) is generated based on the corrected noise level data. In the second correction value generation unit 706, since the second correction value for FD-early reading and the second correction value for FD-later reading are generated, the integration count (N) executable in a given period can be half the integration count in the period of the same length in the first correction value generation unit 705.

As exemplarily shown in FIGS. 8A and 8B, by performing the correction value generation operation prior to the image capturing operation, correction by the signal processing unit 108 can follow the changes of the column variation and the shape of the horizontal shading caused by changes of the temperature characteristics, drive mode, and the like. Particularly, during execution of the drive mode with a large power consumption, or when the drive mode is changed, the column variation and the shape of the horizontal shading change largely. Thus, the effect of the second embodiment is large.

With reference to FIGS. 9 to 15, a photoelectric conversion apparatus 100 according to the third embodiment will be described below. Matters not mentioned as the third embodiment can follow the second embodiment. In the first and second embodiments, the example has been described in which one column signal line 110 is assigned to one column (the column formed by pixel units 102) of the pixel array 101. In the third embodiment, multiple (four in this example) column signal lines are assigned to one column (the column formed by the pixel units 102) of the pixel array 101. In such an arrangement, one column circuit can be provided for each column signal line. Further, the column signal line selected from the multiple column signal lines can be connected to the column circuit selected from multiple column circuits. In such an arrangement, there are a plurality of paths selectable to read out signals from the pixel array 101, and horizontal shading corresponding to the selected path can be generated. Therefore, in the third embodiment, horizontal shading correction is performed while considering the readout conditions other than FD-early reading and FD-later reading, for example, designation of the column signal line and designation of the column circuit.

Figure 15:
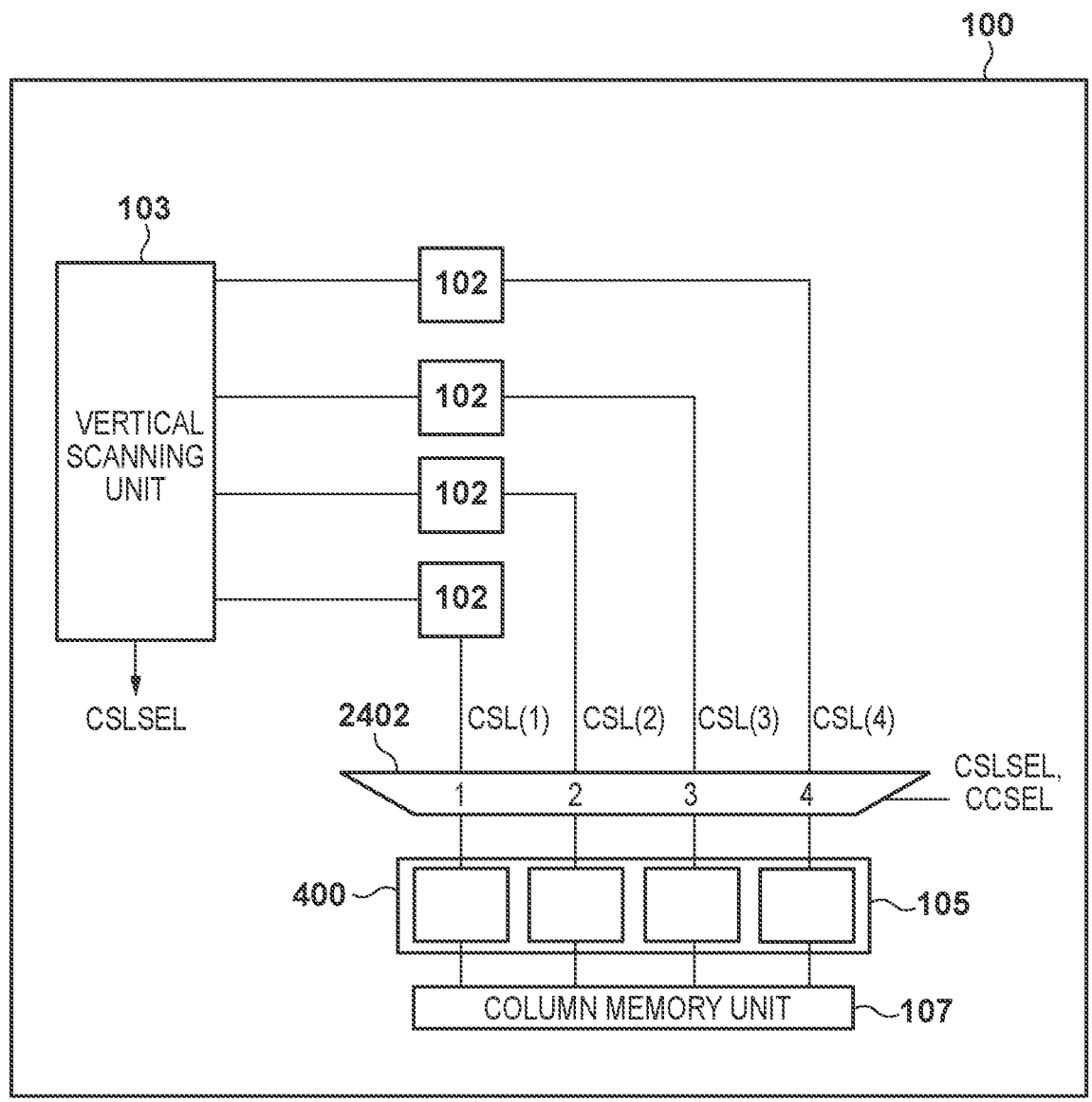
FIG. 15 is a view exemplarily showing the arrangement of the photoelectric conversion apparatus according to the third embodiment.

FIG. 15 schematically shows the arrangement of the photoelectric conversion apparatus 100 according to the third embodiment. In the third embodiment, as has been described above, multiple column signal lines CSL(1) to CSL(4) are assigned to one column formed by multiple pixel units 102. In the photoelectric conversion apparatus 100 according to the third embodiment, a switch array 2402 is arranged between a pixel array 101 and a readout circuit 105. The switch array 2402 controls connections between the multiple column signal lines CSL(1) to CSL(4) assigned to each column of the pixel array 101 and multiple column circuits 400 assigned to each column of the pixel array 101. This control can be performed based on column signal line identification information CSLSEL and column circuit identification information CCSEL. The column signal line identification information CSLSEL is information for selecting one column signal line of the multiple column signal lines CSL(1) to CSL(4) in accordance with the drive mode given by a drive mode signal MODE. The column circuit identification information CCSEL is information for selecting one column circuit 400 of the plurality of column circuits 400 in accordance with the drive mode given by the drive mode signal MODE.

FIG. 9 exemplarily shows the arrangement of a signal processing unit 108 in the photoelectric conversion apparatus 100 according to the third embodiment. The third embodiment is advantageous in a case in which the column variation and the horizontal shading are not constant in time but fluctuates in accordance with the drive mode and/or temperature characteristics. In the third embodiment, an identification information generation unit 401 generates pieces of identification information PDSEL, CSLSEL, and CCSEL in accordance with the drive mode given by the drive mode MODE.

FIGS. 10 to 13 exemplarily show operations in four drive modes. In FIGS. 10 to 13, hdi (i=1, 2, 3 . . . ) indicates a horizontal synchronization signal, and one cycle corresponds to a readout operation of one row.

In the operation mode exemplarily shown in FIG. 10, as "early reading/later reading identification information" (identification information PDSEL) for identifying FD-early reading/later reading, 0 and 1 are switched every 8hd (that is, eight horizontal scanning periods). Each of "column signal line identification information" (identification information CSLSEL) for identifying the column signal line and "column circuit identification information" (identification information CCSEL) for identifying the column circuit repeats 1, 2, 3, 4 every 4hd (that is, four horizontal scanning periods). Accordingly, there are eight types of readout conditions in total, and the number of sets of second correction values to be generated by a second correction value generation unit 706 is eight.

In the drive mode exemplarily shown in FIG. 11, the "early reading/later reading identification information" (identification information PDSEL) continues 0, and the "column signal line identification information" (identification information CSLSEL) and "column circuit identification information" (identification information CCSEL) continue 1. Accordingly, there is only one type of the readout condition, and the number of sets of second correction values to be generated by the second correction value generation unit 706 is one.

The drive exemplarily shown in FIG. 12 is called alternating drive. In alternating drive, signals output through two column signal lines are read out by one column circuit. Accordingly, the relationship between the number of column signal lines and the number of column circuits is expressed by 2:1. In the operation mode exemplarily shown in FIG. 12, the "early reading/later reading identification information" (identification information PDSEL) switches 0 and 1 every 2hd (that is, two horizontal scanning periods). The "column signal line identification information" (identification information CSLSEL) repeats 1, 2, 1, 2, 3, 4, 3, 4 every 8hd (that is, eight horizontal scanning periods). The "column circuit identification information" (identification information CCSEL) repeats 1, 2 every 2hd (that is, two horizontal scanning periods). Accordingly, there are eight types of readout conditions in total, and the number of sets of second correction values to be generated by the second correction value generation unit 706 is eight. However, when focusing only on the "early reading/later reading identification information" (identification information PDSEL) and the "column circuit identification information" (identification information CCSEL), there are four types of readout conditions in total, so that the number of sets of second correction values to be generated by the second correction value generation unit 706 can be four.

In the operation mode exemplarily shown in FIG. 13, the "early reading/later reading identification information" (identification information PDSEL) continues 0. The "column signal line identification information" (identification information CSLSEL) repeats 3, 4, 3, 4, 1, 2, 1, 2 every 8hd (that is, eight horizontal scanning periods). The "column circuit identification information" (identification information CCSEL) repeats 1, 2 every 2hd (that is, two horizontal scanning periods). Accordingly, there are two types of readout conditions, and the number of sets of second correction values to be generated by the second correction value generation unit 706 is two.

Figure 14:
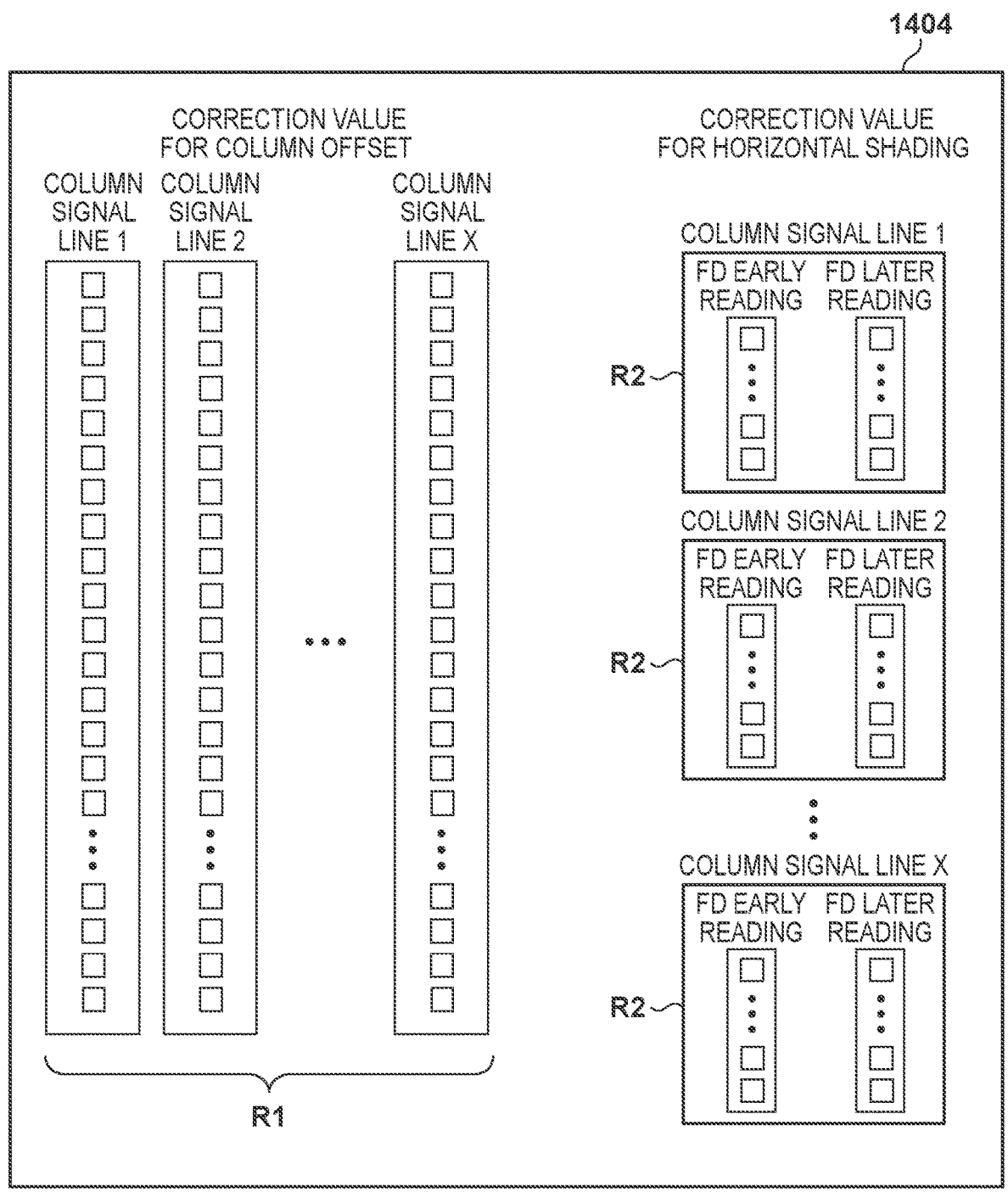
FIG. 14 is a view exemplarily showing the arrangement of a holding unit in the photoelectric conversion apparatus according to the third embodiment.

FIG. 14 shows an arrangement example of a holding unit 404. The holding unit 404 includes one first region R1 for storing the first correction value, and a plurality of second regions R2 for storing the second correction values. The number of the plurality of second regions R2 can follow the number of readout conditions.

As has been described above, in accordance with the correction value corresponding to various redout conditions including, in addition to the photoelectric conversion element serving as the readout target in the pixel unit, the designations of the column signal line and column circuit to be used for readout, and the like, horizontal shading can be corrected. When the floating diffusion is shared by the first photoelectric conversion element and second photoelectric conversion element for distance measurement, horizontal shading may be corrected in accordance with the correction value corresponding to the signal readout method. As the readout method in this case, there can be three types of readout methods, that is, a method of reading out signals from the first photoelectric conversion element, a method of reading out signals from the second photoelectric conversion element, and a method of reading out signals from the first and second photoelectric conversion elements. Horizontal shading may be corrected in accordance with a correction value for each color.

Figure 16A:
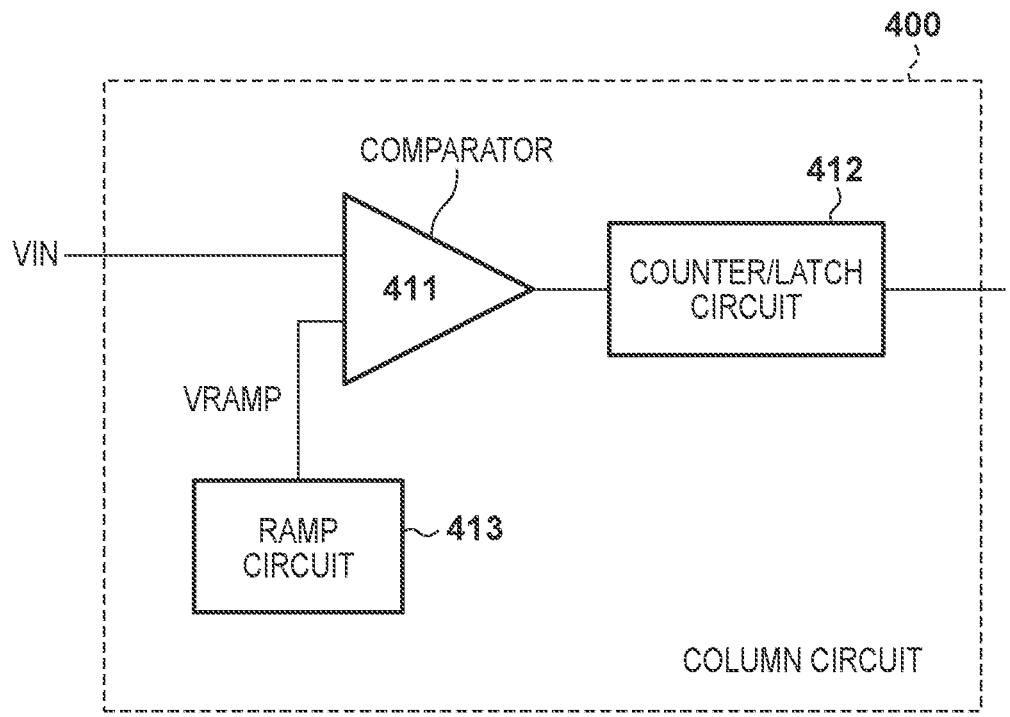
FIGS. 16A and 16B are views for explaining an arrangement example and the operation principle of a readout circuit.

A photoelectric conversion apparatus 100 according to the fourth embodiment will be described below. Matters not mentioned as the fourth embodiment can follow the first to third embodiments. First, with reference to FIGS. 16A and 16B, the arrangement and principle of A/D conversion performed by a readout circuit 105 will be exemplarily described. The readout circuit 105 includes, for each column, a column circuit 400 including an A/D converter, and the A/D converter can include a comparator 411, a counter/latch circuit 412, and a ramp circuit 413 as exemplarily shown in FIG. 16A. The ramp circuit 413 is a circuit that generates or outputs a reference signal VRAMP (ramp signal) which changes at a constant change rate (time change rate), that is, changes with a constant slope. The comparator 411 compares a signal VIN output from a pixel array 101 to a column signal line 110 with the reference signal VRAMP output from the ramp circuit 413, and outputs the comparison result.

Figure 16B:
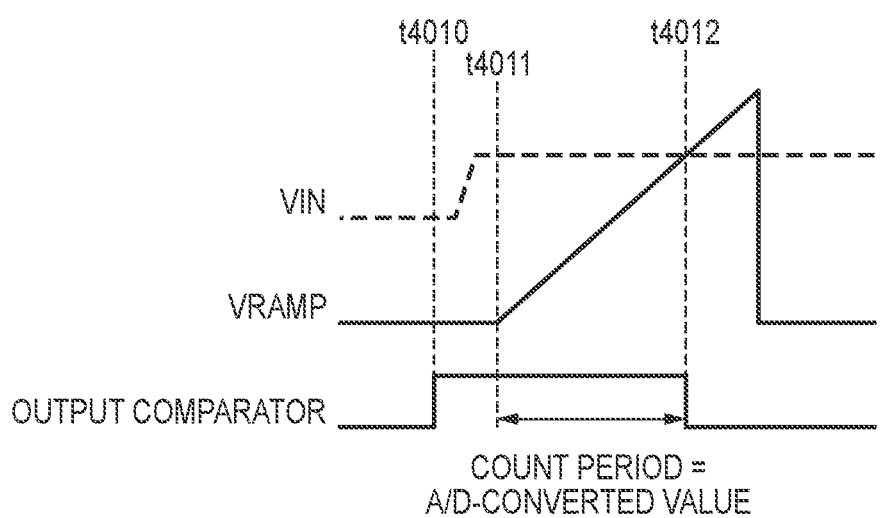

As exemplarily shown in FIG. 16B, prior to the start of readout of the signal VIN output from the pixel array 101, the operation of the comparator 411 is started (time t4010). Once the signal VIN output from the pixel array 101 stabilizes, the count value of the counter/latch circuit 412 is reset at time t4011. In synchronization with the timing of reset of the count value of the counter/latch circuit 412, the level of the reference signal VRAMP output from the ramp circuit 413 increases along with the time elapse from time t4011. If the level of the reference signal VRAMP output from the ramp circuit 413 exceeds the optical signal level of the signal VIN output from the pixel array 101, the output of the comparator 411 is inverted (time t4012). The counter/latch circuit 412 performs a count operation in the period (time t4011 to time t4012) from the reset of the count value to the inversion of the output of the comparator 411. With this operation, the count value proportional to the level of the signal output from the pixel array 101 can be obtained, and the obtained count value serves as the result of A/D conversion. Note that the method of comparing the signal from the pixel array 101 with the reference signal, the comparison method by the counter/latch circuit, and the like described here are merely examples, and other methods may be used as long as the period from the reset of the count value to the inversion of the output of the comparator 411 can be detected.

Figure 17:
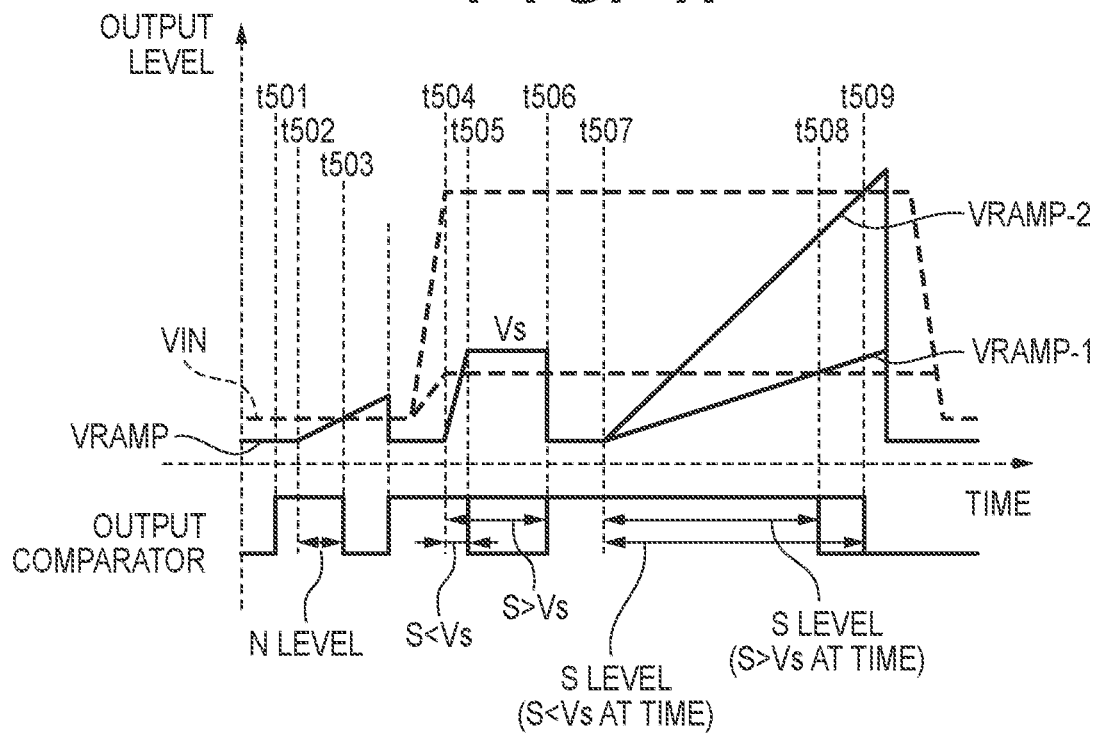
FIG. 17 is a view exemplarily showing the operation of a column circuit of a photoelectric conversion apparatus according to the fourth embodiment.

FIG. 17 exemplarily shows the operation of one column circuit 400 in the readout circuit 105 according to the fourth embodiment. In FIG. 17, the abscissa exemplarily represents time, the ordinate in the upper stage exemplarily represents the level of the reference signal and the level of the signal from the pixel array 101, and the ordinate in the lower stage exemplarily represents the output of the comparator 411. Here, an example will be described in which the change rate (slope) of the reference signal VRAMP output from the ramp circuit 413 is changed in accordance with the level of the signal VIN output from the pixel array 101. The ramp circuit 413 can selectively generate or output a first reference signal VRAMP-1 which changes at a first change rate, a second reference signal VRAMP-2 which changes at a second change rate whose change rate (slope) is larger than the first range rate, and a determination reference signal.

First, in order to perform A/D conversion of the noise level (N level), the operation of the comparator 411 is started at time t501. The count of the counter/latch circuit 412 is reset at time t502, and the level of the reference signal VRAMP output from the ramp circuit 413 is changed at the first change rate. Since the noise level is small, the first reference signal VRAMP-1 (first ramp signal) having a small slope is used for A/D conversion of the noise level. The counter/latch circuit 412 performs the count operation in the period (time t502 to time t503) from the reset of the count to the inversion of the output of the comparator 411. With this, the noise level is A/D-converted.

Then, in the level determination period, the column circuit 400 determines the optical signal level which is the signal corresponding to electric charges accumulated in a photoelectric conversion element 201 in the pixel unit 102 in the pixel array 101. In the level determination period, the ramp circuit 413 outputs, to the comparator 411, the determination reference signal with a determination level Vs as the maximum level. The determination level Vs is a threshold value for determination. The comparator 411 compares the signal VIN output from the pixel array 101 with the determination reference signal. Here, the count value of the counter/latch circuit 412 is reset at time t504, and the ramp circuit 413 starts to output the determination reference signal. If the level (optical signal level) of the signal VIN output from the pixel array 101 is larger than the determination level Vs (S>Vs), the output of the comparator 411 is not inverted, so that the count value continues to increase until the level determination period ends at time t506. On the other hand, if the level of the signal VIN output from the pixel array 101 is smaller than the determination level Vs (S<Vs), for example, the output of the comparator 411 is inverted at time t505, so that the count value stops increasing. In this manner, based on the count value of the counter/latch circuit 412, the column circuit 400 can determine whether the optical signal level is larger or smaller than the determination level Vs.

The column circuit 400 supplies the result of determination as to whether the optical signal level is larger or smaller than the determination level Vs to a memory unit 106 as luminance determination information (luminance determination information LL to be described later). The luminance determination information is stored in the memory 106 while being associated with the digital signal generated by the column circuit 400. The luminance determination information can be, for example, information which has a value 1 (=high) if the optical signal level (S) is larger than the determination level Vs (S>Vs), and has a value 0 (=low) if the optical signal level is smaller than the determination level Vs (S<Vs). Note that it may be controlled such that the timing of resetting the count value of the counter/latch circuit 412 is the time at which the output of the ramp circuit 413 stabilizes at the determination level Vs, and the count value becomes 0 if the optical signal level (S) is smaller than the determination level Vs (S<Vs).

If the optical signal level (S) is smaller than the determination level Vs (S<Vs), from time t507, the optical signal level can be A/D-converted using the first reference signal VRAMP-1 as in A/D conversion of the noise level. With this, in the example shown in FIG. 17, the count value can be obtained in the period from time t507 to time t508. On the other hand, if the optical signal level (S) is larger than the determination level Vs, the optical signal level can be A/D-converted using the second reference signal VRAMP-2 which changes at the second change rate that is a times the first change rate of the first reference signal VRAMP-1. With this, in the example shown in FIG. 17, the count value can be obtained in the period from time t507 to time t509. Here, the first change rate of the first reference signal VRAMP-1 and the second change rate of the second reference signal VRAMP-2 can be understood as the gains of readout by the readout circuit 105, and correspond to the first gain and the second gain, respectively. That is, readout of the signal from the pixel array 101 using the first reference signal VRAMP-1 corresponds to readout of the signal from the pixel array 101 with the first gain. Further, readout of the signal from the pixel array 101 using the second reference signal VRAMP-2 corresponds to readout of the signal from the pixel array 101 with the second gain.

Figure 18:
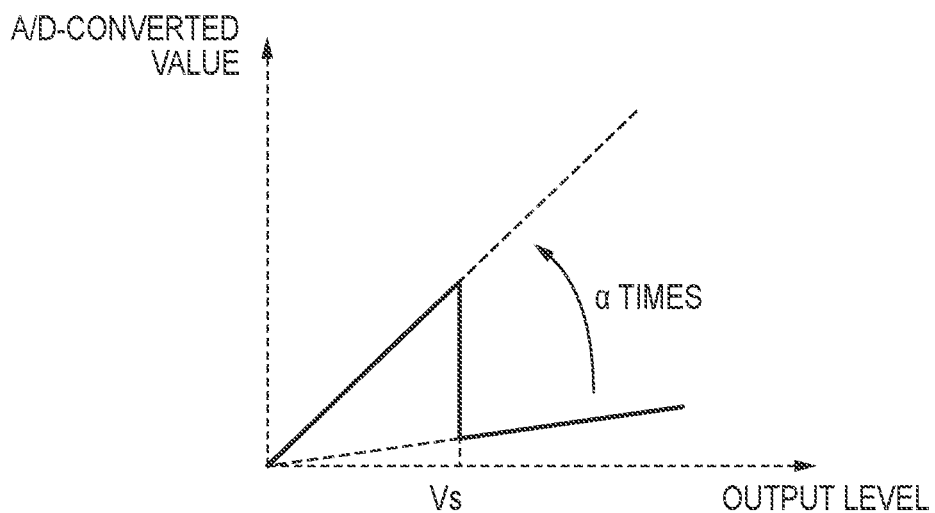
FIG. 18 is a view exemplarily showing the relationship between an optical signal level and the result of A/D conversion in a case in which the change rate of a reference signal is changed.

FIG. 18 exemplarily shows the relationship between the optical signal level and the result of A/D conversion in a case in which the change rate (slope) of the reference signal is changed in accordance with the optical signal level. The abscissa of FIG. 18 represents the optical signal level output from the pixel array 101, and the ordinate represents the result (A/D-converted value) of A/D conversion of the optical signal level. The solid line indicates the digital value (A/D-converted value) having undergone A/D conversion by the comparator 411 and the counter/latch circuit 412 and supplied to a signal processing unit 108 via a horizontal scanning unit 107. As has been described above, the optical signal level having a value smaller than the determination level Vs is A/D-converted using the first reference signal VRAMP-1, and the optical signal level having a value larger than the determination level Vs is A/D-converted using the second reference signal VRAMP-2. Therefore, as shown in FIG. 18, the optical signal level after A/D conversion becomes discontinuous before and after the determination level Vs.

That is, if a column offset correction unit 402 and a horizontal shading correction unit 403 perform correction without distinguishing between the optical signal level larger than the determination level Vs and the optical signal level smaller than the determination level Vs, the column variation and horizontal shading may not be appropriately removed. Note that in the following description, for the sake of descriptive convenience, the optical signal level larger than the determination level Vs is determined to be high luminance, and the optical signal level smaller than the determination level Vs is determined to be low luminance. In order to effectively correct the column variation and horizontal shading, it is preferable to perform correction in accordance with a correction value for high luminance and a correction value for low luminance. The gain, of a plurality of gains, to be used by the readout circuit 105 for readout from the pixel array 101 can be understood as one of the readout conditions.

Figure 19:
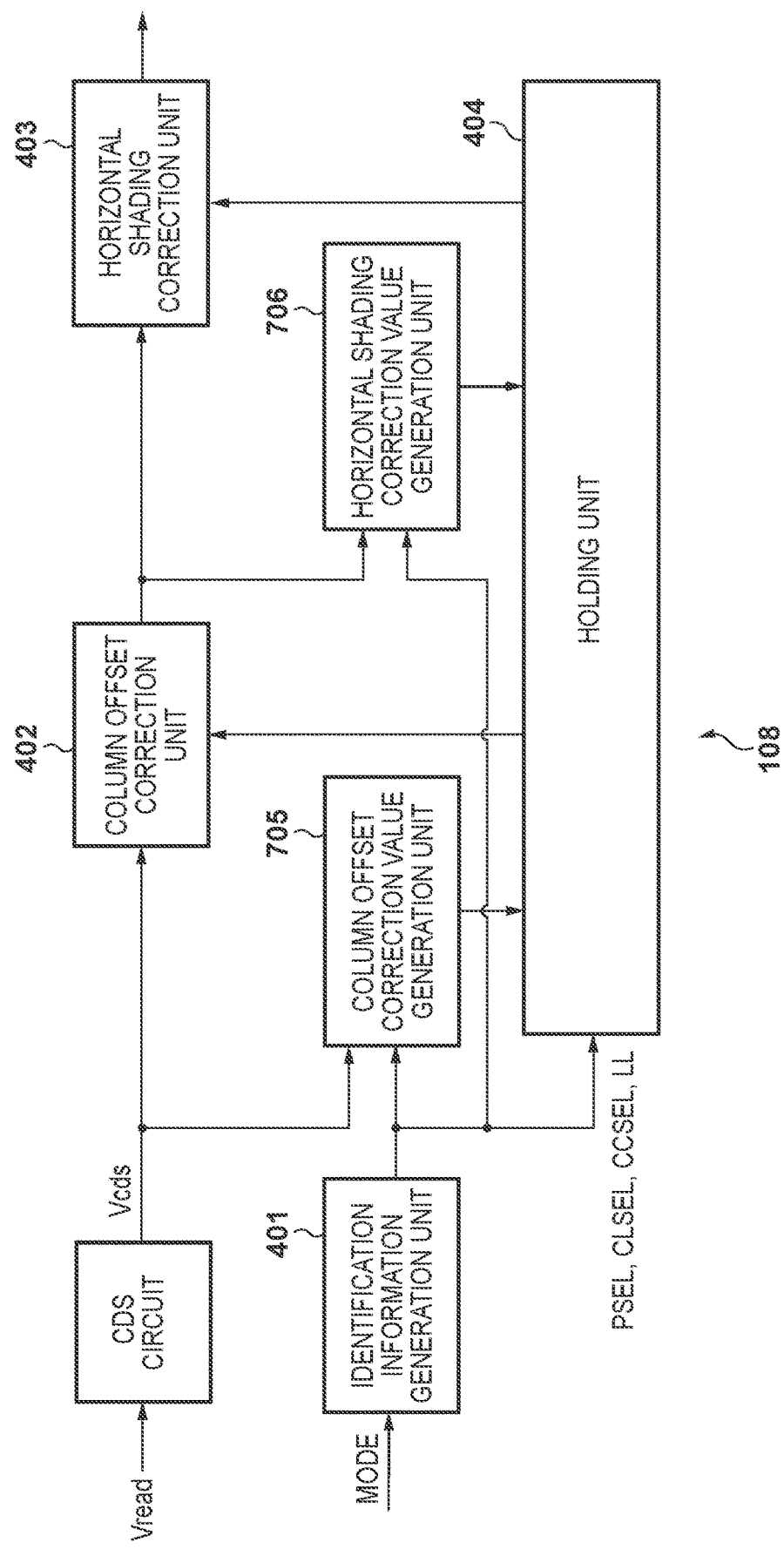
FIG. 19 is a view exemplarily showing the arrangement of a signal processing unit in the photoelectric conversion apparatus according to the fourth embodiment.

FIG. 19 exemplarily shows the arrangement of the signal processing unit 108 in the photoelectric conversion apparatus 100 according to the fourth embodiment. In the fourth embodiment, an identification information generation unit 401 generates the luminance identification information LL, in addition to pieces of identification information PDSEL, CSLSEL, and CCSEL, in accordance with the drive mode given by a drive mode MODE. Luminance determination is performed for each pixel signal, and the luminance identification information LL is generated for each pixel signal. If it is determined to be high luminance, luminance identification information=1 can be set. If it is determined to be low luminance, luminance identification information=0 can be set.

FIG. 20 shows an arrangement example of a holding unit 404 according to the fourth embodiment. The holding unit 404 includes one first region R1 for storing the first correction value, and a plurality of second regions R2 for storing the second correction values. The number of the plurality of second regions R2 can follow the number of readout conditions. The first correction value for low luminance and the first correction value for high luminance can be stored in the first region R1. Alternatively, if correction of the column offset is performed without distinguishing between low luminance and high luminance, the first correction value (for example, the correction value for high luminance) common to low luminance and high luminance can be stored in the first region R1.

Figure 21A:
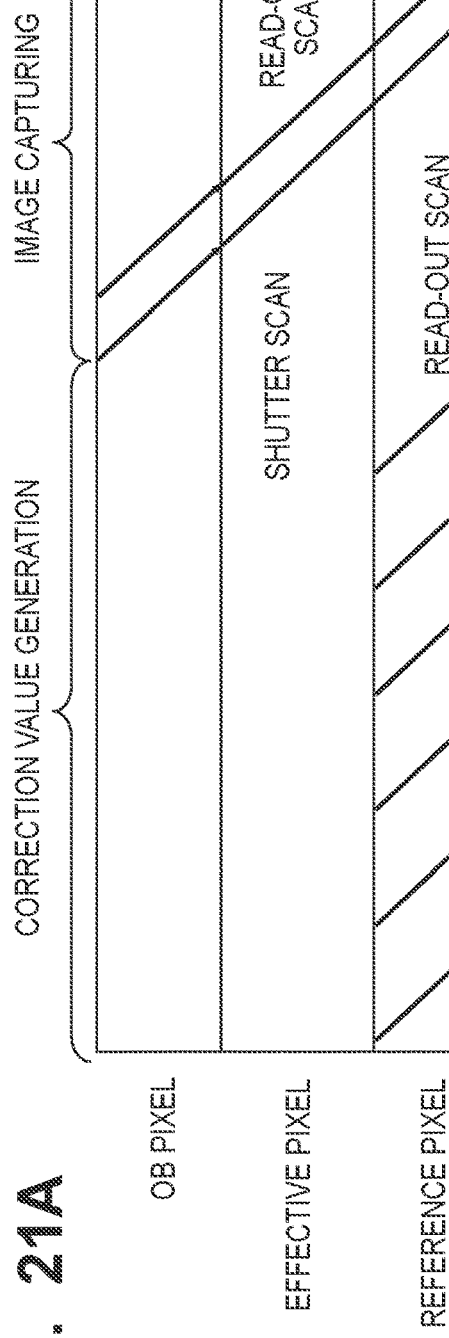
FIGS. 21A and 21B are views exemplarily showing the sequence of a correction value generation operation and an image capturing operation in the photoelectric conversion apparatus according to the fourth embodiment.
Figure 21B:
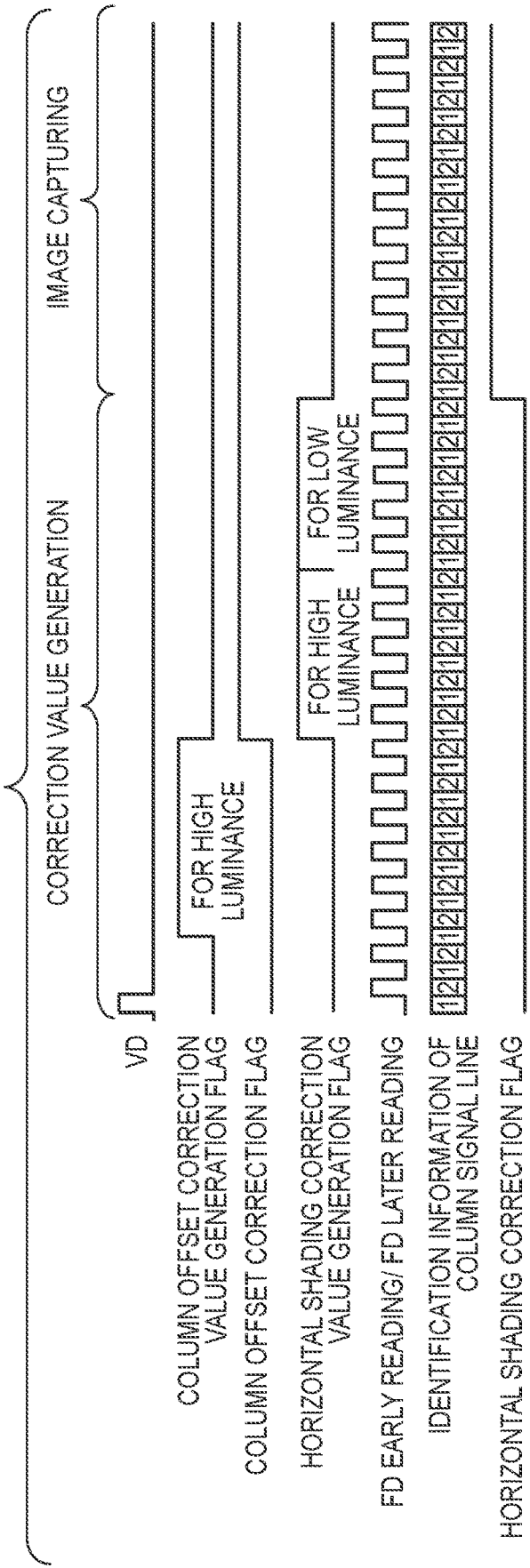

FIGS. 21A and 21B exemplarily show the sequence of a correction value generation operation and an image capturing operation. In the correction value generation operation, the readout circuit 105 sequentially reads out signals from the reference pixels in the plurality of columns of the pixel array 101, and a first correction value generation unit 705 and a second correction value generation unit 706 generate the first correction value and the second correction value, respectively. In the image capturing operation, the readout circuit 105 reads out signals from the plurality of pixel units 102 in the pixel array 101, and the signal processing unit 108 processes the signals. In the signal processing unit 108, signals (optical signal level and noise level) read out from the pixel array 101 by the readout circuit 105 undergo the CDS process by the CDS circuit 405, and corrected by the column offset correction unit 402 and the horizontal shading correction unit 403. Here, the second correction value generation unit 706 generates the second correction value for high luminance and the second correction value for low luminance. The second correction value for high luminance can be generated by reading out signals from the reference pixel by the readout circuit 105 with the second gain. The second correction value for low luminance can be generated by reading out signals from the reference pixel by the readout circuit 105 with the first gain.

Figure 22:
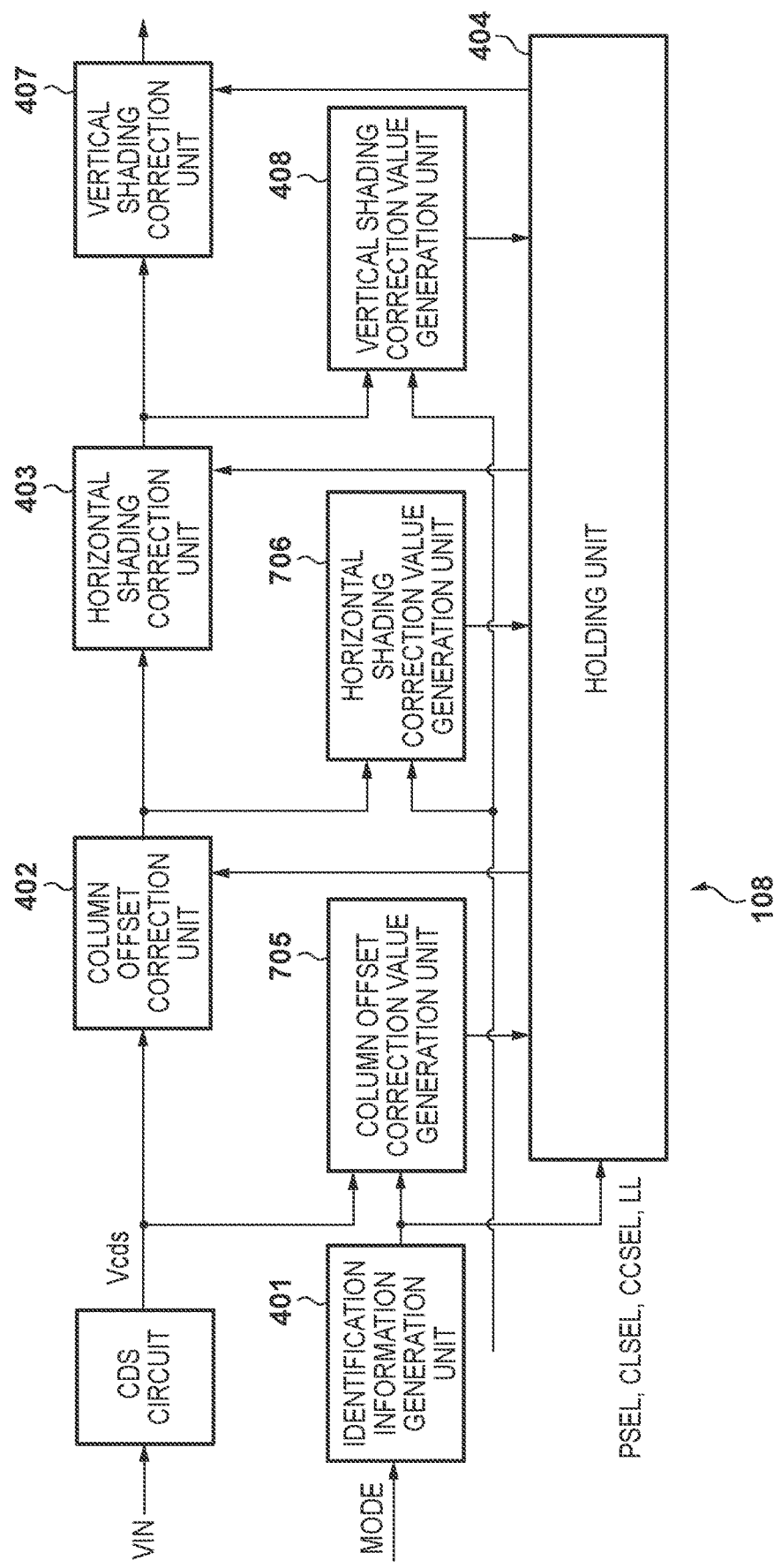
FIG. 22 is a view exemplarily showing the arrangement of a signal processing unit in a photoelectric conversion apparatus according to the fifth embodiment.
Figure 23:
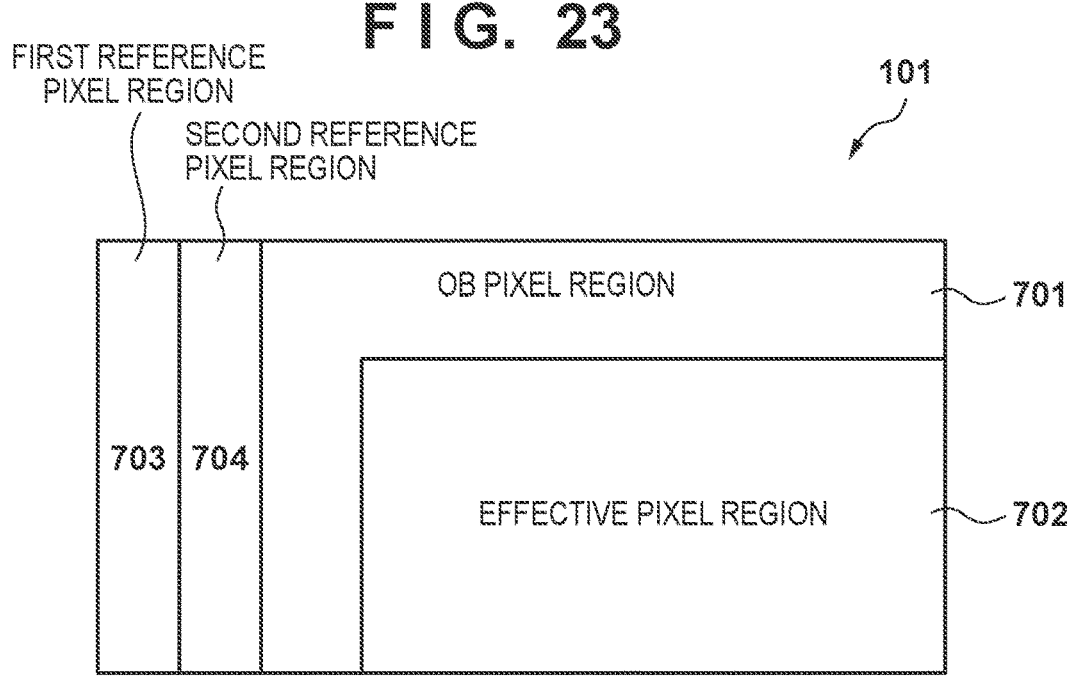
FIG. 23 is a view exemplarily showing the arrangement of a pixel array in the photoelectric conversion apparatus according to the fifth embodiment.

With reference to FIGS. 22 and 23, a photoelectric conversion apparatus 100 according to the fifth embodiment will be described below. Matters not mentioned as the fifth embodiment can follow, for example, the fourth embodiment. In the fifth embodiment, in addition to correction of the column variation and horizontal shading, vertical shading is corrected.

FIG. 22 exemplarily shows the arrangement of a signal processing unit 108 in the photoelectric conversion apparatus 100 according to the fifth embodiment. In the fifth embodiment, a third correction value generation unit 408 (vertical shading correction value generation unit) and a vertical shading correction unit 407 are added to the arrangement shown in FIG. 19. The third correction value generation unit 408 can be configured to generate the third correction value for correcting vertical shading.

FIG. 23 exemplarily shows the arrangement of a pixel array 101. The pixel array 101 includes an effective pixel region 702 for generating a pixel signal or an image signal by photoelectric conversion. The effective pixel region 702 is a region where a plurality of pixel units (effective pixel units) 102 are arranged so as to form a plurality of rows and a plurality of columns. The pixel array 101 can further include a first reference pixel region 703 and a second reference pixel region 704. In the reference pixel regions 703 and 704, a plurality of reference pixel units, each of which outputs a noise level, can be arranged. In the first reference pixel region 703, multiple reference pixel units can be arranged so as to form at least one column, and preferably a plurality of columns. Similarly, in the second reference pixel region 704, multiple reference pixel units can be arranged so as to form at least one column, and preferably a plurality of columns. The reference pixel unit can have an arrangement obtained by, for example, removing a plurality of photoelectric conversion elements from the pixel unit 102. The reference pixel unit can be used to generate a correction value for removing or reducing the influence of vertical shading. The first reference pixel region 703 can be used to generate the third correction value for correcting the pixel signal output from the pixel unit 102 which has output an optical signal level smaller than a determination level Vs, and having undergone a CDS process. The second reference pixel region 704 can be used to generate the third correction value for correcting the pixel signal output from the pixel unit 102 which has output an optical signal level larger than the determination level Vs, and having undergone a CDS process.

The third correction value may be generated and stored for each row, or may be generated and stored for each group composed of at least two rows. The third correction value for low luminance can be generated using the result obtained by performing noise removal and appropriate filter processing on the signal read out from the first reference pixel region 703.

The pixel array 101 can further include an Optical Black (OB) pixel region 701. A plurality of OB pixel units, each of which outputs an OB level, are arranged in the OB pixel region 701. The OB pixel unit can be, for example, a pixel having the same arrangement as the pixel unit 102 but covered with a light shielding film. The OB pixel region 701 can include a plurality of OB pixel units connected to a plurality of column signal lines 110 arranged in the effective pixel region 702, and a plurality of OB pixel units connected to a plurality of row selection lines 109 arranged in the effective pixel region 702.

The signal processing unit 108 may include an OB clamp processing unit. The OB clamp processing unit can correct an image signal based on OB data. The OB data can be, for example, data read out from the plurality of OB pixels in the OB pixel region 701 by a readout circuit 105 and having undergone a CDS process by a CDS circuit, or data obtained by further processing the CDS-processed data.

Figure 24:
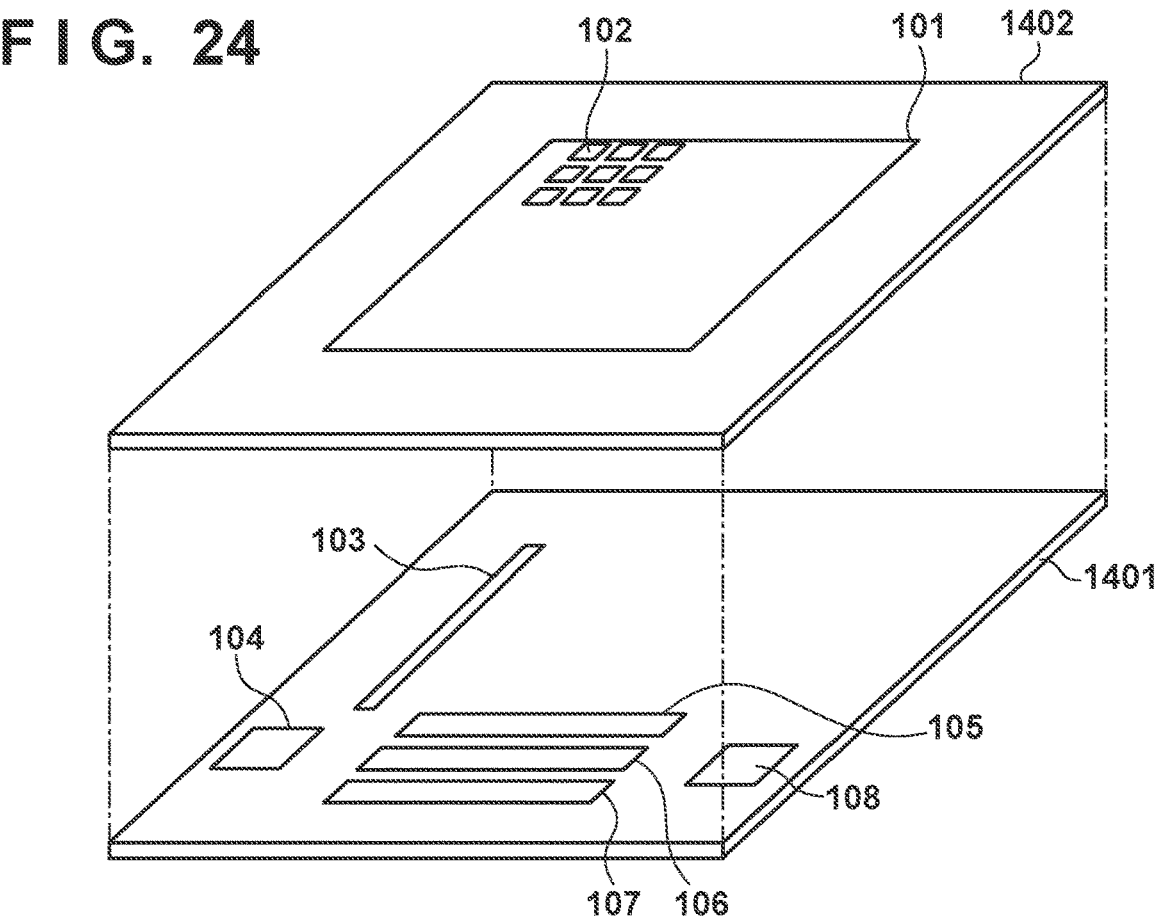
FIG. 24 is a view exemplarily showing the structure of the photoelectric conversion apparatus.

FIG. 24 shows an example of the structure of the photoelectric conversion apparatus 100 exemplarily described through the above-described embodiments. The photoelectric conversion apparatus 100 may include a first substrate 1401 and a second substrate 1402. Each of the first substrate 1401 and the second substrate 1402 can be formed by processing, for example, a semiconductor substrate such as a silicon substrate. On the first substrate 1401, for example, the signal processing unit 108, the vertical scanning unit 103, the control unit 104, the readout circuit 105, the memory unit 106, the horizontal scanning unit 107, and the like can be arranged. On the second substrate 1402, for example, the pixel array 101 including the OB pixel region 701, the effective pixel region 702, and the reference pixel region 703 can be arranged. As exemplarily shown in FIG. 24, at least a part of the first substrate 1401 and at least a part of the second substrate 1402 can be stacked. With the arrangement as described above, when manufacturing the photoelectric conversion apparatus 100, it is possible to apply a process suitable for each of an analog portion including the pixel array 101 and a logic portion including the signal processing unit 108.

Figure 25:
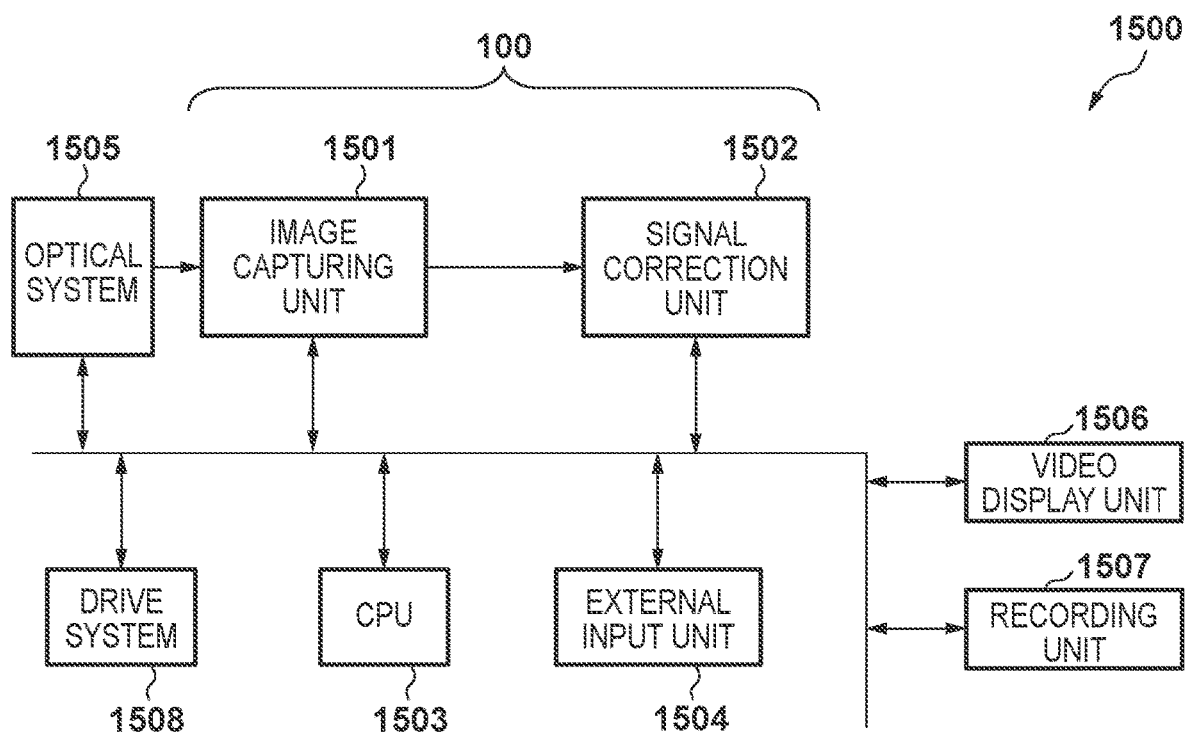
FIG. 25 is a view exemplarily showing the arrangement of an image capturing apparatus.

FIG. 25 exemplarily shows the arrangement of an image capturing apparatus 1500 incorporating the photoelectric conversion apparatus 100. The image capturing apparatus 1500 can include an image capturing unit 1501, a signal correction unit 1502, a CPU 1503, an external input unit 1504, an optical system 1505, a video display unit 1506, a recording unit 1507, and a drive system 1508. In an example, the image capturing unit 1501 is a functional block which includes the pixel array 101, the vertical scanning unit 103, the control unit 104, the readout circuit 105, the memory unit 106, and the horizontal scanning unit 107. Such the image capturing unit 1501 may be understood as a photoelectric conversion apparatus. Alternatively, the image capturing unit 1501 may be the photoelectric conversion apparatus 100 including the signal processing unit 108 described above. In an example, the signal correction unit 1502 can include the signal processing unit 108 described above.

In the pixel array 101 of the image capturing unit 1501, an optical image is formed by the optical system 1505. The image capturing unit 1501 outputs an image signal corresponding to the optical image by photoelectric conversion. The signal correction unit 1502 corrects the image signal output from the image capturing unit 1501, and outputs the corrected image signal to the video display unit 1506 and/or the recording unit 1507. The CPU 1503 controls the respective components in the image capturing unit 1500. The drive system 1508 can, for example, drive the focusing lens of the optical system 1505 and drive the aperture. The external input unit 1504 can include various kinds of buttons and the like used by a user to input an image capturing condition and perform a shutter operation. The video display unit 1506 may be a touch panel. In this case, the video display unit 1506 can function as the external input unit 1504 (a part thereof).

The present invention can also be implemented by executing the following process. That is, software (program) for implementing the above-described functions may be supplied to the system or apparatus via a network or various kinds of storage media. One or more processors (for example, a CPU and an MPU) in the computer of the system or apparatus can read out and execute the software (program). Alternatively, the above-described function can also be implemented by a circuit (for example, ASIC) having a fixed function, or a function definable circuit (for example, FPGA).

Second Disclosure

A photoelectric conversion apparatus is demanded to have a large number of pixels and a high frame rate. In order to satisfy the demand, one of challenges is to increase the readout speed of signals by the photoelectric conversion apparatus. In addition to increasing the readout speed, there is also a strong demand for improvement of the S/N ratio and expansion of the dynamic range. There is known a photoelectric conversion apparatus that performs analog-to-digital (A/D) conversion, using different A/D converter circuits, of a first pixel signal obtained by amplifying a pixel signal with a first gain and a second pixel signal obtained by amplifying the pixel signal with a second gain different from the first gain. The photoelectric conversion apparatus selectively outputs one of the VD-converted first pixel signal and the VD-converted second pixel signal in accordance with the level of the pixel signal. With this, it is possible to implement expansion of the dynamic range and improvement of the S/N ratio. Japanese Patent Laid-Open No. 2014-140152 discloses a technique of correcting the offset error and the gain error generated when selectively outputting the first pixel signal and the second pixel signal.

It is known that the S/N ratio is improved by a Correlated Double Sampling (CDS) process in which the optical signal level and noise level generated by photoelectric conversion are read out from a pixel, and a pixel signal corresponding to the difference between the optical signal level and the noise level is generated. However, if the gain used when reading out the optical signal level is different from the gain used when reading out the noise level, a noise component can remain in the pixel signal generated by the CDS process.

The invention according to the second disclosure is aimed to provide a technique advantageous in effectively removing a noise component from a pixel signal.

One aspect of the invention according to the second disclosure relates to a photoelectric conversion apparatus comprising a pixel array including an effective pixel, a readout circuit configured to read out signals of the pixel array, and a signal processing unit configured to perform a correlated double sampling process and a correction process on signals read out from the effective pixel in the pixel array by the readout circuit, wherein the readout circuit has a function of reading out a signal of the pixel array with a first gain, and a function of reading out a signal of the pixel array with a second gain different from the first gain, and a correction value for the correction process is generated based on a difference between a signal read out from the pixel array with the first gain by the readout circuit in a state in which a noise level is output from the pixel array, and a signal read out from the pixel array with the second gain by the readout circuit in a state in which a noise level is output from the pixel array.

With reference to FIGS. 26 to 35, a photoelectric conversion apparatus A100 according to the first embodiment of the second disclosure will be described below. The photoelectric conversion apparatus A100 may be composed of a chip formed by one semiconductor layer or semiconductor substrate, may be composed of a chip formed by a plurality of semiconductor layers or semiconductor substrates, or may be composed of a plurality of chips. The photoelectric conversion apparatus A100 can be formed as an image sensor or an apparatus including an image sensor.

Figure 26:
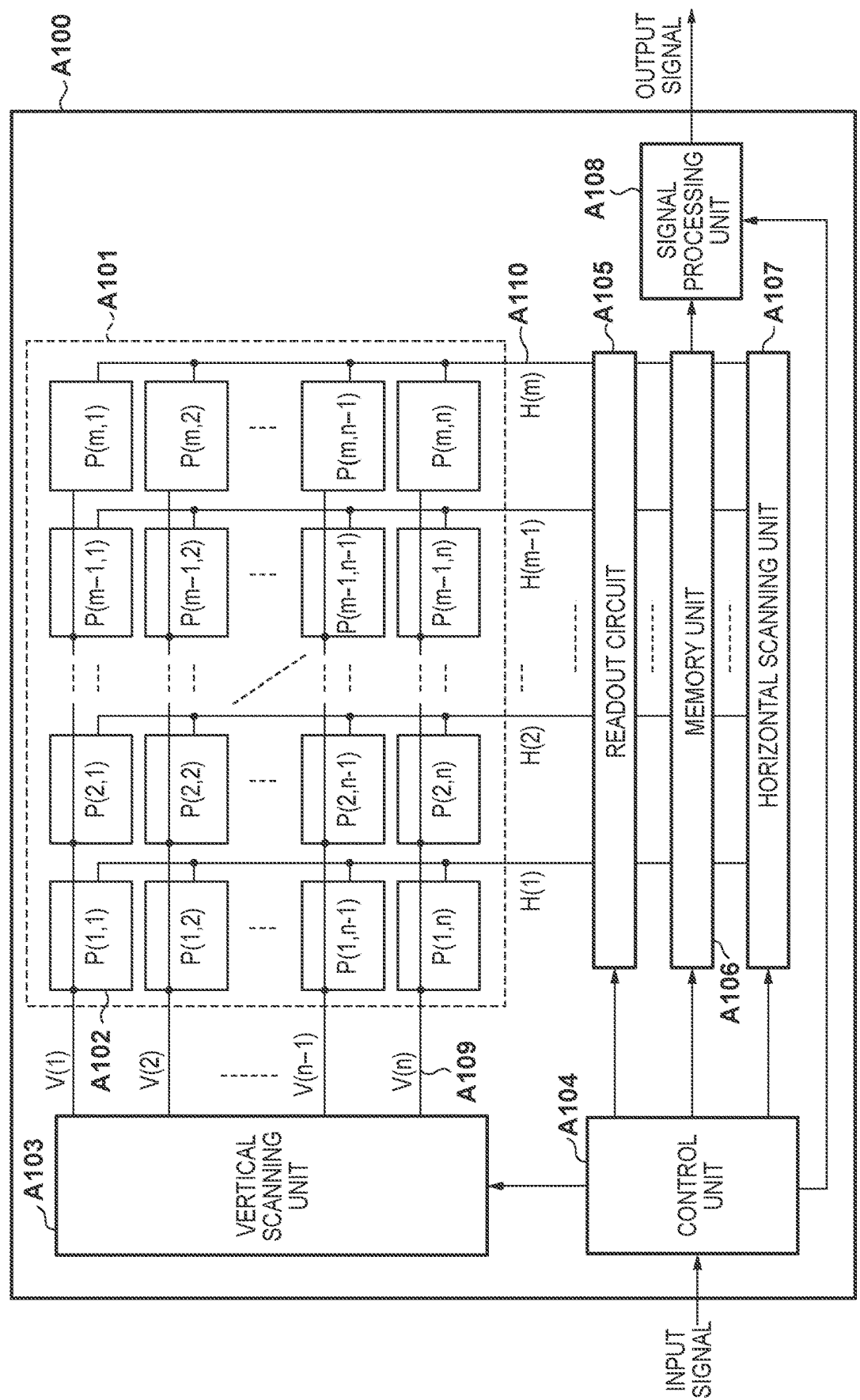
FIG. 26 is a view exemplarily showing the arrangement of a photoelectric conversion apparatus according to the first embodiment of the second and third disclosures.

FIG. 26 exemplarily shows the arrangement of the photoelectric conversion apparatus A100 according to the first embodiment of the second disclosure. The photoelectric conversion apparatus A100 can include a pixel array A101 which includes a plurality of pixels A102 arranged so as to form a plurality of rows and a plurality of columns. In order to distinguish the pixel A102 from a reference pixel and an OB pixel to be described later, the pixel A102 can also be referred to as an effective pixel. The pixel array A101 can include a plurality of column signal lines A110. Each column of the pixel array A101 can be assigned with at least one column signal line A110. The photoelectric conversion apparatus A100 can also include a readout circuit A105 that reads out signals of the pixel array A101. The readout circuit A105 can have a function of reading out a signal of the pixel array A101 with a first gain, and a function of reading out a signal of the pixel array A101 with a second gain different from the first gain. The readout circuit A105 may be understood to have a function of reading out signals of the pixel array A101 with a plurality of gains different from each other. The readout circuit A105 can include a plurality of column circuits, and each column circuit can be configured to read out signals of the pixel array A101 through at least one column signal line A110.

The photoelectric conversion apparatus A100 can include a signal processing unit A108 that performs a correlated double sampling process (CDS process) and a correction process on signals read out from the pixel A102 (effective pixel) in the pixel array A101 by the readout circuit A105. The photoelectric conversion apparatus A100 can further include a vertical scanning unit A103, a control unit A104, and a horizontal scanning unit A107. In an arrangement example, the signal processing unit A108 can form a part of the photoelectric conversion apparatus A100. In another arrangement example, the signal processing unit A108 does not form a part of the photoelectric conversion apparatus A100. In this case, a system including the photoelectric conversion apparatus A100 and the signal processing unit A108 can be understood as a photoelectric conversion system. In such a photoelectric conversion system, the function of the signal processing unit A108 may be provided by a computer such as a personal computer, may be provided by a processor such as an ASIC, or may be implemented by another arrangement.

In the example shown in FIG. 26, the plurality of pixels A102 forming the pixel array A101 are arranged so as to form a matrix of m columns and n rows. The pixel unit A102 can also be written as a pixel P(i, j) to indicate its position. indicates the column where the pixel P(i, j) is arranged, and j indicates the row where the pixel P(i, j) is arranged. The vertical scanning unit A103 selects one row from n rows by n sets of row selection lines A109 (V(j) (j=1 to n)). Selecting a row means selecting m pixels A102 arranged in the row. The signals of the pixels A102 arranged in the selected row can be read out by the readout circuit A105 via the column signal lines A110 (H(i) (i=1 to m)). Readout by the readout circuit A105 includes a process of converting (that is, A/D-converting) a plurality of analog signals output from the pixels A102 to the column signal lines A110 into a plurality of digital signals in parallel, and the plurality of digital signals are temporarily stored in a memory unit A106. The readout circuit A105 may include an amplification circuit and the like. The amplification circuit can amplify the signal output from the pixel A102. The plurality of digital signals stored in the memory unit A106 can be then sequentially selected by the horizontal scanning unit A107 and supplied to the signal processing unit A108. The signal processing unit A108 processes the digital signals supplied as described above, and outputs signals obtained by the process. The control unit A104 can acquire setting information for setting the image capturing condition and the like in image capturing by the photoelectric conversion apparatus A100, and supply a control signal corresponding to the image capturing condition to each component included in the photoelectric conversion apparatus A100. The control unit A104 can be configured to control the vertical scanning unit A103, the readout circuit A105, the memory unit A106, the horizontal scanning unit A107, and the signal processing unit A108 based on the setting information.

Figure 27:
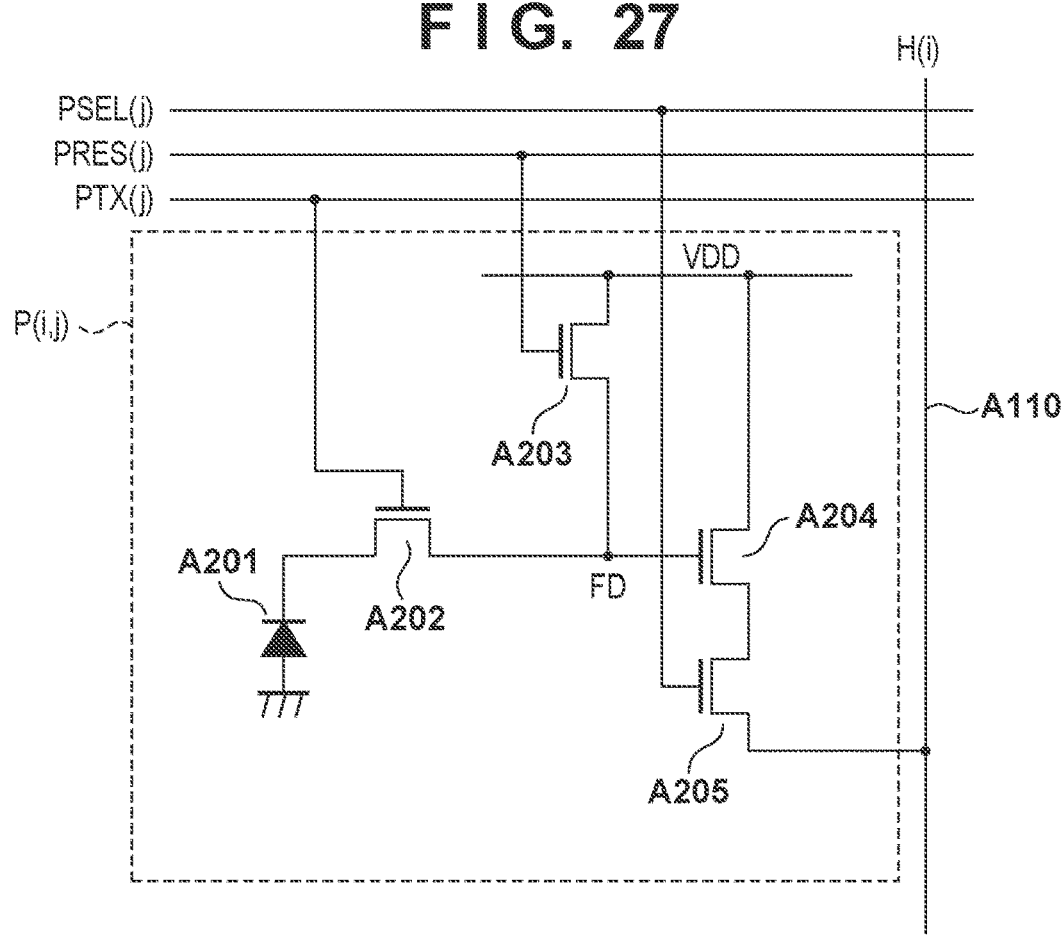
FIG. 27 is a view exemplarily showing the arrangement of a pixel of the second disclosure.

FIG. 27 shows an arrangement example of the pixel A102(P(i, j)). The pixel A102 can include, for example, a photoelectric conversion element A201, a transfer transistor A202, a floating diffusion FD, a reset transistor A203, an amplification transistor A204, and a selection transistor A205. The photoelectric conversion element A201 performs photoelectric conversion, thereby generating electric charges corresponding to the incident light amount. The photoelectric conversion element A201 is, for example, a photodiode. The transfer transistor A202 transfers the electric charges generated by photoelectric conversion in the photoelectric conversion element A201 to the floating diffusion FD. The electric charges transferred to the floating diffusion FD are converted into a potential by an electrostatic capacitance included in the floating diffusion FD. The amplification transistor A204 outputs a signal corresponding to the potential of the floating diffusion FD to the column signal line A110. The reset transistor A203 resets the potential of the floating diffusion FD to a predetermined potential. One row selection line A109 (V(j)) described above includes a transfer control line PTX(j), a reset control line PRES(j), and a row selection line PSEL(j) used to control the transfer transistor A202, the reset transistor A203, and the selection transistor A205, respectively. Note that a transfer control signal, a reset control signal, and a row selection signal respectively supplied to the transfer control line PTX(j), the reset control line PRES(j), and the row selection line PSEL (j) are also identified as PTX(j), PRES(j), and PSEL(j), respectively.

Figure 28:
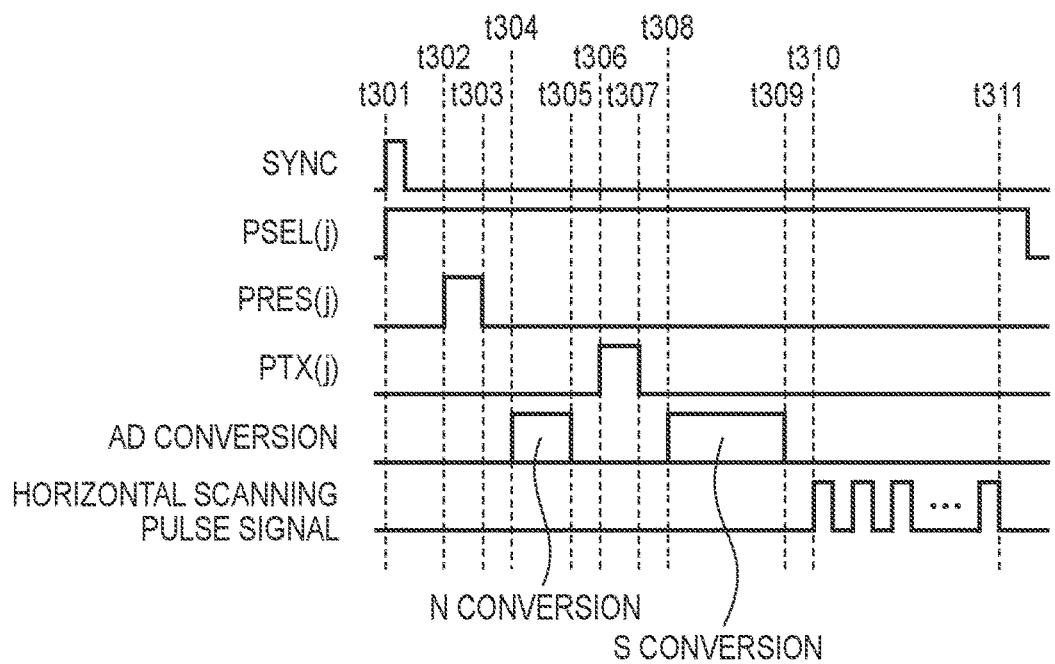
FIG. 28 is a view for explaining a basic readout operation of the photoelectric conversion apparatus according to the first embodiment of the second disclosure.

Next, with reference to FIG. 28, a basic readout operation in the photoelectric conversion apparatus A100 will be described. FIG. 28 exemplarily shows a timing chart of the operation of reading out signals from the pixel array A101. Here, the operation of reading out signals from the pixel A102 in the jth row by the vertical scanning unit A103 is representatively shown. Note that signals shown in FIG. 28 are high-active signals.

At time t301, a horizontal synchronization signal SYNC is activated to high level, and the row selection signal PSEL(j) of the jth row is activated to high level. If the row selection signal PSEL(j) is set at high level, the selection transistor A205 of the pixel A102 in the selected row is set in the ON state, and the pixel A102 in the selected row is electrically connected to the column signal line A110.

At time t302, the reset control signal PRES(j) is activated to high level. This sets the reset transistor A203 of the pixel A102 in the ON state, and the floating diffusion FD is reset to the reset potential corresponding to a power supply potential VDD.

At time t303, the reset control signal PRES(j) is inactivated to low level, and the reset transistor A203 is set in the OFF state. Thus, the reset of the potential of the floating diffusion FD is released. Since the selection transistor A205 is kept in the ON state, a signal corresponding to the gate potential of the amplification transistor A204 at the time of release of the reset of the potential of the floating diffusion FD is output to the column signal line A110. In the period from time t303 to time t306, a noise level (N level) is output from the pixel A102 to the column signal line A110.

In the period from time t304 to time t305, the noise level output to the column signal line A110 can be read out as a digital signal by the readout circuit A105. The digital signal of the noise level read out by the readout circuit A105 is stored in the memory unit A106. The operation performed in the period from time t304 to time t305, that is, the operation of converting the noise level into the digital signal is referred to as N conversion.

At time t306, the transfer control signal PTX(j) is activated to high level. This sets the transfer transistor A202 of the pixel A102 in the ON state, and electric charges generated by photoelectric conversion in the photoelectric conversion element A201 are transferred to the floating diffusion FD. A signal corresponding to the electric charges generated in the photoelectric conversion element A201 is output to the column signal line A110. In the period from time t306 to time t310, an optical signal level (S level) is output from the pixel A102 to the column signal line A110.

At time t307, the transfer control signal PTX(j) is inactivated to low level. This sets the transfer transistor A202 in the OFF state. Even after the transfer transistor A202 is set in the OFF state, the optical signal level continues to be output to the column signal line A110.

In the period from time t308 to time t309, the optical signal level output to the column signal line A110 is read out as a digital signal by the readout circuit A105. The digital signal of the optical signal level read out by the readout circuit A105 is stored in the memory unit A106. The operation performed in the period from time t308 to time t309, that is, the operation of converting the optical signal level into the digital signal is referred to as S conversion.

In the period from time t310 to time t311, in accordance with a horizontal scanning pulse signal output from the horizontal scanning unit A107, a pair of the noise level and the optical signal level held in the memory unit A106 is output from the memory unit A106 to the signal processing unit A108. By repeating the horizontal scanning until the last column, readout of pairs of the noise levels and the optical signal levels of the pixels A102 for one row arranged in the readout target row is completed. The signal processing unit A108 includes a CDS circuit that performs a CDS process of generating a pixel signal by subtracting the noise level from the optical signal level. The CDS circuit outputs a pixel signal having undergone the CDS process.

Figure 29A:
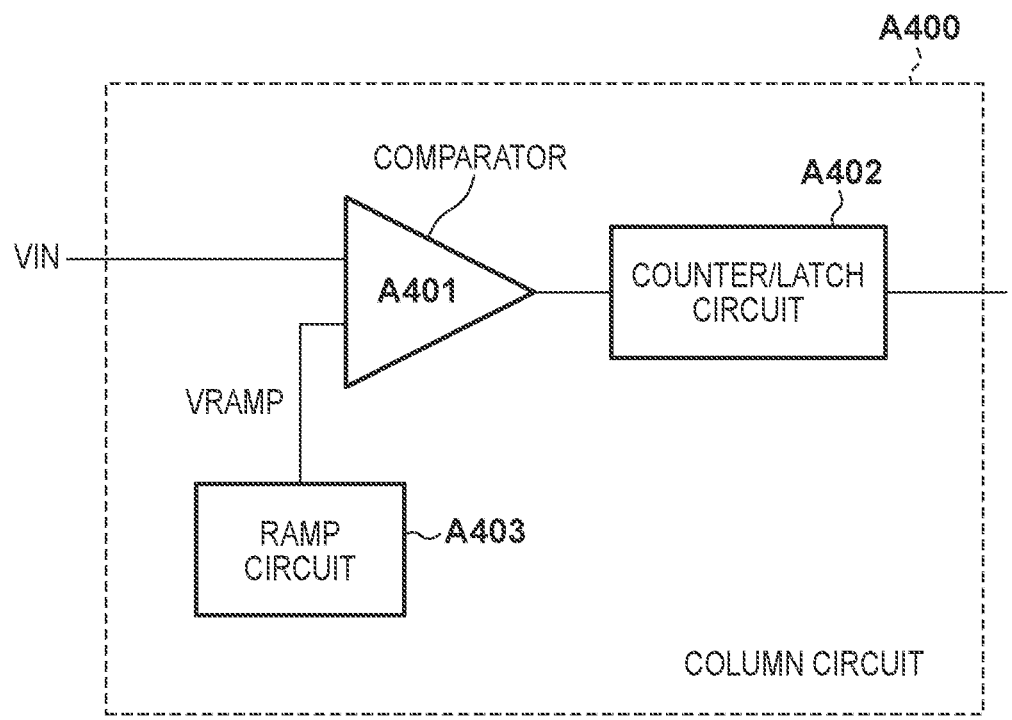
FIGS. 29A and 29B are views for explaining the arrangement and principle of A/D conversion of the second disclosure.
Figure 29B:
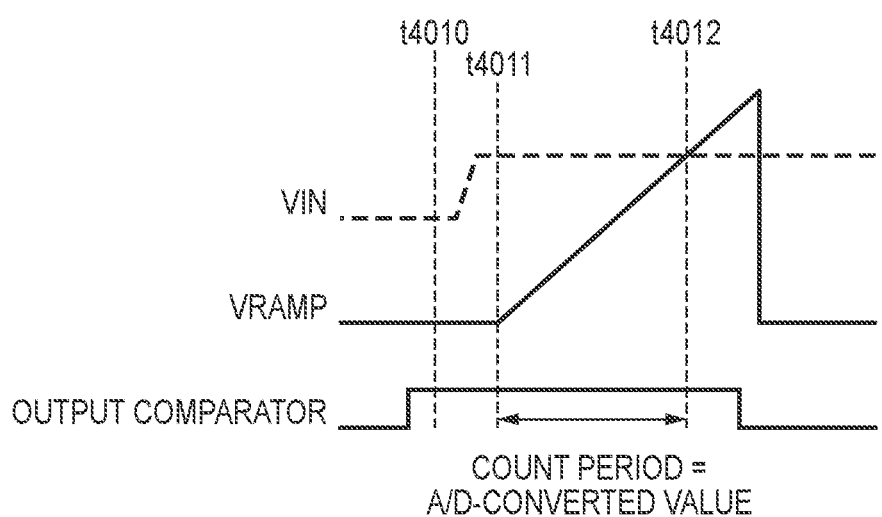

Next, with reference to FIGS. 29A and 29B, the arrangement and principle of A/D conversion performed by the readout circuit A105 will be exemplarily described. The readout circuit A105 includes, for each column, a column circuit A400 including an A/D converter, and the A/D converter can include a comparator A401, a counter/latch circuit A402, and a ramp circuit A403 as exemplarily shown in FIG. 29A. The ramp circuit A403 is a circuit that generates or outputs a reference signal VRAMP (ramp signal) which changes at a constant change rate (time change rate), that is, changes with a constant slope. The comparator A401 compares a signal VIN output from the pixel array A101 to the column signal line A110 with the reference signal VRAMP output from the ramp circuit A403, and outputs the comparison result.

As exemplarily shown in FIG. 29B, prior to the start of readout of the signal VIN output from the pixel array A101, the operation of the comparator A401 is started (time t4010). Once the signal VIN output from the pixel array A101 stabilizes, the count value of the counter/latch circuit A402 is reset at time t4011. In synchronization with the timing of reset of the count value of the counter/latch circuit A402, the level of the reference signal VRAMP output from the ramp circuit A403 increases along with the time elapse from time t4011. If the level of the reference signal VRAMP output from the ramp circuit A403 exceeds the optical signal level of the signal VIN output from the pixel array A101, the output of the comparator A401 is inverted (time t4012). The counter/latch circuit A402 performs a count operation in the period (time t4011 to time t4012) from the reset of the count value to the inversion of the output of the comparator A401. With this operation, the count value proportional to the level of the signal output from the pixel array A101 can be obtained, and the obtained count value serves as the result of A/D conversion. Note that the method of comparing the signal from the pixel array A101 with the reference signal, the comparison method by the counter/latch circuit, and the like described here are merely examples, and other methods may be used as long as the period from the reset of the count value to the inversion of the output of the comparator A401 can be detected.

Figure 30:
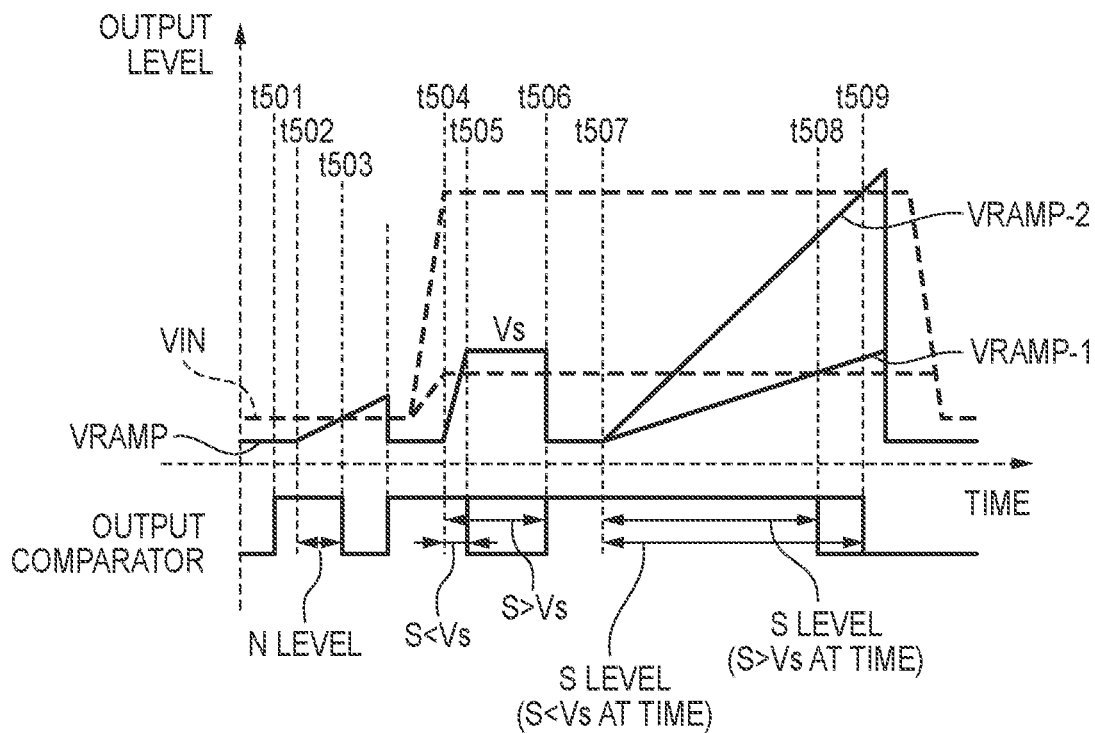
FIG. 30 is a view exemplarily showing the operation of a column circuit in the first embodiment of the second disclosure.

FIG. 30 exemplarily shows the operation of one column circuit A400 in the readout circuit A105 according to the first embodiment of the second disclosure. In FIG. 30, the abscissa exemplarily represents time, the ordinate in the upper stage exemplarily represents the level of the reference signal and the level of the signal from the pixel array A101, and the ordinates in the lower stage exemplarily represents the output of the comparator A401. Here, an example will be described in which the change rate (slope) of the reference signal VRAMP output from the ramp circuit A403 is changed in accordance with the level of the signal VIN output from the pixel array A101. The ramp circuit A403 can selectively generate or output a first reference signal VRAMP-1 which changes at a first change rate, a second reference signal VRAMP-2 which changes at a second change rate whose change rate (slope) is larger than the first range rate, and a determination reference signal.

First, in order to perform A/D conversion of the noise level (N level), the operation of the comparator A401 is started at time t501. The count of the counter/latch circuit A402 is reset at time t502, and the level of the reference signal VRAMP output from the ramp circuit A403 is changed at the first change rate. Since the noise level is small, the first reference signal VRAMP-1 (first ramp signal) having a small slope is used for A/D conversion of the noise level. The counter/latch circuit A402 performs the count operation in the period (time t502 to time t503) from the reset of the count to the inversion of the output of the comparator A401. With this, the noise level is A/D-converted.

Then, in the level determination period, the column circuit A400 determines the optical signal level which is the signal corresponding to electric charges accumulated in the photoelectric conversion element A201 in the pixel A102 in the pixel array A101. In the level determination period, the ramp circuit A403 outputs, to the comparator A401, the determination reference signal with a determination level Vs as the maximum level. The determination level Vs is a threshold value for determination. The comparator A401 compares the signal VIN output from the pixel array A101 with the determination reference signal. Here, the count value of the counter/latch circuit A402 is reset at time t504, and the ramp circuit A403 starts to output the determination reference signal. If the level of the signal VIN (optical signal level) output from the pixel array A101 is larger than the determination level Vs (S>Vs), the output of the comparator A401 is not inverted, so that the count value continues to increase until the level determination period ends at time t506. On the other hand, if the level of the signal VIN output from the pixel array A101 is smaller than the determination level Vs (S<Vs), for example, the output of the comparator A401 is inverted at time t505, so that the count value stops increasing. In this manner, based on the count value of the counter/latch circuit A402, the column circuit A400 can determine whether the optical signal level is larger or smaller than the determination level Vs.

The column circuit A400 supplies the result of determination as to whether the optical signal level is larger or smaller than the determination level Vs to the memory unit A106 as luminance determination information (luminance determination information LL to be described later). The luminance determination information is stored in the memory unit A106 while being associated with the digital signal generated by the column circuit A400. The luminance determination information can be, for example, information which has a value 1 (=high) if the optical signal level (S) is larger than the determination level Vs (S>Vs), and has a value 0 (=low) if the optical signal level is smaller than the determination level Vs (S<Vs). Note that it may be controlled such that the timing of resetting the count value of the counter/latch circuit A402 is the time at which the output of the ramp circuit A403 stabilizes at the determination level Vs, and the count value becomes 0 if the optical signal level (S) is smaller than the determination level Vs (S<Vs).

If the optical signal level (S) is smaller than the determination level Vs (S<Vs), from time t507, the optical signal level can be A/D-converted using the first reference signal VRAMP-1 as in A/D conversion of the noise level. With this, in the example shown in FIG. 30, the count value can be obtained in the period from time t507 to time t508. On the other hand, if the optical signal level (S) is larger than the determination level Vs, the optical signal level can be A/D-converted using the second reference signal VRAMP-2 which changes at the second change rate that is a times the first change rate of the first reference signal VRAMP-1. With this, in the example shown in FIG. 30, the count value can be obtained in the period from time t507 to time t509. Here, the first change rate of the first reference signal VRAMP-1 and the second change rate of the second reference signal VRAMP-2 can be understood as the gains of readout by the readout circuit A105, and correspond to the first gain and the second gain, respectively. That is, readout of the signal from the pixel array A101 using the first reference signal VRAMP-1 corresponds to readout of the signal from the pixel array A101 with the first gain. Further, readout of the signal from the pixel array A101 using the second reference signal VRAMP-2 corresponds to readout of the signal from the pixel array A101 with the second gain.

Figure 31:
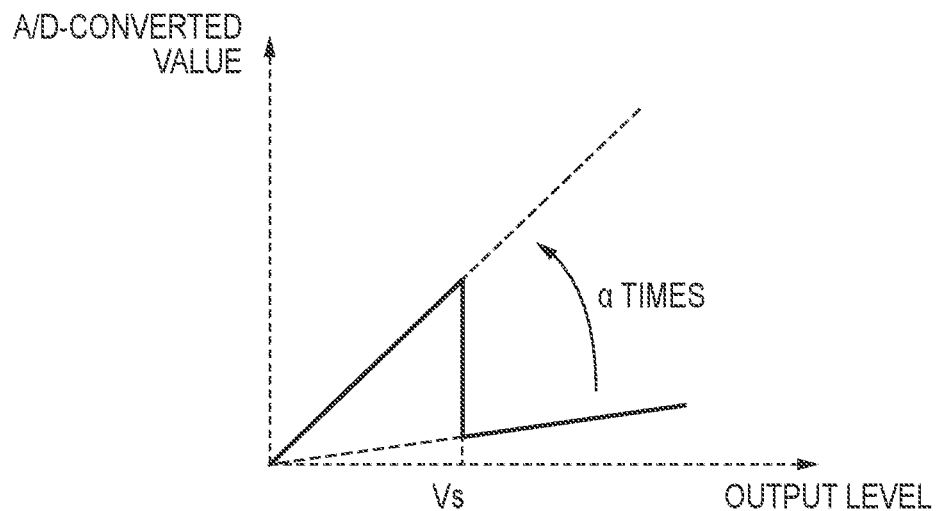
FIG. 31 is a view exemplarily showing the relationship between an optical signal level and the result of A/D conversion in a case in which the change rate (slope) of a reference signal is changed in accordance with the optical signal level according to the second disclosure.

FIG. 31 exemplarily shows the relationship between the optical signal level and the result of A/D conversion in a case in which the change rate (slope) of the reference signal is changed in accordance with the optical signal level. The abscissa of FIG. 31 represents the optical signal level output from the pixel array A101, and the ordinate represents the result (A/D-converted value) of A/D conversion of the optical signal level. The solid line indicates the digital value (A/D-converted value) having undergone A/D conversion by the comparator A401 and the counter/latch circuit A402 and supplied to the signal processing unit A108 via the horizontal scanning unit A107. As has been described above, the optical signal level having a value smaller than the determination level Vs is A/D-converted using the first reference signal VRAMP-1, and the optical signal level having a value larger than the determination level Vs is A/D-converted using the second reference signal VRAMP-2. Therefore, as shown in FIG. 31, the optical signal level after A/D conversion becomes discontinuous before and after the determination level Vs.

To solve this problem, the signal processing unit A108 multiplies the A/D-converted value of the optical signal level larger than the determination level Vs by a ratio α, which is the ratio (second change rate/first change rate) of the first change rate of the first reference signal VRAMP-1 and the second change rate of the second reference signal VRAMP-2.

Subsequently, the principle of the basic reset noise removal process performed in the signal processing unit A108 will be described. The A/D-converted optical signal level described with reference to FIG. 30 includes not only the signal component corresponding to the electric charges accumulated in the photoelectric conversion element A201 of the pixel A102 in the pixel array A101, but also the noise component such as reset noise due to the reset transistor A203. On the other hand, the A/D-converted noise level described with reference to FIG. 30 includes a noise component such as reset noise due to the reset transistor A203. Therefore, by performing the CDS process of subtracting the A/D-converted noise level from the A/D-converted optical signal level, it is possible to reduce the reset noise from the optical signal level.

If the optical signal level is smaller than the determination level Vs, reset noise removal by the CDS process can be expressed as:

$$(SL+NL+DL)-(NL+DL)=SL \quad (A1)$$

In equation (A1), SL is the optical signal level having undergone A/D conversion using the first reference signal VRAMP-1, and NL is the noise level having undergone A/D conversion using the first reference signal VRAMP-1. Further, in equation (A1), DL is a value obtained by converting, into an error component, the amount of response delay of the comparator A401 in a case of using the first reference signal VRAMP-1. The amount of response delay corresponds to the time from the timing at which the value of the signal output from the pixel array A101 exceeds the value of the first reference signal VRAMP-1 to the inversion of the output of the comparator A401 in response thereto. This amount of response delay appears as an error in the result of A/D conversion. If the optical signal level is smaller than the determination level Vs, both the optical signal level and the noise level are A/D-converted using the first reference signal VRAMP-1. Therefore, the influence of DL can be reduced by performing the process expressed by equation (A1). Thus, the optical signal level SL corresponding only to the electric charges accumulated in the photoelectric conversion element A201 of the pixel A102 in the pixel array A101.

On the other hand, if the optical signal level is larger than the determination level Vs, reset noise removal by the CDS process can be expressed as:

$$\alpha \times (SH+NH+DH)-(NL+DL)=\alpha SH+\alpha DH-DL \quad (A2)$$

In equation (A2), SH is the optical signal level having undergone A/D conversion using the second reference signal VRAMP-2, and NH is the noise level having undergone A/D conversion using the second reference signal VRAMP-2. Further, in equation (A2), DH is a value obtained by converting, into an error component, the amount of response delay of the comparator A401 in a case of using the second reference signal VRAMP-2. The amount of response delay corresponds to the time from the timing at which the value of the signal output from the pixel array A101 exceeds the value of the second reference signal VRAMP-2 to the inversion of the output of the comparator A401 in response thereto. This amount of response delay appears as an error in the result of A/D conversion. Since αNH and NL of the left-hand side of equation (A2) indicate the same noise level, it can be regarded that $NL=\alpha NH$. Accordingly, the left-hand side of equation (A2) can be simplified as the right-hand side. Here, if the optical signal level is larger than the determination level Vs, the change rate of the reference signal used to A/D-convert the noise level is the first change rate, but the change rate of the reference signal used to A/D-convert the optical signal level is the second change rate. Thus, change rates different from each other are used. Hence, αDH−DL as the influence of the amount of response delay of the comparator A401 cannot be reduced by the CDS process. αDH−DL can be the offset error which varies among columns. Therefore, if αDH−DL is not removed or reduced, the influence of αDH−DL can appear as vertical stripes in an image output from the photoelectric conversion apparatus A100.

The first embodiment of the second disclosure provides a function of removing or reducing the offset error in the photoelectric conversion apparatus A100 that includes the readout circuit A105 which reads out signals from the pixel array A101 with a gain selected from a plurality of gains. With reference to FIGS. 32 to 35, the arrangement and operation of the photoelectric conversion apparatus A100 according to the first embodiment of the second disclosure will be described below.

Figure 32:
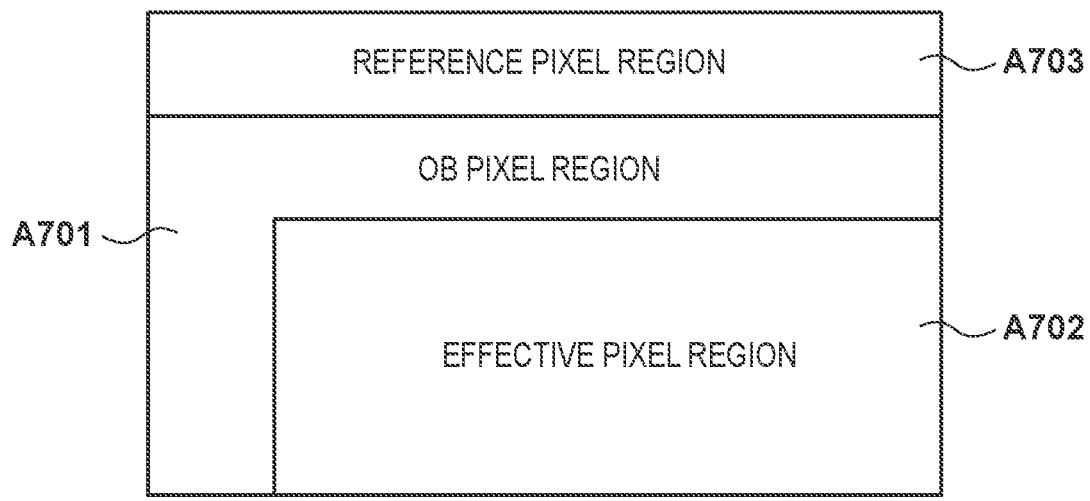
FIG. 32 is a view exemplarily showing the arrangement of a pixel array in the first embodiment of the second disclosure.

FIG. 32 exemplarily shows the arrangement of the pixel array A101. The pixel array A101 includes an effective pixel region A702 for generating a pixel signal or an image signal by photoelectric conversion. The effective pixel region A702 is a region where a plurality of pixels (effective pixels) A102 are arranged so as to form a plurality of rows and a plurality of columns. The pixel array A101 can further include a reference pixel region A703. In the reference pixel region A703, a plurality of reference pixels, each of which outputs a noise level, can be arranged. The plurality of reference pixels can be arranged so as to include at least the reference pixels arranged in the columns corresponding to the plurality of columns in the effective pixel region A702. In other words, at least one reference pixel can be connected to each column signal line A110. The reference pixel can have an arrangement obtained by, for example, removing the photoelectric conversion element from the pixel A102. The reference pixel is shielded from light by a light shielding film. The reference pixel can be used to generate a correction value used to remove or reduce the above-described offset error. The pixel array A101 can further include an Optical Black (OB) pixel region A701. A plurality of OB pixels, each of which outputs an OB level, are arranged in the OB pixel region A701. The OB pixel can be, for example, a pixel having the same arrangement as the pixel A102 but covered with a light shielding film.

The photoelectric conversion apparatus A100 according to the first embodiment of the second disclosure has a calibration mode for generating a correction value, and an image capturing mode for generating an image by photoelectric conversion. The control unit A104 can generate a control signal for operating the photoelectric conversion apparatus A100 in the calibration mode, and a control signal for operating the photoelectric conversion apparatus A100 in the image capturing mode. In the calibration mode, a correction value can be generated by reading out a signal from the reference pixel in the reference pixel region A703 by the readout circuit A105, and processing the signal by the signal processing unit A108.

Figure 33:
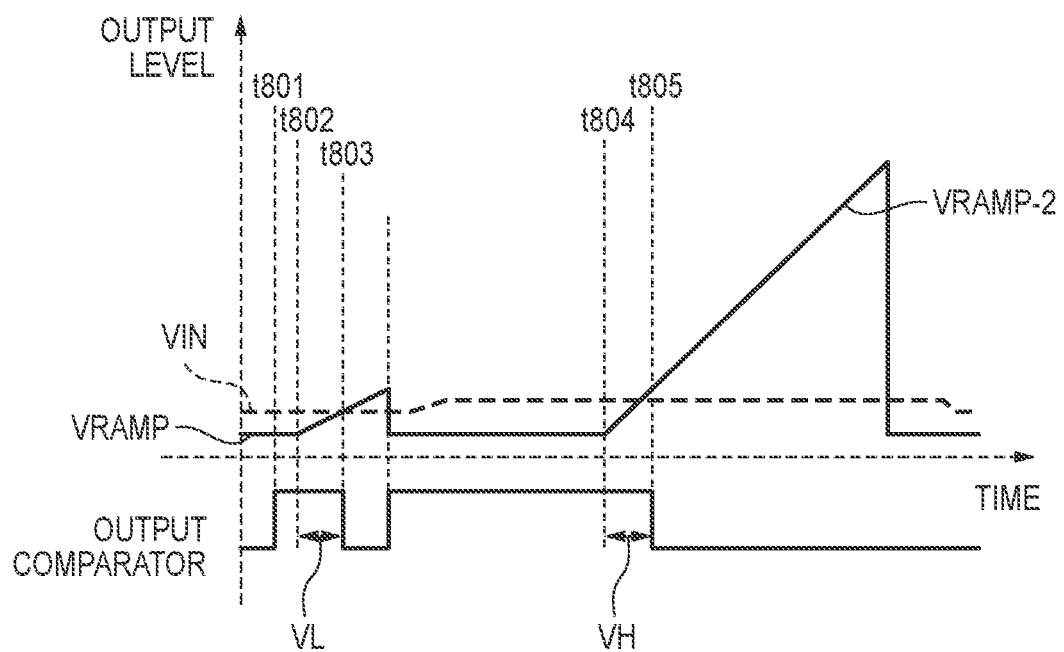
FIG. 33 is a view exemplarily showing an operation of reading out a signal from a reference pixel region in a calibration operation according to the first embodiment of the second disclosure.

FIG. 33 exemplarily shows an operation of reading out a signal from the reference pixel in the calibration mode. First, an operation of A/D-converting a predetermined voltage (here, a predetermined voltage VL for the sake of descriptive convenience) by the column circuit A400 of the readout circuit A105 is performed. More specifically, the operation of the comparator A401 is started at time t801. At time t802, the count of the counter/latch circuit A402 is reset, and the first reference signal VRAMP-1, which changes at the first change rate, is supplied from the ramp circuit A403 to the comparator A401. By performing a count operation in the period (time t802 to time t803) from the reset of the count of the counter/latch circuit A402 to the inversion of the output of the comparator A401, the predetermined voltage VL is A/D-converted.

Then, a predetermined voltage (here, a predetermined voltage VH for the sake of descriptive convenience) is A/D-converted. More specifically, at time t804, the count of the counter/latch circuit A402 is reset, and the second reference signal VRAMP-2 is supplied from the ramp circuit A403 to the comparator A401. By performing the count operation in the period (time t804 to time t805) from the reset of the count of the counter/latch circuit A402 to the inversion of the output of the comparator A401, the predetermined voltage VH is A/D-converted. As has been described above, the second reference signal VRAMP-2 is a ramp signal which changes at the second change rate that is a times the first change rate of the first reference signal VRAMP-1.

Figure 34:
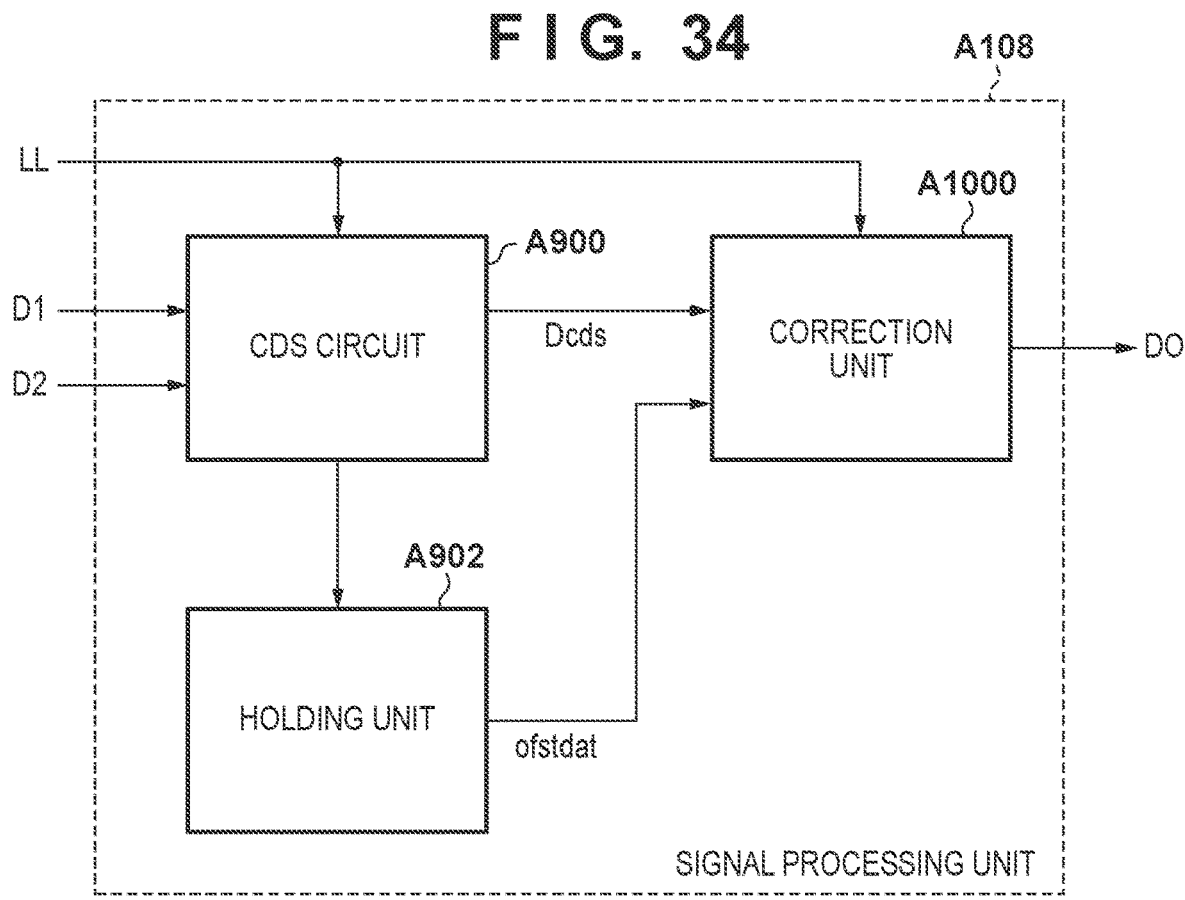
FIG. 34 is a view exemplarily showing the arrangement of a signal processing unit in the first embodiment of the second disclosure.

FIG. 34 exemplarily shows the arrangement of the signal processing unit A108. The signal processing unit A108 can include a CDS circuit A900 that performs a CDS process on a pair of digital signals provided from the pixel array A101 (effective pixel, reference pixel, or OB pixel) via the column signal line A110, the readout circuit A105, and the memory unit A106. Here, in the image capturing mode, when reading out signals from the effective pixel, the pair of digital signals supplied to the CDS circuit A900 is composed of the digital signal of the noise level and the digital signal of the optical signal level. In the image capturing mode, when reading out signals from the OB pixel, the pair of digital signals supplied to the CDS circuit A900 is composed of the digital signal of the reset level and the digital signal of the dark level which is read out while setting the transfer transistor A202 in the ON state.

In the calibration mode, signals are read out from the reference pixel. When reading out signals from the reference pixel, the pair of digital signals supplied to the CDS circuit A900 is composed of a first digital signal D1 read out with the first gain, and a second digital signal D2 read out with the second gain. The first gain corresponds to the first reference signal VRAMP-1, and the second gain corresponds to the second reference signal VRAMP-2. Here, the CDS circuit A900 multiplies the second digital signal D2 read out with the second gain (second reference signal VRAMP-2) by a based on the luminance determination information LL. The first digital signal D1 can be expressed as NL+DL. The second digital signal D2 multiplied by a can be expressed as $\alpha \times (SH@NULL+NH+DH)$. Accordingly, an output of the CDS circuit A900 can be expressed as equation (A3). The first digital signal D1, that is, NL+DL is a signal read out from the pixel array A101 with the first gain by the readout circuit A105 in a state in which the noise level is output from the pixel array A101. The second digital signal D2, that is, $\alpha \times (SH@NULL+NH+DH)$ is a signal read out from the pixel array A101 with the second gain by the readout circuit A105 in a state in which the noise level is output from the pixel array A101. An output of the CDS circuit A900 is the difference between the first digital signal D1 and the second digital signal D2.

$$\alpha \times (SH@NULL+NH+DH) - (NL+DL) = \alpha DH - DL \quad (A3)$$

SH@NULL is a signal obtained by reading out a signal of the reference pixel arranged in the reference pixel region A703 by A/D conversion using the second reference signal VRAMP-2. Since the reference pixel does not include the photoelectric conversion element A201, SH@NULL is substantially 0. In addition, as has been described above, it can be regarded that $NL=\alpha NH$. Accordingly, the left-hand side of equation (A3) can be simplified as the right-hand side. The right-hand side of equation (A3) corresponds to the offset error $\alpha DH-DL$ to be removed in the right-hand side of equation (A2). That is, the signal (the difference between the first digital signal D1 and the second digital signal D2) output from the CDS circuit A900 in the calibration mode corresponds to the offset error to be removed. Thus, this can be used as the correction value. The signal processing unit A108 may include a holding unit A902 that holds the correction value. The holding unit A902 can hold the signal output from the CDS circuit A900 for each column, that is, the correction value in association with the column. Here, multiple pairs of digital signals may be acquired by reading out signals multiple times from the reference pixels in each column, and the average value of multiple provisional correction values obtained by supplying the multiple pairs of digital signals to the CDS circuit A900 may be used as the correction value.

The pixel A102 (effective pixel) may be used to generate the correction value. In this case, the signal is read out from the pixel A102 while inactivating the transfer control signal PTX for the selected pixel A102. Alternatively, the OB pixel may be used to generate the correction value. Alternatively, the correction value may be generated by setting the potential of the column signal line A110 to an arbitrary fixed potential. That is, an arbitrary means can be taken as long as $\alpha DH-DL$ can be obtained.

The plurality of column circuits A400 of the readout circuit A105 may be provided such that one column circuit A400 is assigned to one column signal line A110, or may be provided such that one column circuit A400 is assigned to at least two column signal lines. In the latter case, in the calibration mode, the correction value may be decided for each column signal line A110, or the correction value may be decided for each column circuit A400.

Figure 35:
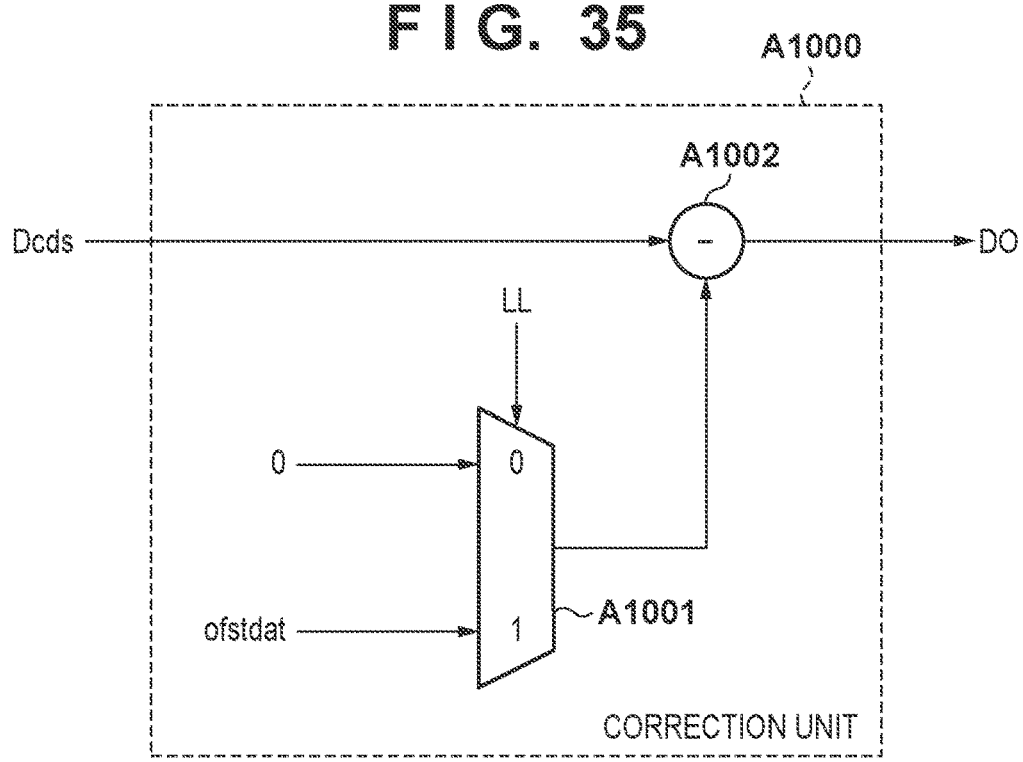
FIG. 35 is a view exemplarily showing the arrangement of a correction unit of the second disclosure.

The signal processing unit A108 can include a correction unit A1000 that corrects, using the correction value provided from the holding unit A902, the signal (corresponding to the right-hand side of equation (A2)) output from the CDS circuit A900 in the image capturing mode. FIG. 35 exemplarily shows the arrangement of the correction unit A1000. The correction unit A1000 can include a selection unit A1001 and a subtractor A1002. In the image capturing mode, the CDS circuit A900 is sequentially provided with the pair of digital signals read out from the effective pixel or OB pixel via the column signal line A110 by the readout circuit A105 and stored in the memory unit A106, and the luminance determination information LL. The CDS circuit A900 supplies, to the correction unit A1000, a signal (corresponding to the right-hand side of equation (A2)) Dcds obtained by performing the CDS process on the pair of digital signals, and the signal Dcds is supplied to the subtractor A1002. The holding unit A902 supplies, to the selection unit A1001, a correction value ofstdat (corresponding to the right-hand side of equation (A3)) corresponding to the pair of digital signals among a plurality of correction values stored in the holding unit A902. If the luminance determination information LL corresponding to the pair of digital signals is 1, the selection unit A1001 can supply, to the subtractor A1002, the correction value ofstdat supplied from the holding unit A902. If the luminance determination information LL is 0, the selection unit A1001 can supply 0 as the correction value to the subtractor A1002. The correction unit A1000 performs calculation of subtracting the correction value ofstdat (corresponding to the right-hand side of equation (A3)) from the signal (corresponding to the right-hand side of equation (A2)) Dcds supplied from the CDS circuit A900, and outputs the result as a pixel signal DO. This calculation can be expressed as:

$$\alpha SH+\alpha DH-DL-(\alpha DH-DL)=\alpha SH \quad (A4)$$

Accordingly, even in a case in which the optical signal level is A/D-converted using the second reference signal VRAMP-2 by the readout circuit A105 (that is, a case in which the optical signal level is read out with the second gain by the readout circuit A105), it is possible to remove or reduce the offset error.

The offset error can change depending on temperature. Therefore, it is preferable to execute the calibration mode at an arbitrary timing or a timing planned in advance. Alternatively, the correction value may be generated in each frame (vertical scanning period), and the signal Dcds may be corrected based on the correction value in the same frame (vertical scanning period).

In the example described above, the offset error is corrected only if the luminance determination information LL is 1. However, even if the luminance determination information LL is 0, that is, even if the optical signal level is A/D-converted using the first reference signal VRAMP-1, the offset error may be corrected. In this case, instead of acquiring the digital signal using the second reference signal VRAMP-2 as shown in FIG. 33, the digital signal is acquired using the first reference signal VRAMP-1, and the correction value may be decided using the acquired digital signal. This arrangement is advantageous in reducing the influence of the offset error caused by the variation in the power supply potential among the column circuits.

Figure 36:
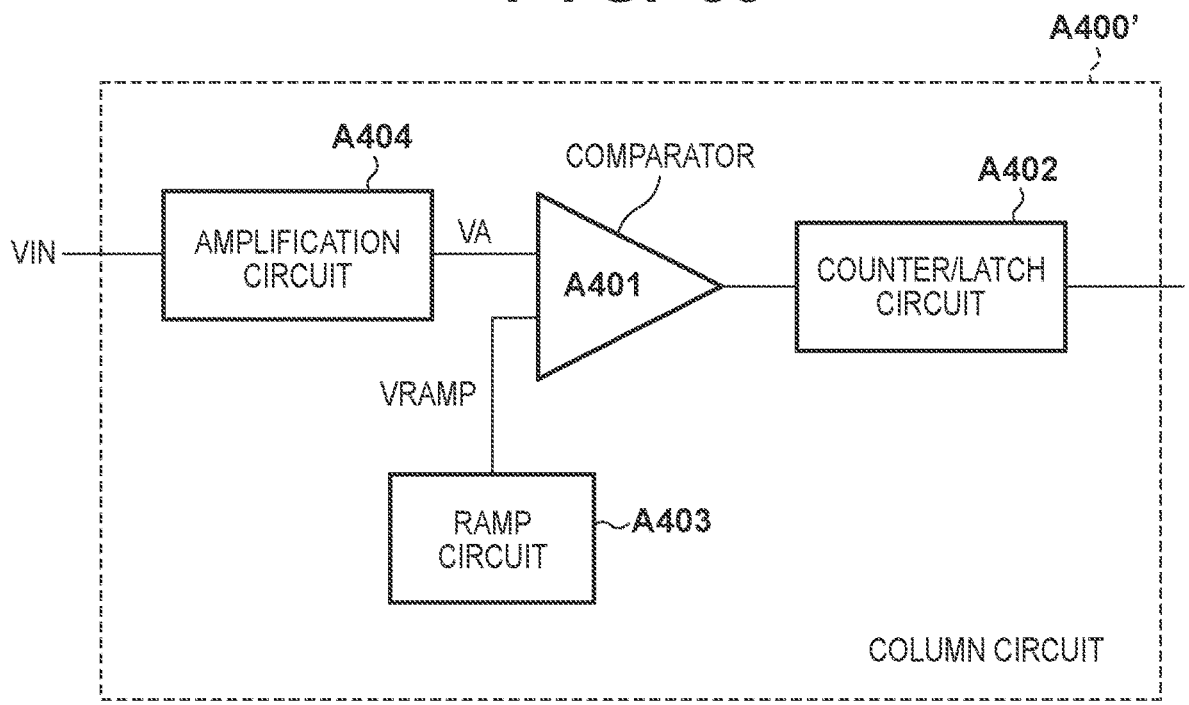
FIG. 36 is a view exemplarily showing the arrangement of a column circuit in the second embodiment of the second disclosure.
Figure 37:
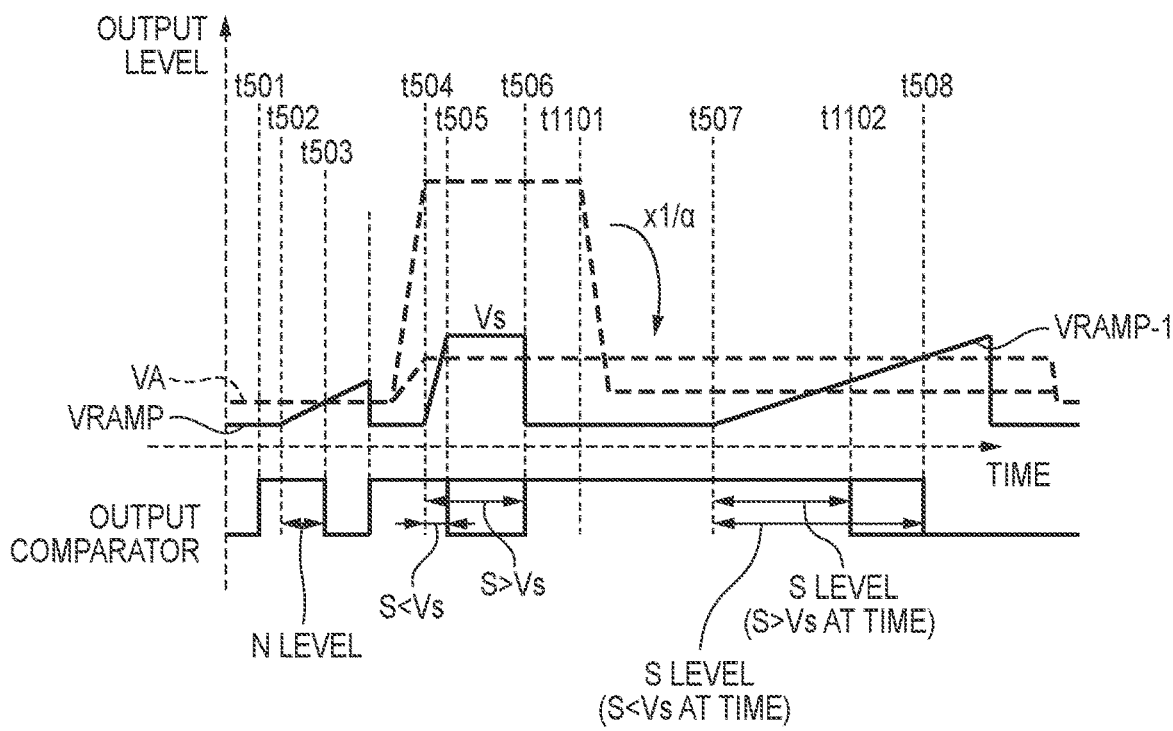
FIG. 37 is a view exemplarily showing the operation of a column circuit in the second embodiment of the second disclosure.
Figure 38:
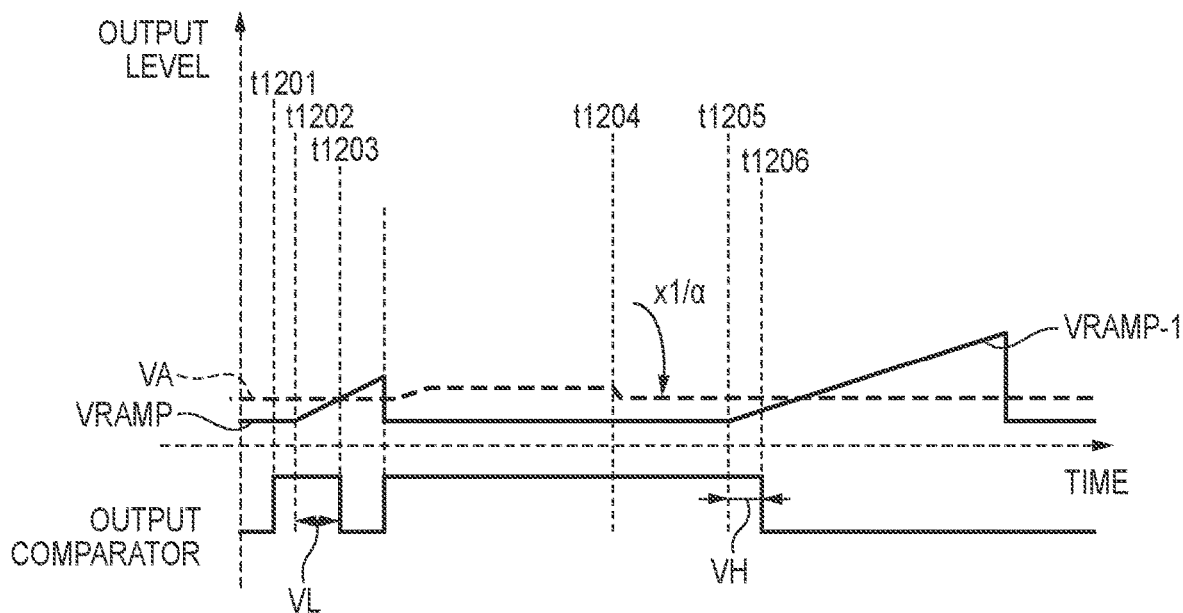
FIG. 38 is a view exemplarily showing an operation of reading out a signal from a reference pixel region in a calibration operation according to the second embodiment of the second disclosure.

With reference to FIGS. 36 to 38, a photoelectric conversion apparatus A100 according to the second embodiment of the second disclosure will be described below. Matters not mentioned as the second embodiment of the second disclosure can follow the first embodiment of the second disclosure. FIG. 36 shows an arrangement example of one column circuit A400' of a plurality of column circuits A400' of a readout circuit A105 in the photoelectric conversion apparatus A100 according to the second embodiment of the second disclosure. In the second embodiment of the second disclosure, the column circuit A400 in the first embodiment of the second disclosure is replaced with the column circuit A400'. The column circuit A400' includes an amplification circuit A404 that amplifies a signal VIN supplied from a pixel array A101 via a column signal line A110, and an output VA of the amplification circuit A404 is supplied to a comparator A401. This arrangement is advantageous in expanding the dynamic range and improving the S/N ratio.

FIG. 37 exemplarily shows the operation of one column circuit A400' in the readout circuit A105 according to the second embodiment of the second disclosure. In FIG. 37, the abscissa exemplarily represents time, the ordinate in the upper stage exemplarily represents the level of the reference signal and the level of the signal from the pixel array, and the ordinate in the lower stage exemplarily represents the output of the comparator A401. With reference to FIG. 37, an example of changing the gain of the amplification circuit A404 in accordance with the level of the signal VIN from the pixel array A101 will be described. The readout operation of the noise level and the determination operation of the optical signal level are similar to the operations in the period from time t501 to time t506 in FIG. 30, so that a description thereof will be omitted. Note that in the period from time t501 to time t506, the gain of the amplification circuit A404 is set at the first gain.

If the optical signal level is smaller than the determination level Vs (S<Vs), A/D conversion is performed while setting the gain of the amplification circuit A404 at the first gain. That is, similar to the noise level readout period, A/D conversion of the optical signal level is performed from time t507 while suppling a first reference signal VRAMP-1 to the comparator A401 by a ramp circuit A403. With this, in the example shown in FIG. 37, a count value can be obtained in the period from time t507 to time t508. On the other hand, if the optical signal level is larger than the determination level Vs (S>Vs), the gain of the amplification circuit A404 is changed from the first gain to the second gain (1/α times the first gain) at time t1101. Thereafter, A/D conversion of the optical signal level can be performed using the first reference signal VRAMP-1. With this, in the example shown in FIG. 37, a count value can be obtained in the period from time t507 to time t1102. Thus, it is possible to implement expansion of the dynamic range and improvement of the S/N ratio.

Subsequently, the principle of the reset noise removal process performed in a signal processing unit A108 of the second embodiment of the second disclosure will be described. The optical signal level read out by A/D conversion described with reference to FIG. 37 includes not only the signal component corresponding to the electric charges accumulated in a photoelectric conversion element A201 of a pixel A102 in the pixel array A101, but also a noise component such as reset noise due to a reset transistor A203. On the other hand, the A/D-converted noise level described with reference to FIG. 37 includes a noise component such as reset noise due to the reset transistor A203. Therefore, by performing the CDS process of subtracting the A/D-converted noise level from the A/D-converted optical signal level, it is possible to reduce the reset noise from the optical signal level.

If the optical signal level is smaller than the determination level Vs, reset noise removal by the CDS process can be expressed as equation (A1) described above.

On the other hand, if the optical signal level is larger than the determination level Vs, reset noise removal by the CDS process can be performed according to the method expressed by:

$$\alpha \times \{(SH+NH+AOH)-(NL+AOL)\}=\alpha SH+\alpha AOH-\alpha AOL \quad (A5)$$

In equation (A5), as has been described above, it can be regarded that NL=NH. In equation (A5), AOH is the offset component of the amplification circuit A404 obtained when the amplification circuit A404 amplifies the signal VIN with the second gain in the period of reading out the optical signal level. Further, in equation (A5), AOL is the offset component of the amplification circuit A404 obtained when the amplification circuit A404 amplifies the signal VIN with the first gain in the period of reading out the noise level. Since the gain of the amplification circuit A404 changes between readout of the optical signal level and readout of the noise level, this can generate the difference between AOH and AOL. Accordingly, αAOH−αAOL cannot be reduced by the CDS process. αAOH−αAOL can be the offset error which varies among columns. Therefore, in a case in which αAOH−αAOL cannot be removed or reduced, the influence of αAOH−αAOL can appear as vertical stripes in an image output from the photoelectric conversion apparatus A100.

In the arrangement in which the amplification circuit A404 amplifies the signal from the pixel array A101 with the gain selected from a plurality of gains, the second embodiment provides a function of removing or reducing the offset error that can be generated when the optical signal level and the noise level are amplified with different gains.

Similar to the photoelectric conversion apparatus A100 according to the first embodiment of the second disclosure, the photoelectric conversion apparatus A100 according to the second embodiment of the second disclosure has a calibration mode for generating a correction value, and an image capturing mode for generating an image by photoelectric conversion. A control unit A104 generates a control signal for operating the photoelectric conversion apparatus A100 in the calibration mode, and a control signal for operating the photoelectric conversion apparatus A100 in the image capturing mode. In the calibration mode, a correction value can be generated by reading out a signal from the reference pixel in a reference pixel region A703 by the readout circuit A105, and processing the signal by the signal processing unit A108.

FIG. 38 exemplarily shows an operation of reading out a signal from the reference pixel in the calibration mode. First, an operation of amplifying and A/D-converting a predetermined voltage (here, a predetermined voltage VL for the sake of descriptive convenience) by the column circuit A400' of the readout circuit A105 is performed. More specifically, the operation of the comparator A401 is started at time t1201. At time t1202, the count of a counter/latch circuit A402 is reset, and the first reference signal VRAMP-1, which changes at the first change rate, is supplied from the ramp circuit A403 to the comparator A401. The amplification circuit A404 outputs the voltage obtained by amplifying the predetermined voltage VL with the first gain, and the A/D conversion unit (A401, A402, and A403) A/D-converts the amplified voltage. By performing a count operation in the period (time t1202 to time t1203) from the reset of the count of the counter/latch circuit A402 to the inversion of the output of the comparator A401, the amplification operation and A/D conversion of the predetermined voltage VL are performed.

Then, the amplification operation and A/D conversion of a predetermined voltage (here, a predetermined voltage VH for the sake of descriptive convenience) are performed. Here, after the predetermined voltage VH is amplified with the second gain, which is 1/α times the first gain, by the amplification circuit A404 (time t1204), the amplified voltage is A/D-converted. By performing the count operation in the period from time t1205 to time t1206, the amplification operation and A/D conversion of the predetermined voltage VH are performed.

A first digital signal D1 obtained by reading out the predetermined voltage VL as described above and a second digital signal D2 obtained by reading out the predetermined voltage VH are supplied to a CDS circuit A900 of the signal processing unit A108 exemplarily shown in FIG. 34. In the CDS circuit A900, a correction value used to correct the offset error is generated by the CDS process, and stored in a holding unit A902. The first digital signal D1 can be expressed as α×(NL+AOL). The second digital signal D2 multiplied by α can be expressed as α×(SH@NULL+NH+AOH). Accordingly, an output of the CDS circuit A900 can be expressed as:

$$\alpha \times \{(SH@NULL+NH+AOH)-(NL+AOL)\}=\alpha AOH-\alpha AOL \quad (A6)$$

Here, SH@NULL is a signal obtained by reading out a signal of the reference pixel arranged in the reference pixel region A703 with the second gain and the first reference signal VRAMP-1. Since the reference pixel does not include the photoelectric conversion element A201, SH@NULL is substantially 0. In addition, as has been described above, it can be regarded that NL=NH. Accordingly, the left-hand side of equation (A6) can be simplified as the right-hand side. The right-hand side of equation (A6) corresponds to the offset error αAOH−αAOL to be removed in the right-hand side of equation (A5). That is, the signal output from the CDS circuit A900 in the calibration mode corresponds to the offset error to be removed. Thus, this can be used as the correction value.

A correction unit A1000 of the signal processing unit A108 corrects, using the correction value provided from a holding unit A902, the signal (corresponding to the right-hand side of equation (A5)) output from the CDS circuit A900 in the image capturing mode. The correction unit A1000 can include a selection unit A1001 and a subtractor A1002. In the image capturing mode, the CDS circuit A900 is sequentially provided with the pair of digital signals read out from the effective pixel or OB pixel via the column signal line A110 by the readout circuit A105 and stored in a memory unit A106, and luminance determination information LL. The CDS circuit A900 supplies, to the correction unit A1000, a signal (corresponding to the right-hand side of equation (A5)) Dcds obtained by performing the CDS process on the pair of digital signals, and the signal Dcds is supplied to the subtractor A1002. The holding unit A902 supplies, to the selection unit A1001, a correction value ofstdat (corresponding to the right-hand side of equation (A6)) corresponding to the pair of digital signals among a plurality of correction values stored in the holding unit A902. If the luminance determination information LL corresponding to the pair of digital signals is 1, the selection unit A1001 can supply, to the subtractor A1002, the correction value ofstdat supplied from the holding unit A902. If the luminance determination information LL is 0, the selection unit A1001 can supply 0 as the correction value to the subtractor A1002. The correction unit A1000 performs calculation of subtracting the correction value ofstdat (corresponding to the right-hand side of equation (A6)) from the signal (corresponding to the right-hand side of equation (A5)) Dcds supplied from the CDS circuit A900. This calculation can be expressed as:

$$\alpha SH+\alpha AOH-\alpha AOL-(\alpha AOH-\alpha AOL)=\alpha SH \quad (A7)$$

Accordingly, even in a case in which the optical signal level is amplified with the second gain by the readout circuit A105 (that is, a case in which the optical signal level is read out with the second gain by the readout circuit A105), it is possible to remove or reduce the offset error.

Note that in the second embodiment of the second disclosure, the column circuit A400' includes the A/D converter. However, the column circuit A400' may output the signal output from the amplification circuit A404 without performing A/D conversion.

Figure 39:
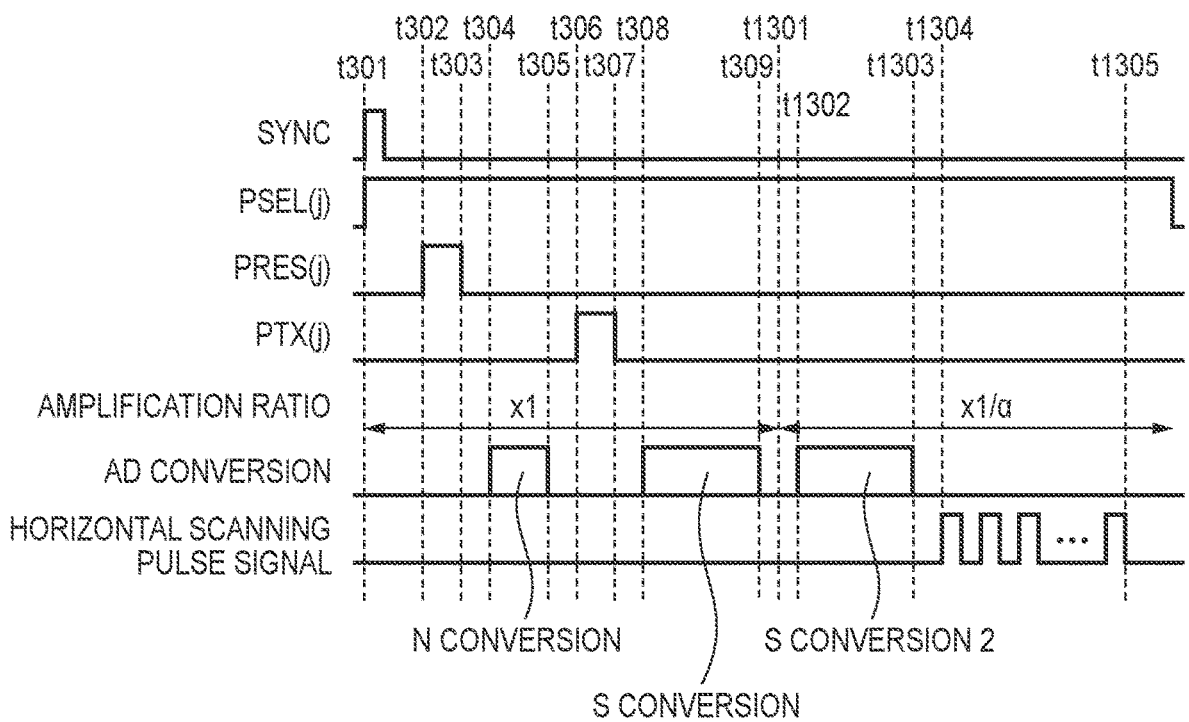
FIG. 39 is a view exemplarily showing the operation of a photoelectric conversion apparatus according to the third embodiment of the second disclosure.

With reference to FIG. 39, a photoelectric conversion apparatus A100 according to the third embodiment of the second disclosure will be described below. The photoelectric conversion apparatus A100 according to the third embodiment of the second disclosure can have an arrangement similar to that of the photoelectric conversion apparatus A100 according to the second embodiment of the second disclosure. Matters not mentioned as the third embodiment of the second disclosure can follow the first and second embodiments of the second disclosure. In the third embodiment of the second disclosure, in order to expand the dynamic range, optical signal levels are read out while time-sequentially switching the gain of an amplification circuit A404.

FIG. 39 exemplarily shows the operation of one column circuit A400' in a readout circuit A105 in the third embodiment of the second disclosure. Here, the operation of reading out signals from a pixel A102 in the jth row by a vertical scanning unit A103 is representatively shown. Note that each signal shown in FIG. 39 is a high-active signal. The operation of reading out the noise level and the optical signal level with the same gain is common to the operation in the period from time t301 to time t309 in FIG. 28. In FIG. 39, in the period from time t301 to time t309, the gain of the amplification circuit A404 is set at the first gain, and this is exemplarily shown as "×1"

At time t1301, the gain of the amplification circuit A404 is changed from the first gain (for example, xl) to the second gain (for example, xl/a) different from the first gain. Here, in order to change the gain of the amplification circuit A404, the feedback capacitance in the amplification circuit is changed. However, another configuration may also be used.

In the period from time t1302 to time t1303, the optical signal level output to a column signal line A110 is multiplied by 1/α by the amplification circuit A404, and then converted into a digital signal by the A/D conversion unit (A401, A402, and A403). This operation is referred to as S conversion 2. In this manner, N conversion, S conversion, and S conversion 2 are performed, and each result is stored in a memory unit A106. Here, let N be the digital signal obtained by N conversion, S be the digital signal obtained by S conversion, and S2 be the digital signal obtained by S conversion 2.

In the period from time t1304 to time t1305, signals of the pixels A102 (the signal of each pixel is composed of N, S, and S2) for one row stored in the memory unit A106 can be sequentially selected by a horizontal scanning unit A107, and supplied to a signal processing unit A108. By performing the horizontal scanning until the last column, readout of signals (N, S, S2) of the pixels A102 for one row arranged in the readout target row is completed. The signal processing unit A108 includes a CDS circuit A900 that performs a CDS process of generating a pixel signal by subtracting the noise level from the optical signal level. The CDS circuit A900 outputs a pixel signal Dcds having undergone the CDS process.

The CDS circuit A900 of the signal processing unit A108 reduces the fixed pattern noise by performing a process of subtracting N from S and a process of subtracting N from S2. The dynamic range can be expanded using the signal obtained by subtracting N from S and the signal obtained by subtracting N from S2. However, since S2 and N are signals read out with gains different from each other, even if the process of subtracting N from S2 is performed, an offset error can remain. This offset error can appear as vertical stripes in an image output from the photoelectric conversion apparatus A100.

The correction value for correcting the offset error is acquired by executing a calibration mode as in the second embodiment of the second disclosure, and stored in a holding unit A902. In an image capturing mode, the signal obtained by subtracting N from S2 by the CDS circuit A900 can be corrected based on the correction value.

Figure 40:
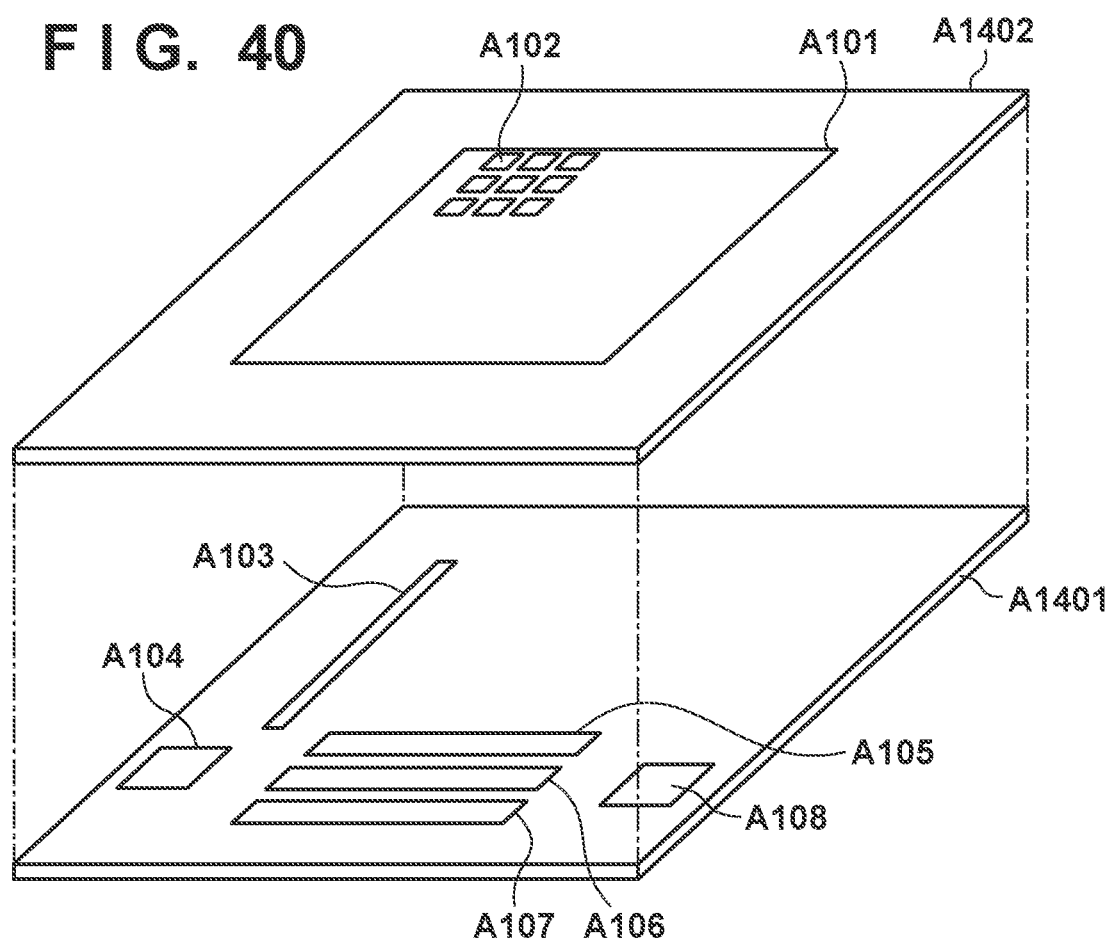
FIG. 40 is a view exemplarily showing the structure of the photoelectric conversion apparatus according to the second disclosure.
Figure 41:
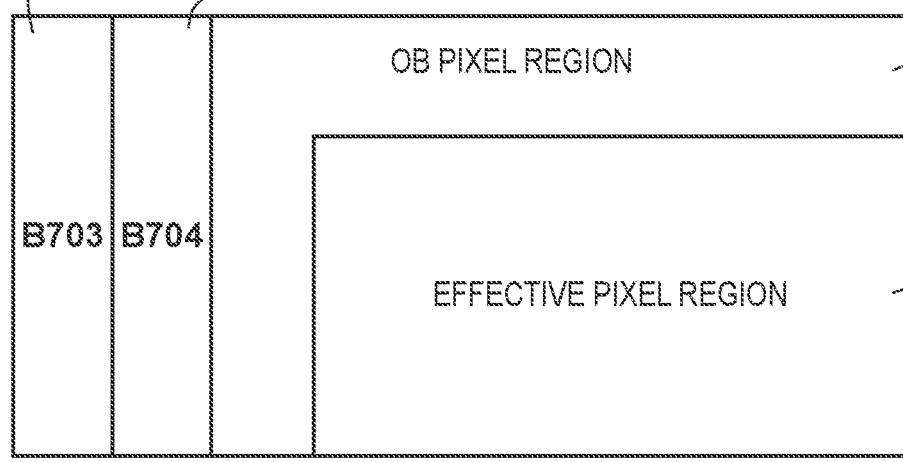
FIG. 41 is a view exemplarily showing the arrangement of a photoelectric conversion apparatus according to the first embodiment of the third disclosure.

FIG. 40 shows an example of the structure of the photoelectric conversion apparatus A100 exemplarily described through the first to third embodiments of the second disclosure. The photoelectric conversion apparatus A100 may include a first substrate A1401 and a second substrate A1402. Each of the first substrate A1401 and the second substrate A1402 can be formed by processing, for example, a semiconductor substrate such as a silicon substrate. On the first substrate A1401, for example, the signal processing unit A108, the vertical scanning unit A103, a control unit A104, the readout circuit A105, the memory unit A106, the horizontal scanning unit A107, and the like can be arranged. On the second substrate A1402, for example, a pixel array A101 including an OB pixel region A701, an effective pixel region A702, and a reference pixel region A703 can be arranged. As exemplarily shown in FIG. 40, at least a part of the first substrate A1401 and at least a part of the second substrate A1402 can be stacked. With the arrangement as described above, when manufacturing the photoelectric conversion apparatus A100, it is possible to apply a process suitable for each of an analog portion including the pixel array A101 and a logic portion including the signal processing unit A108.

Note that in the embodiments described above, the arrangement has been mainly described in which the readout circuit A105 included in the photoelectric conversion apparatus A100 generates a digital signal by A/D conversion, but the present invention is not limited to this example. The readout circuit A105 may output an analog signal intact to the subsequent circuit. For example, the readout circuit A105 may output an analog signal intact to the signal processing unit A108, and the signal processing unit A108 may A/D-convert the analog signal. Alternatively, the signal processing unit A108 may not perform A/D conversion, and the photoelectric conversion apparatus A100 may output the analog signal intact to an external A/D conversion unit. Even with such a form, the correction process described in each embodiment described above can be preferably executed.

FIG. 25 exemplarily shows the arrangement of an image capturing apparatus 1500 incorporating the photoelectric conversion apparatus A100. The image capturing apparatus 1500 can include an image capturing unit 1501, a signal correction unit 1502, a CPU 1503, an external input unit 1504, an optical system 1505, a video display unit 1506, a recording unit 1507, and a drive system 1508. In an example, the image capturing unit 1501 is a functional block which includes the pixel array A101, the vertical scanning unit A103, the control unit A104, the readout circuit A105, the memory unit A106, and the horizontal scanning unit A107. Such the image capturing unit 1501 may be understood as a photoelectric conversion apparatus. Alternatively, the image capturing unit 1501 may be the photoelectric conversion apparatus A100 including the signal processing unit A108 described above. In an example, the signal correction unit 1502 can include the signal processing unit A108 described above.

In the pixel array A101 of the image capturing unit 1501, an optical image is formed by the optical system 1505. The image capturing unit 1501 outputs an image signal corresponding to the optical image by photoelectric conversion. The signal correction unit 1502 corrects the image signal output from the image capturing unit 1501, and outputs the corrected image signal to the video display unit 1506 and/or the recording unit 1507. The CPU 1503 controls the respective components in the image capturing unit 1500. The drive system 1508 can, for example, drive the focusing lens of the optical system 1505 and drive the aperture. The external input unit 1504 can include various kinds of buttons and the like used by a user to input an image capturing condition and perform a shutter operation. The video display unit 1506 may be a touch panel. In this case, the video display unit 1506 can function as the external input unit 1504 (a part thereof).

The second disclosure can also be implemented by executing the following process. That is, software (program) for implementing the above-described functions may be supplied to the system or apparatus via a network or various kinds of storage media. One or more processors (for example, a CPU and an MPU) in the computer of the system or apparatus can read out and execute the software (program). Alternatively, the above-described function can also be implemented by a circuit (for example, ASIC) having a fixed function, or a function definable circuit (for example, FPGA).

The second disclosure includes the disclosure of the invention described below.

(Item 1)
A photoelectric conversion apparatus comprising
a pixel array including an effective pixel,
a readout circuit configured to read out a signal of the pixel array, and
a signal processing unit configured to perform a correlated double sampling process and a correction process on signals read out from the effective pixel in the pixel array by the readout circuit,
wherein
the readout circuit has a function of reading out a signal of the pixel array with a first gain, and a function of reading out a signal of the pixel array with a second gain different from the first gain, and
a correction value for the correction process is generated based on a difference between a signal read out from the pixel array with the first gain by the readout circuit in a state in which a noise level is output from the pixel array, and a signal read out from the pixel array with the second gain by the readout circuit in a state in which a noise level is output from the pixel array.

(Item 2)
The photoelectric conversion apparatus according to Item 1, wherein
the readout circuit includes a plurality of column circuits, and each column circuit reads out the signal of the pixel array via at least one of a plurality of column signal lines of the pixel array, and
the signal processing unit corrects a signal, which has been read out via a column signal line from the pixel array by each column circuit, based on a correction value, of a plurality of correction values, corresponding to the column signal line.

(Item 3)
The photoelectric conversion apparatus according to Item 2, wherein
the correction value is an average value of a plurality of provisional correction values, and each of the plurality of provisional correction values is generated based on a signal read out from the pixel array with the first gain by the readout circuit in a state in which a noise level is output from the pixel array, and a signal read out from the pixel array with the second gain by the readout circuit in a state in which a noise level is output from the pixel array.

(Item 4)
The photoelectric conversion apparatus according to any one of Items 1 to 3, wherein
the readout circuit reads out a noise level from the effective pixel in a first period, and reads out an optical signal level from the effective pixel in a second period, and
the signal processing unit corrects, based on the correction value, a signal obtained from the optical signal level read out from the effective pixel in the second period and the noise level read out from the effective pixel in the first period.

(Item 5)
The photoelectric conversion apparatus according to any one of Items 1 to 4, wherein
the pixel array includes a reference pixel configured to output a noise level, and
the correction value is generated based on a signal read out from the reference pixel with the first gain by the readout circuit and a signal read out from the reference pixel with the second gain by the readout circuit.

(Item 6)
The photoelectric conversion apparatus according to any one of Items 1 to 5, wherein
the readout circuit includes an A/D converter, and
the readout circuit performs A/D conversion using a first reference signal, which changes at a first change rate, when reading out a signal of the pixel array with the first gain, and performs A/D conversion using a second reference signal, which changes at a second change rate larger than the first change rate, when reading out a signal of the pixel array with the second gain.

(Item 7)
The photoelectric conversion apparatus according to Item 6, wherein
the signal processing unit decides the correction value based on a signal obtained by multiplying, by a ratio corresponding to the first gain and the second gain, a signal read out from the pixel array with the second gain by the readout circuit in a state in which a noise level is output from the pixel array, and a signal read out from the pixel array with the first gain by the readout circuit in a state in which a noise level is output from the pixel array.

(Item 8)
The photoelectric conversion apparatus according to any one of Items 1 to 5, wherein
the readout circuit includes an amplification circuit configured to amplify a signal output from the pixel array, and an A/D converter configured to A/D-convert a signal output from the amplification circuit, and
a gain of the amplification circuit used when reading out a signal of the pixel array with the first gain and a gain of the amplification circuit used when reading out a signal of the pixel array with the second gain are different from each other.

(Item 9)
The photoelectric conversion apparatus according to Item 7, wherein
the signal processing unit decides the correction value based on a signal obtained by multiplying, by a ratio corresponding to the first gain and the second gain, a difference between a signal read out from the pixel array with the second gain by the readout circuit in a state in which a noise level is output from the pixel array and a signal read out from the pixel array with the first gain by the readout circuit in a state in which a noise level is output from the pixel array.

(Item 10)

The photoelectric conversion apparatus according to any one of Items 1 to 9, wherein
the readout circuit decides, in accordance with a level of a signal supplied from the effective pixel, which one of the first gain and the second gain is to be used to read out a signal of the effective pixel.

(Item 11)

A photoelectric conversion system comprising
a photoelectric conversion apparatus defined in any one of Items 1 to 10, and
a signal processing unit configured to generate an image using a signal output from the photoelectric conversion apparatus.

(Item 12)

A photoelectric conversion system that comprises a photoelectric conversion apparatus and a signal processing unit, wherein
the photoelectric conversion apparatus comprises a pixel array including an effective pixel, and a readout circuit configured to read out a signal of the pixel array,
the readout circuit has a function of reading out a signal of the pixel array with a first gain, and a function of reading out a signal of the pixel array with a second gain different from the first gain,
the signal processing unit is configured to perform a correlated double sampling process and a correction process on signals read out from the effective pixel in the pixel array by the readout circuit, and
a correction value for the correction process is generated based on a signal read out from the pixel array with the first gain by the readout circuit in a state in which a noise level is output from the pixel array, and a signal read out from the pixel array with the second gain by the readout circuit in a state in which a noise level is output from the pixel array.

(Item 13)

A photoelectric conversion method comprising
a step of reading out a noise level of an effective pixel in a pixel array with a first gain,
a step of reading out, with a second gain different from the first gain, an optical signal level corresponding to electric charges generated by photoelectric conversion in the effective pixel, and
a step of performing a correlated double sampling process and a correction process on the noise level and the optical signal level,
wherein a correction value for the correction process is generated based on a difference between a signal read out from the pixel array with the first gain in a state in which a noise level is output from the pixel array and a signal read out from the pixel array with the second gain in a state in which a noise level is output from the pixel array.

(Item 14)

The photoelectric conversion method according to Item 13, further comprising
a step of generating the correction value.

Third Disclosure

A photoelectric conversion apparatus is demanded to have a large number of pixels and a high frame rate. In order to satisfy the demand, one of challenges is to increase the readout speed of signals by the photoelectric conversion apparatus. In addition to increasing the readout speed, there is also a strong demand for improvement of the S/N ratio and expansion of the dynamic range. There is known a photoelectric conversion apparatus that performs analog-to-digital (A/D) conversion, using different A/D converter circuits, of a first pixel signal obtained by amplifying a pixel signal with a first gain and a second pixel signal obtained by amplifying the pixel signal with a second gain different from the first gain. The photoelectric conversion apparatus selectively outputs one of the VD-converted first pixel signal and the VD-converted second pixel signal in accordance with the level of the pixel signal. With this, it is possible to implement expansion of the dynamic range and improvement of the S/N ratio. Japanese Patent Laid-Open No. 2014-140152 discloses a technique of correcting the offset error and the gain error generated when selectively outputting the first pixel signal and the second pixel signal.

It is known that the S/N ratio is improved by a Correlated Double Sampling (CDS) process in which the optical signal level and noise level generated by photoelectric conversion are read out from a pixel, and a pixel signal corresponding to the difference between the optical signal level and the noise level is generated. However, if the gain used when reading out the optical signal level is different from the gain used when reading out the noise level, a noise component can remain in the pixel signal generated by the CDS process.

The invention according to the third disclosure is aimed to provide a technique advantageous in effectively reducing a noise component from a pixel signal.

One aspect of the invention according to the third disclosure relates to a photoelectric conversion apparatus comprising a pixel array including a plurality of effective pixels, a readout circuit configured to read out a signal of the pixel array, and a signal processing unit configured to generate a pixel signal by performing correlated double sampling on signals read out by the readout circuit from an effective pixel selected from the plurality of effective pixels, and perform shading correction on the pixel signal, wherein the readout circuit has a function of reading out a signal of the pixel array with a first gain, and a function of reading out a signal of the pixel array with a second gain different from the first gain, the readout circuit reads out a noise level with the first gain and reads out an optical signal level with the first gain or the second gain from an effective pixel selected from the plurality of effective pixels for the correlated double sampling, and in the shading correction, a pixel signal of an effective pixel from which an optical signal level has been read out with the first gain is corrected based on a first correction value, and a pixel signal of an effective pixel from which an optical signal level has been read out with the second gain is corrected based on a second correction value.

With reference to FIGS. 26 and 41 to 49 ("A" in FIG. 26 is replaced with "B in this embodiment), a photoelectric conversion apparatus B100 according to the first embodiment of the third disclosure will be described below. The photoelectric conversion apparatus B100 may be composed of a chip formed by one semiconductor layer or semiconductor substrate, may be composed of a chip formed by a plurality of semiconductor layers or semiconductor substrates, or may be composed of a plurality of chips. The photoelectric conversion apparatus B100 can be formed as an image sensor or an apparatus including an image sensor.

FIG. 26 exemplarily shows the arrangement of the photoelectric conversion apparatus B100 according to the first embodiment of the third disclosure. The photoelectric conversion apparatus B100 can include a pixel array B101 which includes a plurality of pixels B102 arranged so as to form a plurality of rows and a plurality of columns. In order to distinguish the pixel B102 from a reference pixel and OB pixel to be described later, the pixel B102 can also be referred to as an effective pixel. The pixel array B101 can include a plurality of column signal lines B110. Each column of the pixel array B101 can be assigned with at least one column signal line B110. The photoelectric conversion apparatus B100 can also include a readout circuit B105 that reads out signals of the pixel array B101. The readout circuit B105 can have a function of reading out a signal of the pixel array B101 with a first gain, and a function of reading out a signal of the pixel array B101 with a second gain different from the first gain. The readout circuit B105 may be understood to have a function of reading out signals of the pixel array B101 with a plurality of gains different from each other. The readout circuit B105 can include a plurality of column circuits, and each column circuit can be configured to read out signals of the pixel array B101 through at least one column signal line B110.

The photoelectric conversion apparatus B100 can include a signal processing unit B108 that performs a correlated double sampling process (CDS process) and a correction process on signals read out from the pixels B102 (effective pixels) in the pixel array B101 by the readout circuit B105. The photoelectric conversion apparatus B100 can further include a vertical scanning unit B103, a control unit B104, and a horizontal scanning unit B107. In an arrangement example, the signal processing unit B108 can form a part of the photoelectric conversion apparatus B100. In another arrangement example, the signal processing unit B108 does not form a part of the photoelectric conversion apparatus B100. In this case, a system including the photoelectric conversion apparatus B100 and the signal processing unit B108 can be understood as a photoelectric conversion system. In such a photoelectric conversion system, the function of the signal processing unit B108 may be provided by a computer such as a personal computer, may be provided by a processor such as an ASIC, or may be implemented by another arrangement.

In the example shown in FIG. 26, the plurality of pixels B102 forming the pixel array B101 are arranged so as to form a matrix of m columns and n rows. The pixel unit B102 can also be written as a pixel P(i, j) to indicate its position. i indicates the column where the pixel P(i, j) is arranged, and j indicates the row where the pixel P(i, j) is arranged. The vertical scanning unit B103 selects one row from n rows by n sets of row selection lines B109 (V(j) (j=1 to n)). Selecting a row means selecting m pixels B102 arranged in the row. The signals of the pixels B102 arranged in the selected row can be read out by the readout circuit B105 via the column signal lines B110 (H(i) (i=1 to m)). Readout by the readout circuit B105 includes a process of converting (that is, A/D-converting) a plurality of analog signals output from the pixels B102 to the column signal lines B110 into a plurality of digital signals in parallel, and the plurality of digital signals are temporarily stored in a memory unit B106. The readout circuit B105 may include an amplification circuit and the like. The amplification circuit can amplify the signal output from the pixel B102. The plurality of digital signals stored in the memory unit B106 can be then sequentially selected by the horizontal scanning unit B107 and supplied to the signal processing unit B108. The signal processing unit B108 processes the digital signals supplied as described above, and outputs signals obtained by the process. The control unit B104 can acquire setting information for setting the image capturing condition and the like in image capturing by the photoelectric conversion apparatus B100, and supply a control signal corresponding to the image capturing condition to each component included in the photoelectric conversion apparatus B100. The control unit B104 can be configured to control the vertical scanning unit B103, the readout circuit B105, the memory unit B106, the horizontal scanning unit B107, and the signal processing unit B108 based on the setting information.

Figure 42:
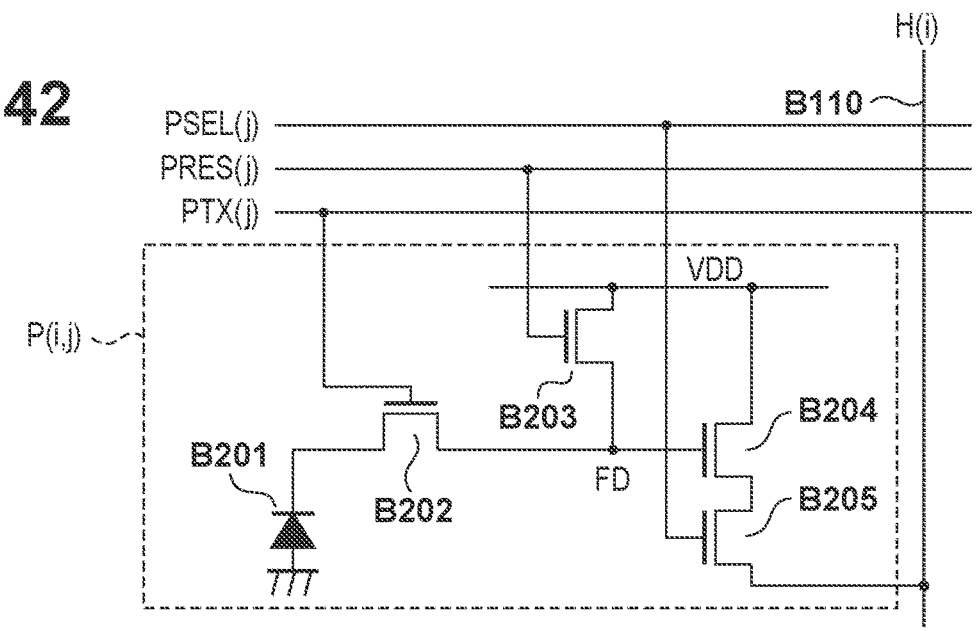
FIG. 42 is a view exemplarily showing the arrangement of a pixel of the third disclosure.

FIG. 42 shows an arrangement example of the pixel B102(P(i, j)). The pixel B102 can include, for example, a photoelectric conversion element B201, a transfer transistor B202, a floating diffusion FD, a reset transistor B203, an amplification transistor B204, and a selection transistor B205. The photoelectric conversion element B201 performs photoelectric conversion, thereby generating electric charges corresponding to the incident light amount. The photoelectric conversion element B201 is, for example, a photodiode. The transfer transistor B202 transfers the electric charges generated by photoelectric conversion in the photoelectric conversion element B201 to the floating diffusion FD. The electric charges transferred to the floating diffusion FD are converted into a potential by an electrostatic capacitance included in the floating diffusion FD. The amplification transistor B204 outputs a signal corresponding to the potential of the floating diffusion FD to the column signal line B110. The reset transistor B203 resets the potential of the floating diffusion FD to a predetermined potential. One row selection line B109 (V(j)) described above includes a transfer control line PTX(j), a reset control line PRES(j), and a row selection line PSEL(j) used to control the transfer transistor B202, the reset transistor B203, and the selection transistor B205, respectively. Note that a transfer control signal, a reset control signal, and a row selection signal respectively supplied to the transfer control line PTX(j), the reset control line PRES(j), and the row selection line PSEL(j) are also identified as PTX(j), PRES(j), and PSEL(j), respectively.

Figure 43:
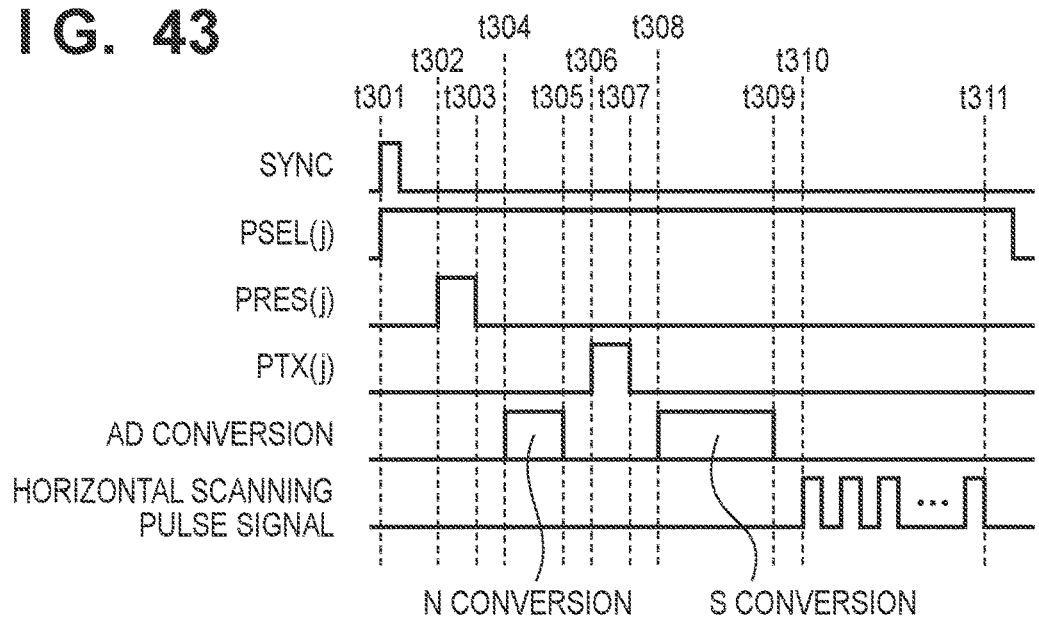
FIG. 43 is a view for explaining a basic readout operation of the photoelectric conversion apparatus according to the first embodiment of the third disclosure.

Next, with reference to FIG. 43, a basic readout operation in the photoelectric conversion apparatus B100 will be described. FIG. 43 exemplarily shows a timing chart of the operation of reading out signals from the pixel array B101. Here, the operation of reading out signals from the pixel B102 in the jth row by the vertical scanning unit B103 is representatively shown. Note that signals shown in FIG. 43 are high-active signals.

At time t301, a horizontal synchronization signal SYNC is activated to high level, and the row selection signal PSEL(j) of the jth row is activated to high level. If the row selection signal PSEL(j) is set at high level, the selection transistor B205 of the pixel B102 in the selected row is set in the ON state, and the pixel B102 in the selected row is electrically connected to the column signal line B110.

At time t302, the reset control signal PRES(j) is activated to high level. This sets the reset transistor B203 of the pixel B102 in the ON state, and the floating diffusion FD is reset to the reset potential corresponding to a power supply potential VDD.

At time t303, the reset control signal PRES(j) is inactivated to low level, and the reset transistor B203 is set in the OFF state. Thus, the reset of the potential of the floating diffusion FD is released. Since the selection transistor B205 is kept in the ON state, a signal corresponding to the gate potential of the amplification transistor B204 at the time of release of the reset of the potential of the floating diffusion FD is output to the column signal line B110. In the period from time t303 to time t306, a noise level (N level) is output from the pixel B102 to the column signal line B110.

In the period from time t304 to time t305, the noise level output to the column signal line B110 can be read out as a digital signal by the readout circuit B105. The digital signal of the noise level read out by the readout circuit B105 is stored in the memory unit B106. The operation performed in the period from time t304 to time t305, that is, the operation of converting the noise level into the digital signal is referred to as N conversion.

At time t306, the transfer control signal PTX(j) is activated to high level. This sets the transfer transistor B202 of the pixel B102 in the ON state, and electric charges generated by photoelectric conversion in the photoelectric conversion element B201 are transferred to the floating diffusion FD. A signal corresponding to the electric charges generated in the photoelectric conversion element B201 is output to the column signal line B110. In the period from time t306 to time t310, an optical signal level (S level) is output from the pixel B102 to the column signal line B110.

At time t307, the transfer control signal PTX(j) is inactivated to low level. This sets the transfer transistor B202 in the OFF state. Even after the transfer transistor B202 is set in the OFF state, the optical signal level continues to be output to the column signal line B110.

In the period from time t308 to time t309, the optical signal level output to the column signal line B110 is read out as a digital signal by the readout circuit B105. The digital signal of the optical signal level read out by the readout circuit B105 is stored in the memory unit B106. The operation performed in the period from time t308 to time t309, that is, the operation of converting the optical signal level into the digital signal is referred to as S conversion.

In the period from time t310 to time t311, in accordance with a horizontal scanning pulse signal output from the horizontal scanning unit B107, a pair of the noise level and the optical signal level held in the memory unit B106 is output from the memory unit B106 to the signal processing unit B108. By repeating the horizontal scanning until the last column, readout of pairs of the noise levels and the optical signal levels of the pixels B102 for one row arranged in the readout target row is completed. The signal processing unit B108 includes a CDS circuit that performs a CDS process of generating a pixel signal by subtracting the noise level from the optical signal level. The CDS circuit outputs a pixel signal having undergone the CDS process.

Figure 44A:
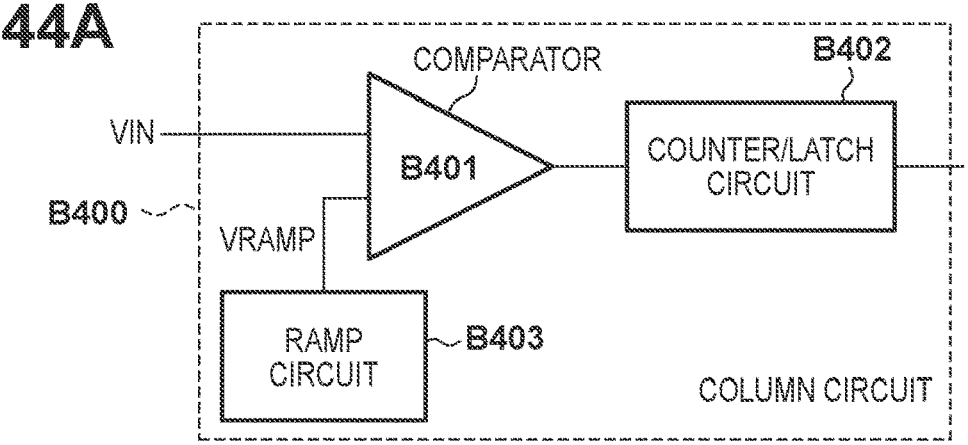

Next, with reference to FIGS. 44A and 44B, the arrangement and principle of A/D conversion performed by the readout circuit B105 will be exemplarily described. The readout circuit B105 includes, for each column, a column circuit B400 including an A/D converter, and the A/D converter can include a comparator B401, a counter/latch circuit B402, and a ramp circuit B403 as exemplarily shown in FIG. 44A. The ramp circuit B403 is a circuit that generates or outputs a reference signal VRAMP (ramp signal) which changes at a constant change rate (time change rate), that is, changes with a constant slope. The comparator B401 compares a signal VIN output from the pixel array B101 to the column signal line B110 with the reference signal VRAMP output from the ramp circuit B403, and outputs the comparison result.

As exemplarily shown in FIG. 44B, prior to the start of readout of the signal VIN output from the pixel array B101, the operation of the comparator B401 is started (time t4010). Once the signal VIN output from the pixel array B101 stabilizes, the count value of the counter/latch circuit B402 is reset at time t4011. In synchronization with the timing of reset of the count value of the counter/latch circuit B402, the level of the reference signal VRAMP output from the ramp circuit B403 increases along with the time elapse from time t4011. If the level of the reference signal VRAMP output from the ramp circuit B403 exceeds the optical signal level of the signal VIN output from the pixel array B101, the output of the comparator B401 is inverted (time t4012). The counter/latch circuit B402 performs a count operation in the period (time t4011 to time t4012) from the reset of the count value to the inversion of the output of the comparator B401. With this operation, the count value proportional to the level of the signal output from the pixel array B101 can be obtained, and the obtained count value serves as the result of A/D conversion. Note that the method of comparing the signal from the pixel array B101 with the reference signal, the comparison method by the counter/latch circuit, and the like described here are merely examples, and other methods may be used as long as the period from the reset of the count value to the inversion of the output of the comparator B401 can be detected.

FIG. 45 exemplarily shows the operation of one column circuit B400 in the readout circuit B105 according to the first embodiment of the third disclosure. In FIG. 45, the abscissa exemplarily represents time, the ordinate in the upper stage exemplarily represents the level of the reference signal and the level of the signal from the pixel array B101, and the ordinates in the lower stage exemplarily represents the output of the comparator B401. Here, an example will be described in which the change rate (slope) of the reference signal VRAMP output from the ramp circuit B403 is changed in accordance with the level of the signal VIN output from the pixel array B101. The ramp circuit B403 can selectively generate or output a first reference signal VRAMP-1 which changes at a first change rate, a second reference signal VRAMP-2 which changes at a second change rate whose change rate (slope) is larger than the first range rate, and a determination reference signal.

First, in order to perform A/D conversion of the noise level (N level), the operation of the comparator B401 is started at time t501. The count of the counter/latch circuit B402 is reset at time t502, and the level of the reference signal VRAMP output from the ramp circuit B403 is changed at the first change rate. Since the noise level is small, the first reference signal VRAMP-1 (first ramp signal) having a small slope is used for A/D conversion of the noise level. The counter/latch circuit B402 performs the count operation in the period (time t502 to time t503) from the reset of the count to the inversion of the output of the comparator B401. With this, the noise level is A/D-converted.

Then, in the level determination period, the column circuit B400 determines the optical signal level which is the signal corresponding to electric charges accumulated in the photoelectric conversion element B201 in the pixel B102 in the pixel array B101. In the level determination period, the ramp circuit B403 outputs, to the comparator B401, the determination reference signal with a determination level Vs as the maximum level. The determination level Vs is a threshold value for determination. The comparator B401 compares the signal VIN output from the pixel array B101 with the determination reference signal. Here, the count value of the counter/latch circuit B402 is reset at time t504, and the ramp circuit B403 starts to output the determination reference signal. If the level of the signal VIN (optical signal level) output from the pixel array B101 is larger than the determination level Vs (S>Vs), the output of the comparator B401 is not inverted, so that the count value continues to increase until the level determination period ends at time t506. On the other hand, if the level of the signal VIN output from the pixel array B101 is smaller than the determination level Vs (S<Vs), for example, the output of the comparator B401 is inverted at time t505, so that the count value stops increasing. In this manner, based on the count value of the counter/latch circuit B402, the column circuit B400 can determine whether the optical signal level is larger or smaller than the determination level Vs.

The column circuit B400 supplies the result of determination as to whether the optical signal level is larger or smaller than the determination level Vs to the memory unit B106 as luminance determination information (luminance determination information LL to be described later). The luminance determination information is stored in the memory unit B106 while being associated with the digital signal generated by the column circuit B400. The luminance determination information can be, for example, information which has a value 1 (=high) if the optical signal level (S) is larger than the determination level Vs (S>Vs), and has a value 0 (=low) if the optical signal level is smaller than the determination level Vs (S<Vs). Note that it may be controlled such that the timing of resetting the count value of the counter/latch circuit B402 is the time at which the output of the ramp circuit B403 stabilizes at the determination level Vs, and the count value becomes 0 if the optical signal level (S) is smaller than the determination level Vs (S<Vs).

If the optical signal level (S) is smaller than the determination level Vs (S<Vs), from time t507, the optical signal level can be A/D-converted using the first reference signal VRAMP-1 as in A/D conversion of the noise level. With this, in the example shown in FIG. 45, the count value can be obtained in the period from time t507 to time t508. On the other hand, if the optical signal level (S) is larger than the determination level Vs, the optical signal level can be A/D-converted using the second reference signal VRAMP-2 which changes at the second change rate that is a times the first change rate of the first reference signal VRAMP-1. With this, in the example shown in FIG. 45, the count value can be obtained in the period from time t507 to time t509. Here, the first change rate of the first reference signal VRAMP-1 and the second change rate of the second reference signal VRAMP-2 can be understood as the gains of readout by the readout circuit B105, and correspond to the first gain and the second gain, respectively. That is, readout of the signal from the pixel array B101 using the first reference signal VRAMP-1 corresponds to readout of the signal from the pixel array B101 with the first gain. Further, readout of the signal from the pixel array B101 using the second reference signal VRAMP-2 corresponds to readout of the signal from the pixel array B101 with the second gain. That is, the readout circuit B105 has a function of reading out a signal of the pixel array B101 with the first gain, and a function of reading out a signal of the pixel array B101 with the second gain different from the first gain.

Figure 46:
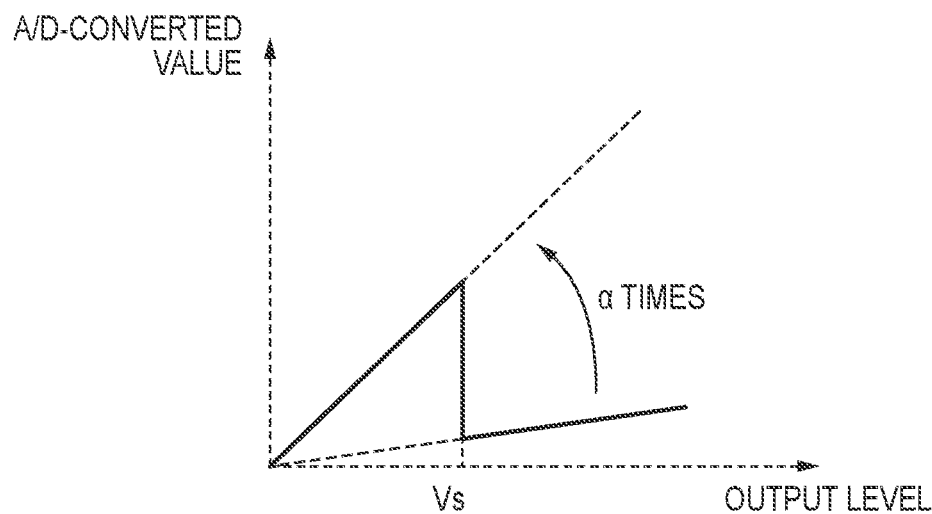
FIG. 46 is a view exemplarily showing the relationship between an optical signal level and the result of A/D conversion in a case in which the change rate (slope) of a reference signal is changed in accordance with the optical signal level according to the third disclosure.

FIG. 46 exemplarily shows the relationship between the optical signal level and the result of A/D conversion in a case in which the change rate (slope) of the reference signal is changed in accordance with the optical signal level. The abscissa of FIG. 46 represents the optical signal level output from the pixel array B101, and the ordinate represents the result (A/D-converted value) of A/D conversion of the optical signal level. The solid line indicates the digital value (A/D-converted value) having undergone A/D conversion by the comparator B401 and the counter/latch circuit B402 and supplied to the signal processing unit B108 via the horizontal scanning unit B107. As has been described above, the optical signal level having a value smaller than the determination level Vs is A/D-converted using the first reference signal VRAMP-1, and the optical signal level having a value larger than the determination level Vs is A/D-converted using the second reference signal VRAMP-2. Therefore, as shown in FIG. 46, the optical signal level after A/D conversion becomes discontinuous before and after the determination level Vs.

To solve this problem, the signal processing unit B108 multiplies the A/D-converted value of the optical signal level larger than the determination level Vs by a ratio $\alpha$, which is the ratio (second change rate/first change rate) of the first change rate of the first reference signal VRAMP-1 and the second change rate of the second reference signal VRAMP-2.

Subsequently, the principle of the basic reset noise removal process performed in the signal processing unit B108 will be described. The A/D-converted optical signal level described with reference to FIG. 45 includes not only the signal component corresponding to the electric charges accumulated in the photoelectric conversion element B201 of the pixel B102 in the pixel array B101, but also a noise component such as reset noise due to the reset transistor B203. On the other hand, the A/D-converted noise level described with reference to FIG. 45 includes a noise component such as reset noise due to the reset transistor B203. Therefore, by performing the CDS process of subtracting the A/D-converted noise level from the A/D-converted optical signal level, it is possible to reduce the reset noise from the optical signal level.

If the optical signal level is smaller than the determination level Vs, reset noise removal by the CDS process can be expressed as:

$$(SL+NL+DL(T2))-(NL+DL(T1))=SL+DL(T2)-DL(T1) \quad (B1)$$

In equation (B1), SL is the optical signal level having undergone A/D conversion using the first reference signal VRAMP-1, and NL is the noise level having undergone A/D conversion using the first reference signal VRAMP-1. Further, in equation (B1), each of DL(T2) and DL(T1) is a value obtained by converting, into an error component, the amount of response delay of the comparator B401 in a case of using the first reference signal VRAMP-1. The amount of response delay corresponds to the time from the timing at which the value of the signal output from the pixel array B101 exceeds the value of the first reference signal VRAMP-1 to the inversion of the output of the comparator B401 in response thereto. This amount of response delay appears as an error in the result of A/D conversion. DL(T) is expressed as a function of T because it has dependency on the time (T) of A/D conversion. T1 is the time when the noise level is A/D-converted using the first reference signal VRAMP-1, and T2 is the time when the optical signal level is A/D-converted using the first reference signal VRAMP-1. DL(T2)−DL(T1), which is the influence of the amount of response delay of the comparator B401, cannot be reduced by the CDS process. Since DL(T2)−DL(T1) has dependency on the time T of A/D conversion, it appears as a contrast changing in the vertical direction (column direction) in an image output from the photoelectric conversion apparatus B100. This is referred to as vertical shading. The vertical shading is corrected by the signal processing unit B108.

On the other hand, if the optical signal level is larger than the determination level Vs, reset noise removal by the CDS process can be expressed as:

$$\alpha \times (SH+NH+DH(T3))-(NL+DL(T1))=\alpha SH+\alpha DH(T3)-DL(T1) \quad (B2)$$

In equation (B2), SH is the optical signal level having undergone A/D conversion using the second reference signal VRAMP-2, and NH is the noise level having undergone A/D conversion using the second reference signal VRAMP-2. Further, in equation (B2), DH(T3) is a value obtained by converting, into an error component, the amount of response delay of the comparator B401 in a case of using the second reference signal VRAMP-2. The amount of response delay corresponds to the time from the timing at which the value of the signal output from the pixel array B101 exceeds the value of the second reference signal VRAMP-2 to the inversion of the output of the comparator B401 in response thereto. This amount of response delay appears as an error in the result of A/D conversion. Since αNH and NL of the left-hand side of equation (B2) indicate the same noise level, it can be regarded that NL=αNH. However, the reference signal for A/D conversion of the optical signal level and the reference signal for A/D conversion of the noise level are different, and the time of A/D conversion is also different. Therefore, αDH(T3)−DL(T1), which is the influence of the amount of response delay of the comparator B401, cannot be reduced by the CDS process. Since αDH(T3)−DL(T1) has dependency on the time T of A/D conversion, it appears as a contrast changing in the vertical direction (column direction) in an image output from the photoelectric conversion apparatus B100. This is referred to as vertical shading. The vertical shading is corrected by the signal processing unit B108.

Figure 47:
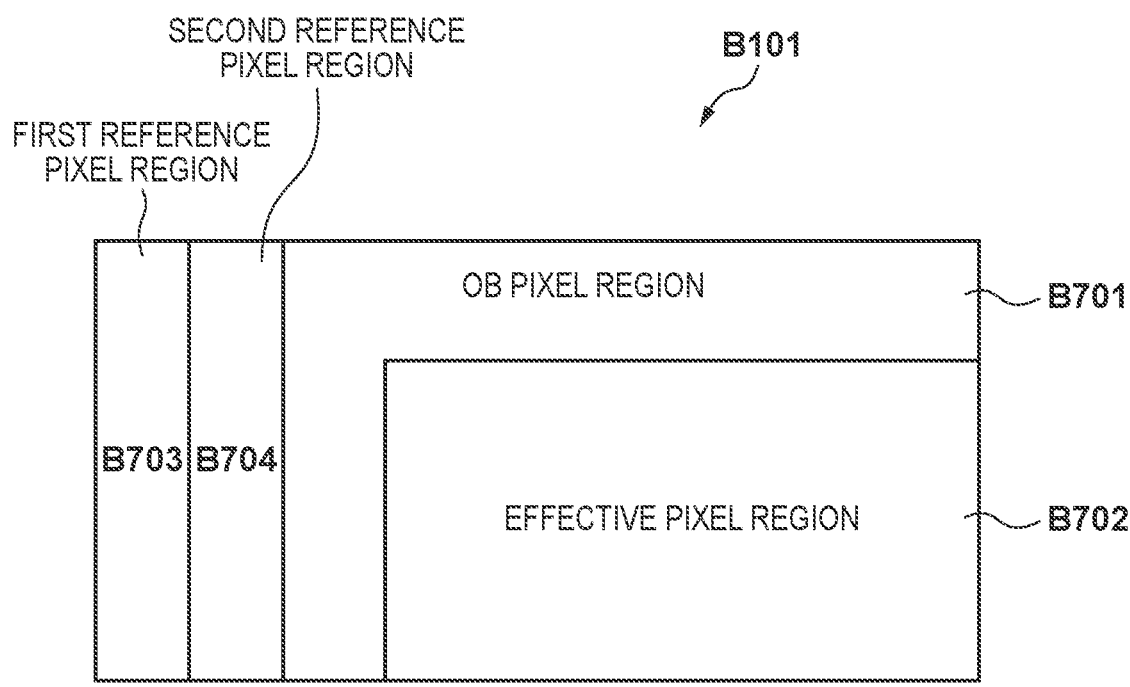
FIG. 47 is a view exemplarily showing the arrangement of a pixel array in the first embodiment of the third disclosure.

The first embodiment of the third disclosure provides a function of removing or reducing the influence of vertical shading in the photoelectric conversion apparatus B100 that includes the readout circuit B105 which reads out signals from the pixel array B101 with a gain selected from a plurality of gains. With reference to FIGS. 47 to 49, the arrangement and operation of the photoelectric conversion apparatus B100 according to the first embodiment of the third disclosure will be described below.

FIG. 47 exemplarily shows the arrangement of the pixel array B101. The pixel array B101 includes an effective pixel region B702 for generating a pixel signal or an image signal by photoelectric conversion. The effective pixel region B702 is a region where the plurality of pixels (effective pixels) B102 are arranged so as to form the plurality of rows and the plurality of columns. The pixel array B101 can further include a first reference pixel region B703 and a second reference pixel region B704. In the reference pixel regions B703 and B704, a plurality of reference pixels, each of which outputs a noise level, can be arranged. In the first reference pixel region B703, a plurality of reference pixels can be arranged so as to form at least one column, and preferably a plurality of columns. Similarly, in the second reference pixel region B704, a plurality of reference pixels can be arranged so as to form at least one column, and preferably a plurality of columns. The reference pixel can have an arrangement obtained by, for example, removing the photoelectric conversion element from the pixel B102. The reference pixel is shielded from light by a light shielding film. The reference pixel can be used to generate a correction value for removing or reducing the influence of vertical shading described above. The first reference pixel region B703 can be used to generate the first correction value for correcting the pixel signal output from the pixel B102 which has output an optical signal level smaller than the determination level Vs, and having undergone a CDS process. The second reference pixel region B704 can be used to generate the second correction value for correcting the pixel signal output from the pixel B102 which has output an optical signal level larger than the determination level Vs, and having undergone a CDS process. The pixel array B101 can further include an Optical Black (OB) pixel region B701. A plurality of OB pixels, each of which outputs an OB level, are arranged in the OB pixel region B701. The OB pixel can be, for example, a pixel having the same arrangement as that of the pixel B102 but covered with a light shielding film. The OB pixel region B701 can include multiple OB pixels connected to the plurality of column signal lines B110 arranged in the effective pixel region B702, and multiple OB pixels connected to the plurality of row selection lines B109 arranged in the effective pixel region B702.

In the photoelectric conversion apparatus B100 according to the first embodiment of the third disclosure, a calibration operation for generating a correction value used to correct vertical shading, and an image capturing operation for generating an image by photoelectric conversion are executed. In the calibration operation, the readout circuit B105 reads out signals from the reference pixels in the reference pixel regions B703 and B704, and the signal processing unit B108 processes the signals. Thus, the first and second correction values can be generated.

In the first embodiment of the third disclosure, the first correction value is generated by processing a signal obtained by reading out a noise level from the first reference pixel region B703 by the readout circuit B105. Further, in the first embodiment of the third disclosure, the second correction value is generated by processing a signal obtained by reading out a noise level from the second reference pixel region B704 by the readout circuit B105.

Figure 48A:
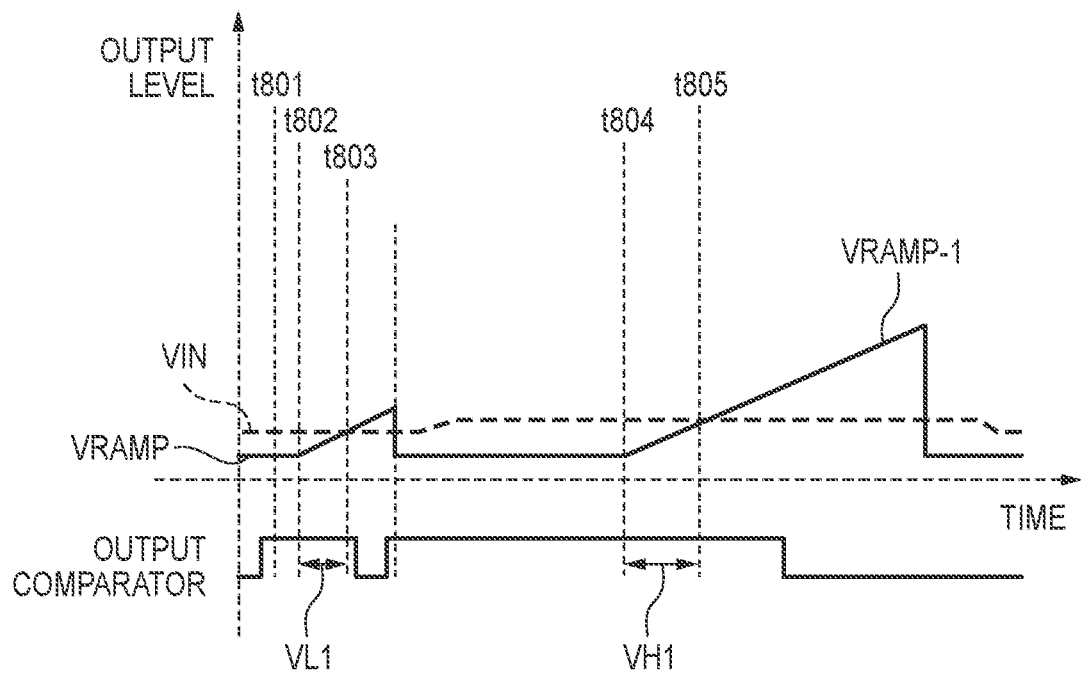
FIGS. 48A and 48B are views exemplarily showing an operation of reading out a signal from a reference pixel region in a calibration operation according to the first embodiment of the third disclosure.
Figure 49:
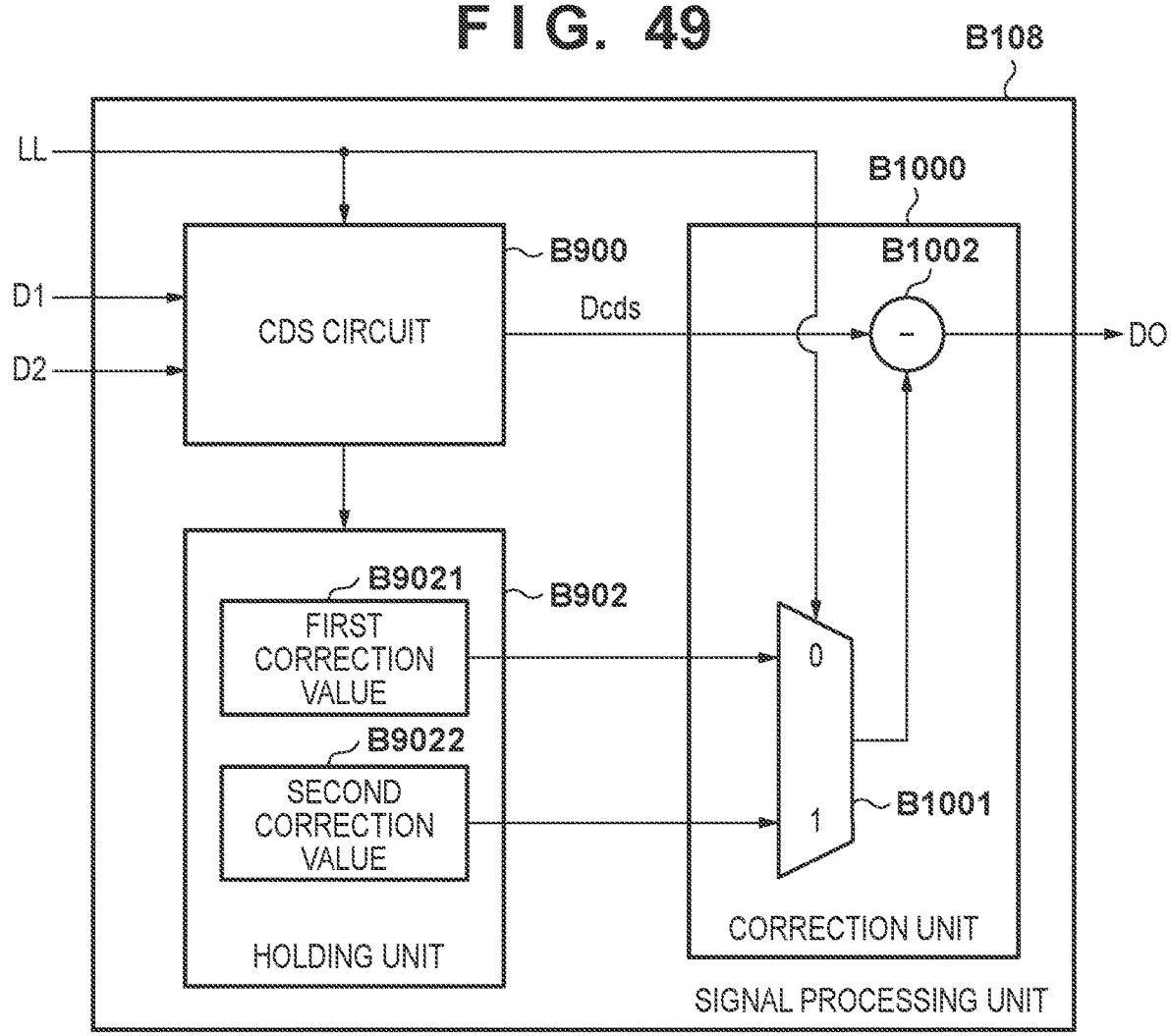
FIG. 49 is a view exemplarily showing the arrangement of a signal processing unit in the first embodiment of the third disclosure.

FIG. 48A exemplarily shows an operation of reading out a signal from the reference pixel in the first reference pixel region B703 in the calibration operation. First, an operation of A/D-converting a predetermined voltage (here, a predetermined voltage VL1 for the sake of descriptive convenience) by the column circuit B400 of the readout circuit B105 is performed. More specifically, the operation of the comparator B401 is started at time t801. At time t802, the count of the counter/latch circuit B402 is reset, and the first reference signal VRAMP-1, which changes at the first change rate, is supplied from the ramp circuit B403 to the comparator B401. By performing a count operation in the period (time t802 to time t803) from the reset of the count of the counter/latch circuit B402 to the inversion of the output of the comparator B401, the predetermined voltage VL1 is A/D-converted.

Then, a predetermined voltage (here, a predetermined voltage VH1 for the sake of descriptive convenience) is A/D-converted. More specifically, at time t804, the count of the counter/latch circuit B402 is reset, and the first reference signal VRAMP-1 is supplied from the ramp circuit B403 to the comparator B401. By performing the count operation in the period (time t804 to time t805) from the reset of the count of the counter/latch circuit B402 to the inversion of the output of the comparator B401, the predetermined voltage VH1 is A/D-converted.

Figure 48B:
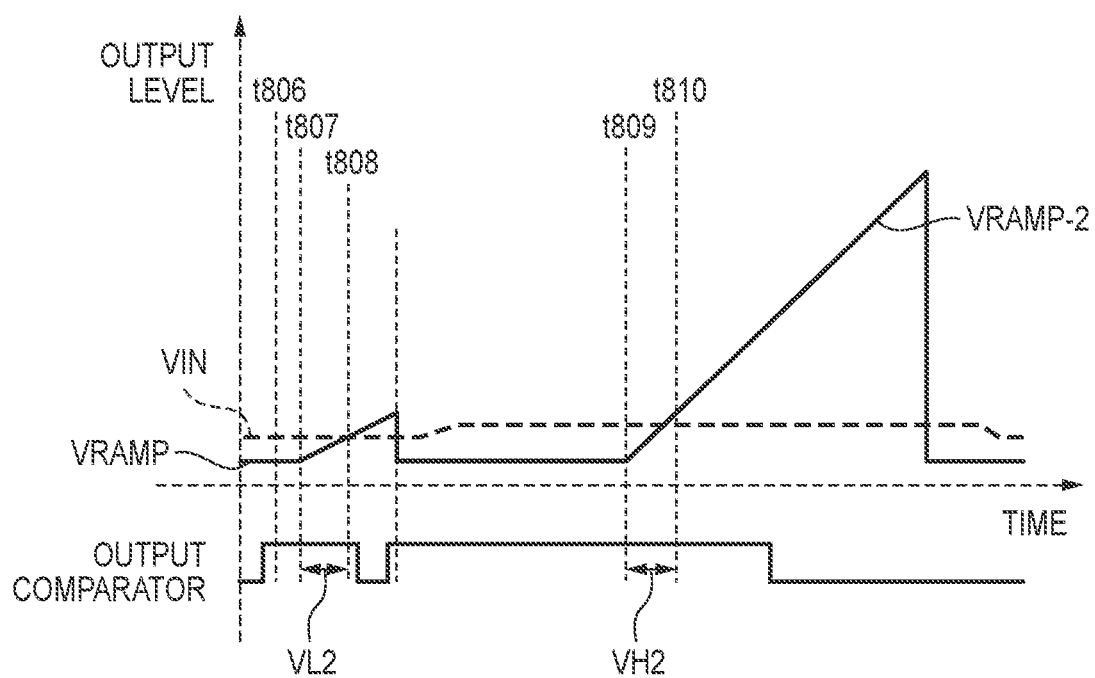

FIG. 48B exemplarily shows an operation of reading out a signal from the reference pixel in the second reference pixel region B704 in the calibration operation. First, an operation of A/D-converting a predetermined voltage (here, a predetermined voltage VL2 for the sake of descriptive convenience) by the column circuit B400 of the readout circuit B105 is performed. More specifically, the operation of the comparator B401 is started at time t806. At time t807, the count of the counter/latch circuit B402 is reset, and the first reference signal VRAMP-1, which changes at the first change rate, is supplied from the ramp circuit B403 to the comparator B401. By performing the count operation in the period (time t807 to time t808) from the reset of the count of the counter/latch circuit B402 to the inversion of the output of the comparator B401, the predetermined voltage VL2 is A/D-converted.

Then, a predetermined voltage (here, a predetermined voltage VH2 for the sake of descriptive convenience) is A/D-converted. More specifically, at time t809, the count of the counter/latch circuit B402 is reset, and the second reference signal VRAMP-2 is supplied from the ramp circuit B403 to the comparator B401. By performing the count operation in the period (time t809 to time t810) from the reset of the count of the counter/latch circuit B402 to the inversion of the output of the comparator B401, the predetermined voltage VH2 is VD-converted. As has been described above, the second reference signal VRAMP-2 is a ramp signal which changes at the second change rate that is α times the first change rate of the first reference signal VRAMP-1.

FIG. 49 exemplarily shows an arrangement example of the signal processing unit B108. The signal processing unit B108 can include a CDS circuit B900 that performs a CDS process on a pair of digital signals provided from the pixel array B101 (effective pixel, reference pixel, or OB pixel) via the column signal line B110, the readout circuit B105, and the memory unit B106. Here, in the image capturing operation, when reading out signals from the effective pixel, the pair of digital signals supplied to the CDS circuit B900 is composed of the digital signal of the noise level and the digital signal of the optical signal level. In the image capturing operation, when reading out signals from the OB pixel, the pair of digital signals supplied to the CDS circuit B900 is composed of the digital signal of the reset level and the digital signal of the dark level which is read out while setting the transfer transistor B202 in the ON state.

In the calibration operation, signals are read out from the reference pixels in the first reference pixel region B703 and the second reference pixel region B704. The readout circuit B105 can perform readout of the signal from the reference pixel in the first reference pixel region B703 and readout of the signal from the reference pixel in the second reference pixel region B704 in parallel, that is, simultaneously.

First, a process of generating the first correction values for one column (n pieces) by reading out signals from the reference pixels in the first reference pixel region B703 will be described. As has been described with reference to FIG. 48A, the pair of digital signals supplied to the CDS circuit B900 is composed of a first digital signal D1 read out with the first gain (first reference signal VRAMP-1) and a second digital signal D2 read out with the first gain. The first digital signal D1 can be expressed as NL+DL(T1). The second digital signal D2 can be expressed as NL+DL(T2). Accordingly, an output of the CDS circuit B900 can be expressed as:

$$(NL+DL(T2))-(NL+DL(T1))=DL(T2)-DL(T1) \quad (B3)$$

The right-hand side of equation (B3) corresponds to DL(T2)−DL(T1) which is vertical shading to be removed in the right-hand side of equation (B1). That is, when signals read out from the first reference pixel region B703 are input in the calibration operation, the CDS circuit B900 outputs DL(T2)−DL(T1). DL(T2)−DL(T1) can be used as the first correction value for correcting the pixel signal read out from the pixel B102 which has output an optical signal level smaller than the determination level Vs, and having undergone a CDS process by the CDS circuit B900. In other words, DL(T2)−DL(T1) can be used as the first correction value for correcting the pixel value read out from the pixel B102 which has output an optical signal level with the luminance determination information LL of 0, and having undergone the CDS process by the CDS circuit B900.

The signal processing unit B108 may include a holding unit B902, and the holding unit B902 can include a first holding region B9021 for holding at least the first correction values for one column (n pieces). Here, multiple pairs of digital signals may be acquired by reading out signals multiple times from each reference pixel in the first reference pixel region B703, and the average value of multiple first provisional correction values obtained by supplying the multiple pairs of digital signals to the CDS circuit B900 may be used as the first correction value. Alternatively, if the first reference pixel region B703 includes the plurality of columns of reference pixels, the average value of multiple first provisional correction values obtained from the plurality of columns of reference pixels may be used as the first correction value. Alternatively, a value obtained by performing filter processing on a plurality of first provisional correction values obtained from the plurality of reference pixels in the first reference pixel region B703 may be used as the first correction value. The CDS circuit B900 can also be understood as a generation circuit that generates the first correction value.

Next, a process of generating the second correction values for one column (n pieces) by reading out signals from the reference pixels in the second reference pixel region B704 will be described. As has been described with reference to FIG. 48B, the pair of digital signals is composed of the first digital signal D1 read out with the first gain (first reference signal VRAMP-1) and the second digital signal D2 read out with the second gain (second reference signal VRAMP-2). The first digital signal D1 can be expressed as NL+DL(T1). The second digital signal D2 can be expressed as NL+DH(T3). Accordingly, an output of the CDS circuit B900 can be expressed as:

$$\alpha\times(NH+DH(T3))-(NL+DL(T1))=\alpha DH(T3)-DL(T1) \quad (B4)$$

The right-hand side of equation (B4) corresponds to αDH(T3)−DL(T1) which is vertical shading to be removed in the right-hand side of equation (B2). That is, when signals read out from the second reference pixel region B704 are input in the calibration operation, the CDS circuit B900 outputs αDH(T3)−DL(T1). αDH(T3)−DL(T1) can be used as the second correction value for correcting the pixel signal read out from the pixel B102 which has output an optical signal level larger than the determination level Vs, and having undergone a CDS process by the CDS circuit B900. In other words, αDH(T3)−DL(T1) can be used as the second correction value for correcting the pixel value read out from the pixel B102 which has output an optical signal level with the luminance determination information LL of 1, and having undergone the CDS process by the CDS circuit B900.

The holding unit B902 of the signal processing unit B108 can include a second holding region B9022 for holding at least the second correction values for one column (n pieces). Here, multiple pairs of digital signals may be acquired by reading out signals multiple times from each reference pixel in the second reference pixel region B704, and the average value of multiple second provisional correction values obtained by supplying the multiple pairs of digital signals to the CDS circuit B900 may be used as the second correction value. Alternatively, if the second reference pixel region B704 includes the plurality of columns of reference pixels, the average value of multiple second provisional correction values obtained from the plurality of columns of reference pixels may be used as the second correction value. Alternatively, a value obtained by performing filter processing on a plurality of second provisional correction values obtained from the plurality of reference pixels in the second reference pixel region B704 may be used as the second correction value. The CDS circuit B900 can also be understood as a generation circuit that generates the second correction value.

The signal processing unit B108 can include a correction unit B1000 that corrects, using the first correction value or the second correction value provided from the holding unit B902, the signal (corresponding to the right-hand side of equation (B1) or equation (B2)) output from the CDS circuit B900 in the image capturing operation. The correction unit B1000 can include a selection unit B1001 and a subtractor B1002. In the image capturing operation, the CDS circuit B900 is provided with the pair of digital signals read out from the effective pixel or OB pixel via the column signal line B110 by the readout circuit B105 and stored in the memory unit B106, and the luminance determination information LL. The CDS circuit B900 supplies, to the correction unit B1000, a signal (corresponding to the right-hand side of equation (B1) or equation (B2)) Dcds obtained by performing the CDS process on the pair of digital signals, and the signal Dcds is supplied to the subtractor B1002.

The holding unit B902 can supply, to the selection unit B1001, the first correction value (corresponding to the right-hand side of equation (B3)) corresponding to the pair of digital signals among a plurality of first correction values stored in the first holding region B9021. The holding unit B902 can also supply, to the selection unit B1001, the second correction value (corresponding to the right-hand side of equation (B4)) corresponding to the pair of digital signals among a plurality of second correction values stored in the second holding region B9022. If the luminance determination information LL corresponding to the pair of digital signals is 0, the selection unit B1001 supplies, to the subtractor B1002, the first correction value supplied from the first holding region B9021. If the luminance determination information LL is 1, the selection unit B1001 supplies, to the subtractor B1002, the second correction value supplied from the second holding region B9022. The correction unit B1000 performs calculation of subtracting, from the signal Dcds supplied from the CDS circuit B900, the first or second correction value supplied from the selection unit B1001, and outputs the result as a pixel signal DO. This calculation can be expressed as equation (B5) if the luminance determination information LL is 0, and can be expressed as equation (B6) if the luminance determination information LL is 1.

$$SL+DL(T2)-DL(T1)-(DL(T2)-DL(T1))=SL \quad (B5)$$

$$\alpha SH+\alpha DH(T3)-DL(T1)-(\alpha DH(T3)-DL(T1))=\alpha SH \quad (B6)$$

That is, for the CDS process (correlated double sampling), the readout circuit B105 reads out the noise level with the first gain from the effective pixel selected from the plurality of effective pixels, and reads out the optical signal level with the first gain or the second gain. In shading correction, the pixel signal of the effective pixel from which the optical signal level has been read out with the first gain is corrected based on the first correction value, and the pixel signal of the effective pixel from which the optical signal level has been read out with the second gain is corrected based on the second correction value.

Vertical shading can change depending on temperature. Therefore, it is preferable to execute the calibration operation at an arbitrary timing or a timing planned in advance. Alternatively, the first correction value and the second correction value may be generated in each frame (vertical scanning period), and the signal Dcds may be corrected based on the first correction value and the second correction value in the same frame (vertical scanning period). The first correction value and the second correction value may be generated outside the photoelectric conversion apparatus B100, and provided to the photoelectric conversion apparatus B100 or the holding unit B902.

Figure 50:
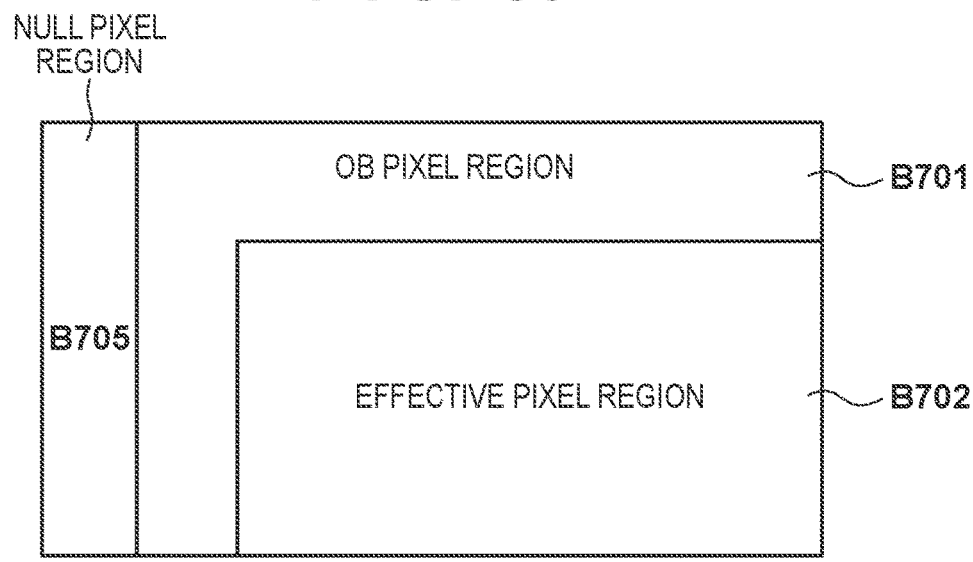
FIG. 50 is a view exemplarily showing the arrangement of a pixel array in the second embodiment of the third disclosure.
Figure 51:
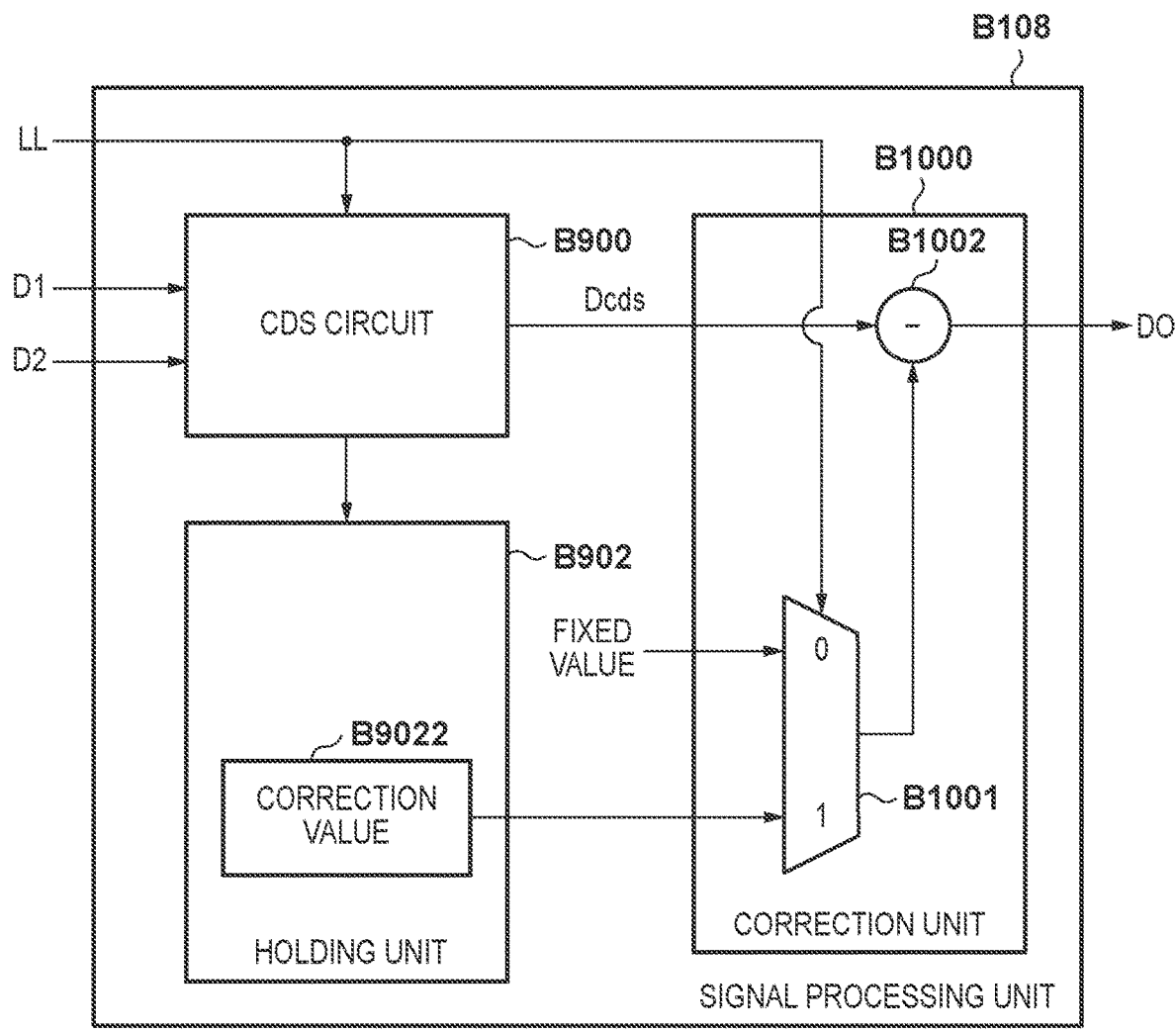
FIG. 51 is a view exemplarily showing the arrangement of a signal processing unit in the second embodiment of the third disclosure.

With reference to FIGS. 50 and 51, the arrangement and operation of a photoelectric conversion apparatus B100 according to the second embodiment of the third disclosure will be described below. Matters not mentioned as the second embodiment of the third disclosure can follow the first embodiment of the third disclosure. The photoelectric conversion apparatus B100 according to the second embodiment of the third disclosure has an arrangement obtained by removing the first reference pixel region B703 and the first holding region B9021 from the photoelectric conversion apparatus B100 according to the first embodiment of the third disclosure, and replacing the first correction value with a fixed value. The second embodiment of the third disclosure is useful in a case in which $DL(T2)-DL(T1)$ in equation (B1) described in the first embodiment of the third disclosure is negligible. In other words, the photoelectric conversion apparatus B100 of the second embodiment does not correct vertical shading if luminance determination information LL is 0.

As exemplarily shown in FIG. 50, in the second embodiment of the third disclosure, the first reference pixel region B703 and the second reference pixel region B704 in the first embodiment of the third disclosure are replaced with a reference pixel region B705. The reference pixel region B705 in the second embodiment of the third disclosure corresponds to the second reference pixel region B704 in the first embodiment of the third disclosure. FIG. 51 shows an arrangement example of a signal processing unit B108 of the second embodiment of the third disclosure. The signal processing unit B108 can include a CDS circuit B900 that performs a CDS process on a pair of digital signals provided from a pixel array B101 (effective pixel, reference pixel, or OB pixel) via a column signal line B110, a readout circuit B105, and a memory unit B106. Here, in an image capturing operation, when reading out signals from the effective pixel, the pair of digital signals supplied to the CDS circuit B900 is composed of the digital signal of the noise level and the digital signal of the optical signal level. In the image capturing operation, when reading out signals from the OB pixel, the pair of digital signals is composed of the digital signal of the reset level and the digital signal of the dark level which is read out while setting a transfer transistor 202 in the ON state.

In a calibration operation, correction values for one column (n pieces) are generated by reading out signals from the reference pixels in the reference pixel region B705. As has been described with reference to FIG. 48B, the pair of digital signals supplied to the CDS circuit B900 in the calibration operation is composed of a first digital signal D1 read out with the first gain and a second digital signal D2 read out with the second gain. The first gain corresponds to a first reference signal VRAMP-1, and the second gain corresponds to a second reference signal VRAMP-2. The first digital signal D1 can be expressed as $NL+DL(T1)$. The second digital signal D2 can be expressed as $NL+DH(T3)$. Accordingly, an output of the CDS circuit B900 can be expressed as equation (B4) described above. An output of the CDS circuit B900 in the calibration operation can be used as the correction value for correcting the pixel signal read out from a pixel B102 which has output an optical signal level with the luminance determination information LL of 1, and having undergone a CDS process by the CDS circuit B900. A holding unit B902 of the signal processing unit B108 can include a holding region B9022 for holding at least the correction values for one column (n pieces).

In the image capturing operation, a correction unit B1000 of the signal processing unit B108 corrects the signal (corresponding to the right-hand side of equation (B1) or equation (B2)) output from the CDS circuit B900 using the fixed value or the second correction value from the holding unit B902. The correction unit B1000 can include a selection unit B1001 and a subtractor B1002. In the image capturing operation, the CDS circuit B900 is provided with a pair of digital signals read out from the effective pixel or OB pixel via the column signal line B110 by the readout circuit B105 and stored in the memory unit B106, and the luminance determination information LL. The CDS circuit B900 supplies, to the correction unit B1000, a signal (corresponding to the right-hand side of equation (B1) or equation (B2)) Dcds obtained by performing the CDS process on the pair of digital signals, and the signal Dcds is supplied to the subtractor B1002. The holding unit B902 can supply, to the selection unit B1001, the correction value (corresponding to the right-hand side of equation (B4)) corresponding to the pair of digital signals among a plurality of correction values (correction values for one column) stored in the holding region B9022. If the luminance determination information LL corresponding to the pair of digital signals is 0, the selection unit B1001 can supply the fixed value to the subtractor B1002. If the luminance determination information LL is 1, the selection unit B1001 can supply, to the subtractor B1002, the correction value supplied from the holding region B9022. The correction unit B1000 performs calculation of subtracting, from the signal Dcds supplied from the CDS circuit B900, the fixed value or correction value supplied from the selection unit B1001, and outputs the result as a pixel signal DO. This calculation can be expressed as equation (B7) if the luminance determination information LL is 0, and can be expressed as equation (B8) if the luminance determination information LL is 1.

$$SL+DL(T2)-DL(T1)-(\text{fixed value}) \fallingdotseq SL \quad (B7)$$

$$\alpha SH+\alpha DH(T3)-DL(T1)-(\alpha DH(T3)-DL(T1))=\alpha SH \quad (B8)$$

A photoelectric conversion apparatus B100 according to the third embodiment of the third disclosure will be described below. Matters not mentioned as the third embodiment of the third disclosure can follow the first or second embodiment of the third disclosure. In the photoelectric conversion apparatus B100 according to the third embodiment of the third disclosure, the pixel array B101 has an arrangement as exemplarily shown in FIG. 50 described in the second embodiment of the third disclosure, that is, an arrangement including a single reference pixel region B705. In the third embodiment of the third disclosure, a first correction value and a second correction value are generated as in the first embodiment of the third disclosure using the single reference pixel region B705.

In a calibration operation in the third embodiment of the third disclosure, a first operation of reading out signals from the reference pixel region B705 to generate the first correction value and a second operation of reading out signals from the reference pixel region B705 to generate the second correction value are performed in periods different from each other.

First, a first process of generating the first correction values for one column (n pieces) by reading out signals from the reference pixels in the reference pixel region B705 by a readout circuit B105 will be described. In the first process, as exemplarily shown in FIG. 48A, signals are read out from the reference pixel in the reference pixel region B705 by the readout circuit B105, and a pair of digital signals is supplied to a CDS circuit B900. The pair of digital signals is composed a first digital signal D1 read out from the reference pixel in the reference pixel region B705 with a first gain (first reference signal VRAMP-1), and a second digital signal D2 read out from the reference pixel in the reference pixel region B705 with the first gain. The first digital signal D1 can be expressed as NL+DL(T1). The second digital signal D2 can be expressed as NL+DL(T2). Accordingly, an output of the CDS circuit B900 corresponds to DL(T2)−DL(T1) as expressed by equation (B3) described above. DL(T2)−DL(T1) can be used as the first correction value for correcting the pixel signal read out from a pixel B102 which has output an optical signal level smaller than a determination level Vs, and having undergone a CDS process by the CDS circuit B900. In other words, DL(T2)−DL(T1) can be used as the first correction value for correcting the pixel value read out from the pixel B102 which has output an optical signal level with luminance determination information LL of 0, and having undergone the CDS process by the CDS circuit B900. A holding unit B902 of a signal processing unit B108 can include a first holding region B9021 for holding at least the first correction values for one column (n pieces). Here, multiple pairs of digital signals may be acquired by reading out signals multiple times from each reference pixel in the reference pixel region B705, and the average value of multiple first provisional correction values obtained by supplying the multiple pairs of digital signals to the CDS circuit B900 may be used as the first correction value. Alternatively, if the reference pixel region B705 includes a plurality of columns of reference pixels, the average value of multiple first provisional correction values obtained from the plurality of columns of reference pixels may be used as the first correction value. Alternatively, a value obtained by performing filter processing on a plurality of first provisional correction values obtained from the plurality of reference pixels in the reference pixel region B705 may be used as the first correction value. The CDS circuit B900 can also be understood as a generation circuit that generates the first correction value.

Next, a second process of generating the second correction values for one column (n pieces) by reading out signals from the reference pixels in the reference pixel region B705 by the readout circuit B105 will be described. In the second process, as exemplarily shown in FIG. 48B, signals are read out from the reference pixel in the reference pixel region B705 by the readout circuit B105, and a pair of digital signals is supplied to the CDS circuit B900. The pair of digital signals is composed of the first digital signal D1 read out with the first gain (first reference signal VRAMP-1), and the second digital signal D2 readout with a second gain (second reference signal VRAMP-2). The first digital signal D1 can be expressed as NL+DL(T1). The second digital signal D2 can be expressed as NL+DH(T3). Accordingly, an output of the CDS circuit B900 corresponds to αDH(T3)−DL(T1) as expressed by equation (B4) described above. αDH(T3)−DL(T1) can be used as the second correction value for correcting the pixel signal read out from the pixel B102 which has output an optical signal level larger than the determination level Vs, and having undergone a CDS process by the CDS circuit B900. In other words, αDH(T3)−

DL(T1) can be used as the second correction value for correcting the pixel value read out from the pixel B102 which has output an optical signal level with the luminance determination information LL of 1, and having undergone the CDS process by the CDS circuit B900. The holding unit B902 of the signal processing unit B108 can include a second holding region B9022 for holding at least the second correction values for one column (n pieces). Here, multiple pairs of digital signals may be acquired by reading out signals multiple times from each reference pixel in the reference pixel region B705, and the average value of multiple second provisional correction values obtained by supplying the multiple pairs of digital signals to the CDS circuit B900 may be used as the second correction value. Alternatively, if the reference pixel region B705 includes a plurality of columns of reference pixels, the average value of multiple second provisional correction values obtained from the plurality of columns of reference pixels may be used as the second correction value. Alternatively, a value obtained by performing filter processing on a plurality of second provisional correction values obtained from the plurality of reference pixels in the reference pixel region B705 may be used as the second correction value. The CDS circuit B900 can also be understood as a generation circuit that generates the second correction value.

The operation of a correction unit B1000 in an image capturing operation in the third embodiment of the third disclosure is similar to that in the first embodiment of the third disclosure.

If the size of the reference pixel region is the same, the time required for generating the first and second correction values is longer in the third embodiment of the third disclosure than in the first embodiment of the third disclosure, but the number of data that can be used to generate the first and second correction values is larger in the third embodiment of the third disclosure than in the first embodiment of the third disclosure. Therefore, the third embodiment of the third disclosure is advantageous in reducing the influence of random noise.

Figure 52:
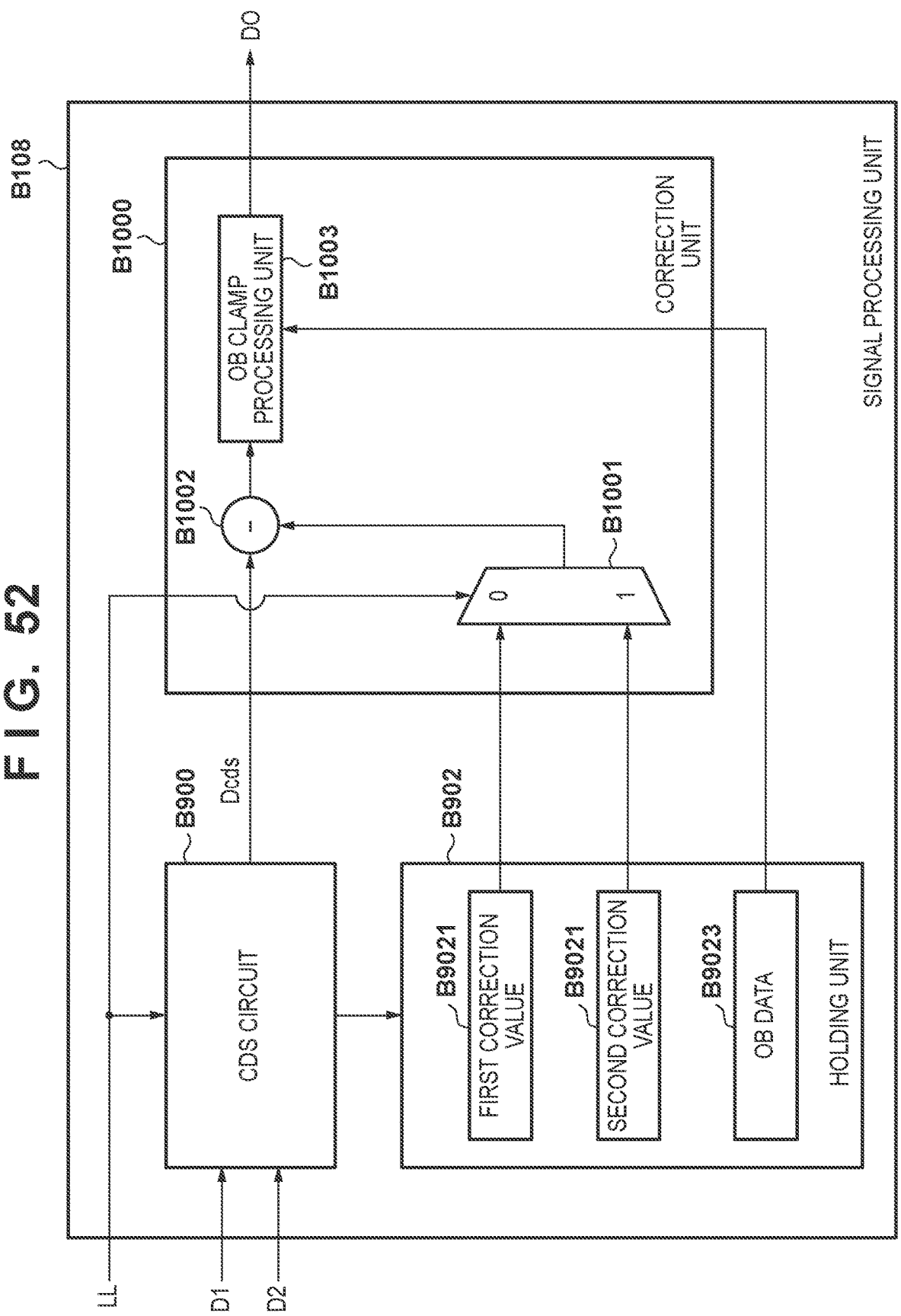
FIG. 52 is a view exemplarily showing the arrangement of a signal processing unit in the fourth embodiment of the third disclosure.

With reference to FIG. 52, the arrangement and operation of a photoelectric conversion apparatus B100 according to the fourth embodiment of the third disclosure will be described. Matters not mentioned as the fourth embodiment of the third disclosure can follow the first to third embodiments of the third disclosure. The fourth embodiment of the third disclosure provides an example of the photoelectric conversion apparatus B100 that performs, in addition to correction of vertical shading described above, correction based on signals read out by a readout circuit B105 from a plurality of OB pixels arranged in an OB pixel region B701. In one aspect, the vertical shading described in the first to third embodiments of the third disclosure occurs in A/D conversion. Further, correction based on signals read out from the plurality of OB pixels can be understood as correction of noise components (for example, vertical shading, horizontal shading, fixed pattern noise, and the like) generated in a pixel array B101. Each reference pixel in reference pixel regions B703 and B704 outputs a fixed value or a predetermined voltage to a column signal line B110. On the other hand, each OB pixel in the OB pixel region B701 outputs a signal or voltage corresponding to its characteristics to the column signal line B110. That is, the signals or voltages output from the plurality of OB pixels in the OB pixel region B701 to the column signal lines B110 have variations reflecting the variations in characteristics among the plurality of OB pixels.

FIG. 52 exemplarily shows the arrangement of a signal processing unit B108 of the fourth embodiment of the third disclosure. The signal processing unit B108 can perform, in addition to shading correction, by a subtractor B1002, on a signal Dcds output from a CDS circuit B900, correction based on signals read out by the readout circuit B105 from the plurality of OB pixels arranged in the OB pixel region B701. A correction unit B1000 can include, for example, an OB clamp processing unit B1003 in addition to a selection unit B1001 and the subtractor B1002 for correcting the signal Dcds based on a correction value generated using a plurality of reference pixels in the reference pixel regions B703 and B704. The OB clamp processing unit B1003 can be, for example, arranged so as to process the signal output from the subtractor B1002, but may be arranged between the CDS circuit B900 and the subtractor B1002. A holding unit B902 can include a third holding region B9023 for holding OB data to be supplied to the OB clamp processing unit B1003. The OB data can be, for example, data read out from the plurality of OB pixels in the OB pixel region B701 by the readout circuit B105 and having undergone a CDS process by the CDS circuit B900, or data obtained by further processing the CDS-processed data. The OB clamp processing unit B1003 performs an OB clamp process on the pixel signal output from the subtractor B1002 based on the data supplied from the third holding region B9023 in accordance with the position of a pixel B102 related to the signal Dcds (pixel signal), and outputs the result as a pixel signal DO.

Figure 53:
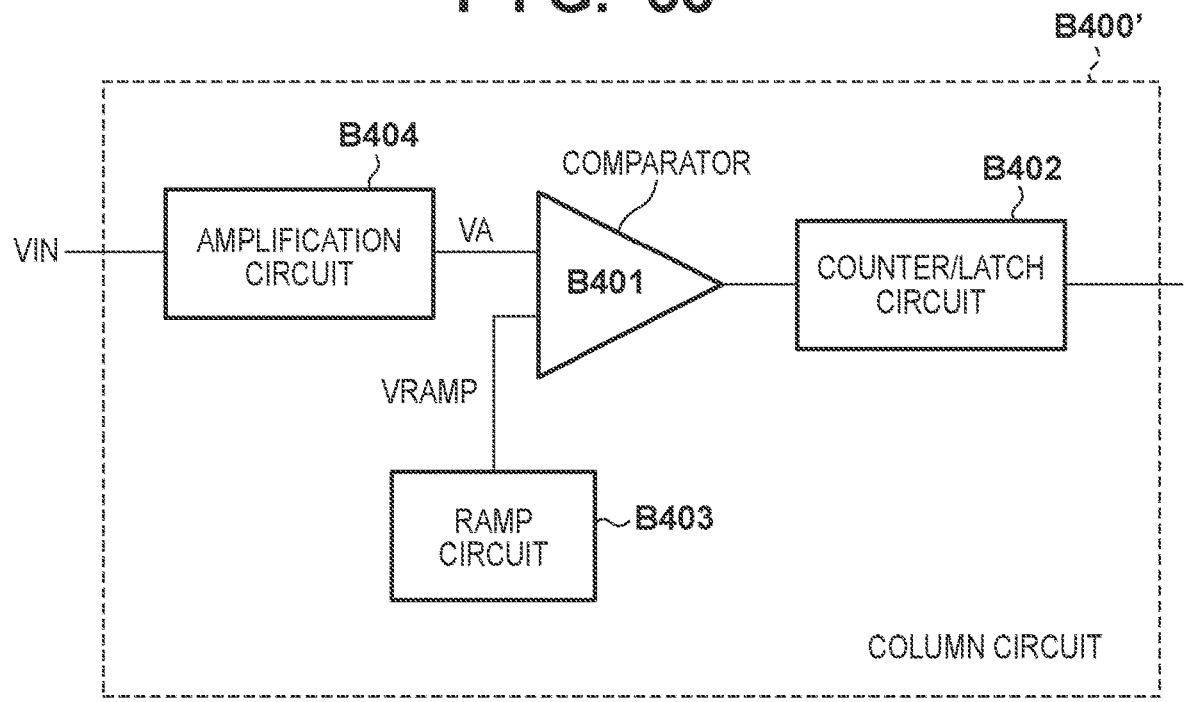
FIG. 53 is a view exemplarily showing the arrangement of a column circuit in the fifth embodiment of the third disclosure.

With reference to FIGS. 53 to 55B, a photoelectric conversion apparatus B100 according to the fifth embodiment of the third disclosure will be described below. Matters not mentioned as the fifth embodiment of the third disclosure can follow the first to fourth embodiments of the third disclosure. FIG. 53 shows an arrangement example of one column circuit B400' of a plurality of column circuits 400' of a readout circuit B105 in the photoelectric conversion apparatus B100 according to the fifth embodiment of the third disclosure. In the fifth embodiment of the third disclosure, the column circuit B400 in the first embodiment of the third disclosure is replaced with the column circuit B400'. The column circuit B400' includes an amplification circuit B404 that amplifies a signal VIN supplied from a pixel array B101 via a column signal line B110. An output VA of the amplification circuit B404 is supplied to a comparator B401. Such an arrangement is advantageous in expansion of the dynamic range and improvement of the S/N ratio.

Figure 54:
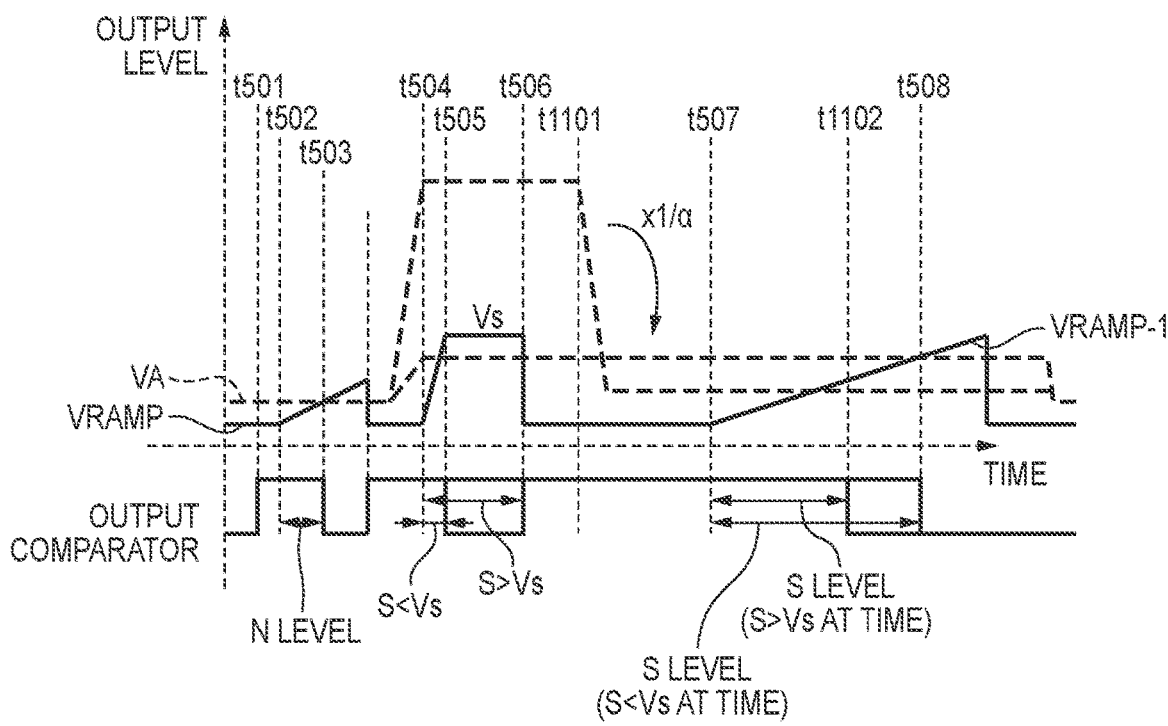
FIG. 54 is a view exemplarily showing the operation of the column circuit in the fifth embodiment of the third disclosure.

FIG. 54 exemplarily shows the operation of each column circuit B400' in the readout circuit B105 in the fifth embodiment of the third disclosure. In FIG. 54, the abscissa exemplarily represents time, the ordinate in the upper stage exemplarily represents the level of the reference signal and the level of the signal from the pixel array, and the ordinate in the lower stage exemplarily represents the output of the comparator B401. With reference to FIG. 54, an example of changing the gain of the amplification circuit B404 in accordance with the level of the signal VIN from the pixel array B101 will be described. An operation of reading out a noise level and an operation of determining an optical signal level are similar to those in the period from time t501 to time t506 in FIG. 45, so that a description thereof will be omitted. Note that in the period from time t501 to time t506, the gain of the amplification circuit B404 is set to a first gain.

If the optical signal level is smaller than a determination level Vs (S<Vs), A/D conversion is performed while keeping the gain of the amplification circuit B404 at the first gain. That is, as in the noise level readout period, A/D conversion of the optical signal level is performed from time t507 while a ramp circuit B403 supplies a first reference signal VRAMP-1 to the comparator B401. With this, in the example shown in FIG. 54, a count value is obtained in the period from time t507 to time t508. On the other hand, if the optical signal level is larger than the determination level Vs (S>Vs), the gain of the amplification circuit B404 is changed from the first gain to a second gain at time t1101, and then A/D conversion of the optical signal level is performed using the first reference signal VRAMP-1. With this, in the example shown in FIG. 54, a count value can be obtained in the period from time t507 to time t1102. With this, it is possible to implement expansion of the dynamic range and improvement of the S/N ratio.

As has been described above, in the fifth embodiment of the third disclosure, readout of the noise level and readout of the optical signal level are performed while performing A/D conversion using the reference signal having the same change rate. However, in the fifth embodiment of the third disclosure, the amplification circuit B404 reads out the noise level with the first gain, and reads out the optical signal level with the second gain. Therefore, even if a CDS circuit B900 performs a CDS process using the noise level and the optical signal level, the difference between the gains of the amplification circuit B404 (for example, the difference between the capacitance values concerning the gains) can cause an offset error. The fifth embodiment of the third disclosure provides a function of removing or reducing an offset error that can occur, in the configuration in which the amplification circuit B404 amplifies the signal from the pixel array B101 with the gain selected from a plurality of gains, when amplifying the optical signal level and the noise level with different gains.

Like the photoelectric conversion apparatus B100 according to the first embodiment of the third disclosure, the photoelectric conversion apparatus B100 according to the fifth embodiment of the third disclosure executes a calibration operation for generating a correction value used to correct vertical shading, and an image capturing operation for generating an image by photoelectric conversion. In the calibration operation, the readout circuit B105 reads out signals from the reference pixels in reference pixel regions B703 and B704, and a signal processing unit B108 processes the signals. Thus, the correction value can be generated.

Figure 55A:
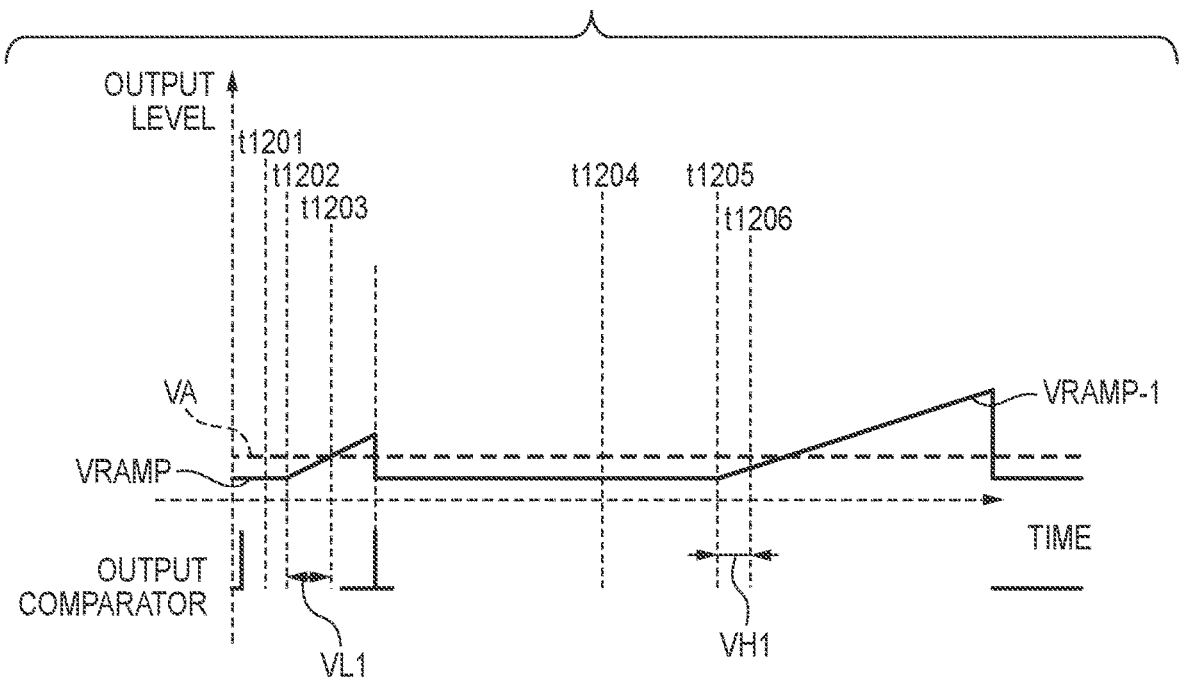
FIGS. 55A and 55B are views exemplarily showing an operation of reading out a signal from a reference pixel region in a calibration operation according to the fifth embodiment of the third disclosure.

FIG. 55A exemplarily shows an operation of reading out a signal from the reference pixel in the first reference pixel region B703 in the calibration operation. First, an operation of A/D-converting a predetermined voltage (here, a predetermined voltage VL1 for the sake of descriptive convenience) by the column circuit B400 of the readout circuit B105 is performed. More specifically, the operation of the comparator B401 is started at time t1201. At time t1202, the count of a counter/latch circuit B402 is reset, and the first reference signal VRAMP-1, which changes at the first change rate, is supplied from the ramp circuit B403 to the comparator B401. The amplification circuit B404 outputs the voltage obtained by amplifying the predetermined voltage VL1 with the first gain, and an A/D conversion unit (B401, B402, and B403) A/D-converts the amplified voltage. By performing a count operation in the period (time t1202 to time t1203) from the reset of the count of the counter/latch circuit B402 to the inversion of the output of the comparator B401, the amplification operation and A/D conversion of the predetermined voltage VL1 are performed.

Then, the amplification operation and A/D conversion of a predetermined voltage (here, a predetermined voltage VH1 for the sake of descriptive convenience) are performed. Here, the predetermined voltage VH1 is amplified with the first gain by the amplification circuit B404 (time t1204), and then A/D conversion of the amplified voltage is performed. By performing the count operation in the period from time t1205 to time t1206, the amplification operation and A/D conversion of the predetermined voltage VH1 are performed.

A first digital signal D1 obtained by reading out the predetermined voltage VL1 as described above and a second digital signal D2 obtained by reading out the predetermined voltage VH1 are supplied to the CDS circuit B900 of the signal processing unit B108 exemplarily shown in FIG. 49. In the CDS circuit B900, the first correction value used to correct the offset error is generated by the CDS process, and stored in a first holding region B9021 of a holding unit B902.

Figure 55B:
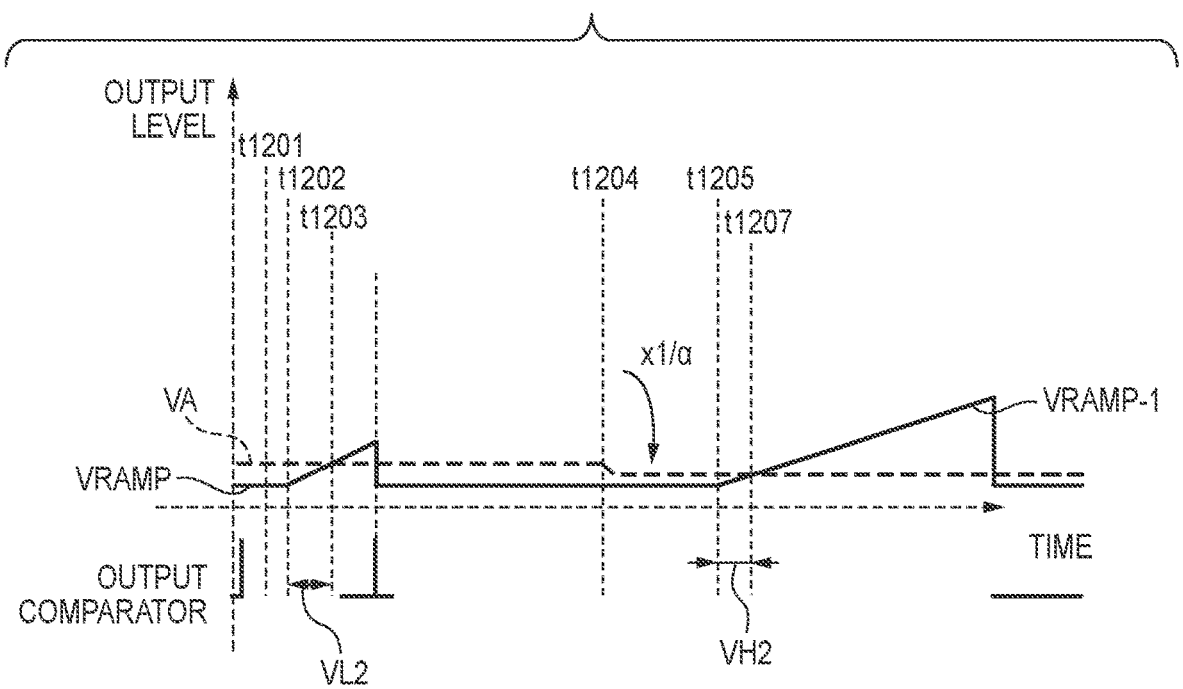

FIG. 55B exemplarily shows an operation of reading out a signal from the reference pixel in the second reference pixel region B704 in the calibration operation. First, an operation of A/D-converting a predetermined voltage (here, a predetermined voltage VL2 for the sake of descriptive convenience) by the column circuit B400 of the readout circuit B105 is performed. More specifically, the operation of the comparator B401 is started at time t1201. At time t1202, the count of the counter/latch circuit B402 is reset, and the first reference signal VRAMP-1, which changes at the first change rate, is supplied from the ramp circuit B403 to the comparator B401. The amplification circuit B404 outputs the voltage obtained by amplifying the predetermined voltage VL2 with the first gain, and the A/D conversion unit (B401, B402, and B403) A/D-converts the amplified voltage. By performing the count operation in the period (time t1202 to time t1203) from the reset of the count of the counter/latch circuit B402 to the inversion of the output of the comparator B401, the amplification operation and A/D conversion of the predetermined voltage VL2 are performed.

Then, the amplification operation and A/D conversion of a predetermined voltage (here, a predetermined voltage VH2 for the sake of descriptive convenience) are performed. Here, the predetermined voltage VH2 is amplified with the second gain by the amplification circuit B404 (time t1204), and then A/D conversion of the amplified voltage is performed. By performing the count operation in the period from time t1205 to time t1207, the amplification operation and A/D conversion of the predetermined voltage VH2 are performed.

The first digital signal D1 obtained by reading out the predetermined voltage VL2 as described above and the second digital signal D2 obtained by reading out the predetermined voltage VH2 are supplied to the CDS circuit B900 of the signal processing unit B108 exemplarily shown in FIG. 49. In the CDS circuit B900, the second correction value used to correct the offset error is generated by the CDS process, and stored in a second holding region B9022 of the holding unit B902.

In the image capturing operation, a correction unit B1000 of the signal processing unit B108 corrects, using the first correction value or the second correction value provided from the holding unit B902, the signal output from the CDS circuit B900. In the image capturing operation, the CDS circuit B900 is provided with a pair of digital signals read out from the effective pixel or OB pixel via the column signal line B110 by the readout circuit B105 and stored in a memory unit B106, and luminance determination information LL. The CDS circuit B900 supplies, to the correction unit B1000, a signal Dcds obtained by performing the CDS process on the pair of digital signals, and the signal Dcds is supplied to a subtractor B1002. The holding unit B902 can supply, to a selection unit B1001, the first correction value corresponding to the pair of digital signals among a plurality of first correction values stored in the first holding region B9021. The holding unit B902 can also supply, to the selection unit B1001, the second correction value corresponding to the pair of digital signals among a plurality of second correction values stored in the second holding region B9022. If the luminance determination information LL corresponding to the pair of digital signals is 0, the selection unit B1001 supplies, to the subtractor B1002, the first correction value supplied from the first holding region B9021. If the luminance determination information LL is 1, the selection unit B1001 supplies, to the subtractor B1002, the second correction value supplied from the second holding region B9022. The correction unit B1000 performs calculation of subtracting, from the signal Dcds supplied from the CDS circuit B900, the first or second correction value supplied from the selection unit B1001, and outputs the result as a pixel signal DO.

Note that in the fifth embodiment of the third disclosure, the column circuit B400' includes the A/D converter. However, the column circuit B400' may output the signal output from the amplification circuit B404 without performing A/D conversion.

Figure 56:
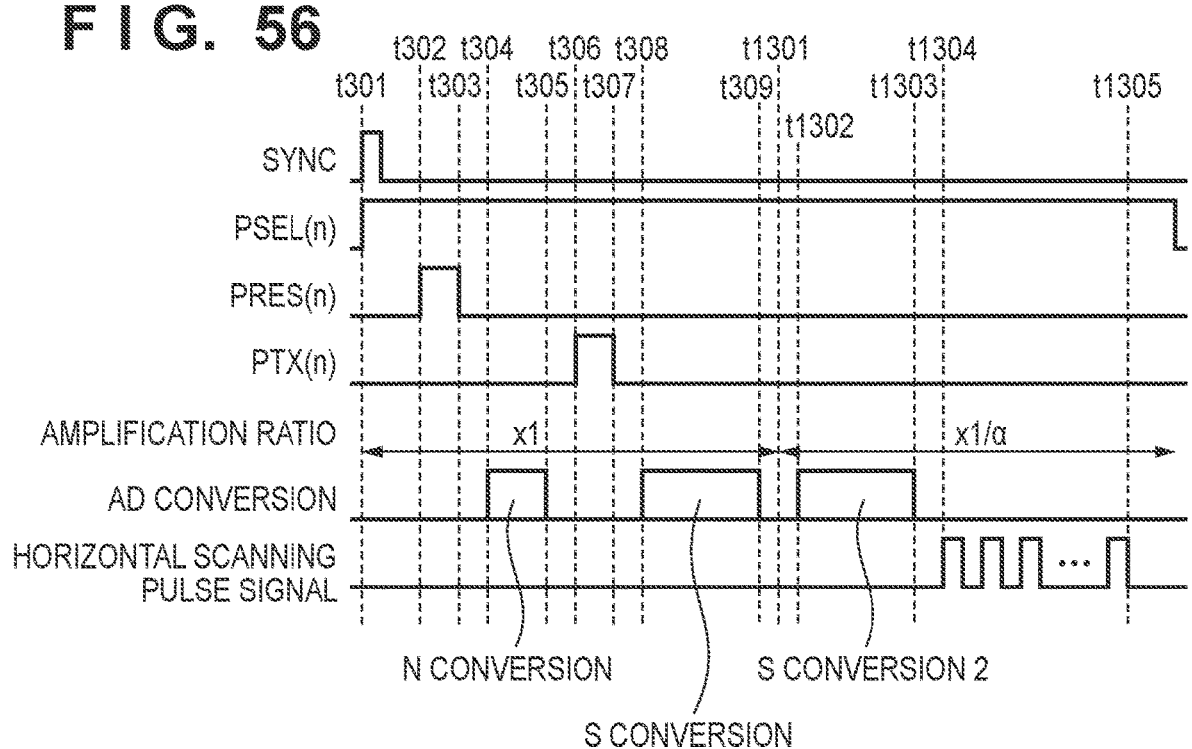
FIG. 56 is a view exemplarily showing the operation of a photoelectric conversion apparatus according to the sixth embodiment of the third disclosure.

With reference to FIG. 56, a photoelectric conversion apparatus B100 according to the sixth embodiment of the third disclosure will be described below. The photoelectric conversion apparatus B100 according to the sixth embodiment of the third disclosure can have an arrangement similar to that of the photoelectric conversion apparatus B100 according to the fifth embodiment of the third disclosure. Matters not mentioned as the sixth embodiment of the third disclosure can follow the fifth embodiment of the third disclosure. In the sixth embodiment of the third disclosure, in order to expand the dynamic range, optical signal levels are read out while time-sequentially switching the gain of an amplification circuit B404.

FIG. 56 exemplarily shows the operation of one column circuit B400' in a readout circuit B105 in the sixth embodiment of the third disclosure. Here, the operation of reading out signals from a pixel B102 in the jth row by a vertical scanning unit B103 is representatively shown. Note that each signal shown in FIG. 56 is a high-active signal. The operation of reading out the noise level and the optical signal level with the same gain is common to the operation in the period from time t301 to time t309 in FIG. 43. In FIG. 56, in the period from time t301 to time t309, the gain of the amplification circuit A404 is set at the first gain, and this is exemplarily shown as "×1"

At time t1301, the gain of the amplification circuit B404 is changed from the first gain (for example, ×1) to the second gain (for example, ×1/α) different from the first gain. Here, in order to change the gain of the amplification circuit B404, the feedback capacitance in the amplification circuit is changed. However, another configuration may also be used.

In the period from time t1302 to time t1303, the optical signal level output to a column signal line B110 is multiplied by 1/α by the amplification circuit B404, and then converted into a digital signal by the A/D conversion unit (B401, B402, and B403). This operation is referred to as S conversion 2. In this manner, N conversion, S conversion, and S conversion 2 are performed, and each result is stored in a memory unit B106. Here, let N be the digital signal obtained by N conversion, S be the digital signal obtained by S conversion, and S2 be the digital signal obtained by S conversion 2.

In the period from time t1304 to time t1305, signals of the pixels B102 (the signal of each pixel is composed of N, S, and S2) for one row stored in the memory unit B106 can be sequentially selected by a horizontal scanning unit B107, and supplied to a signal processing unit B108. By performing the horizontal scanning until the last column, readout of signals (N, S, S2) of the pixels B102 for one row arranged in the readout target row is completed. The signal processing unit B108 includes a CDS circuit B900 that performs a CDS process of generating a pixel signal by subtracting the noise level from the optical signal level. The CDS circuit B900 outputs a pixel signal Dcds having undergone the CDS process.

The CDS circuit B900 of the signal processing unit B108 reduces the fixed pattern noise by performing a process of subtracting N from S and a process of subtracting N from S2. The dynamic range can be expanded using the signal obtained by subtracting N from S and the signal obtained by subtracting N from S2. However, since S2 and N are signals read out with gains different from each other, even if the process of subtracting N from S2 is performed, an offset error can remain. This offset error can appear as vertical stripes in an image output from the photoelectric conversion apparatus B100.

The correction value for correcting the offset error is acquired by a calibration operation similar to that in the fifth embodiment of the third disclosure, and stored in a holding unit B902. In an image capturing mode, the signal obtained by subtracting N from S2 by the CDS circuit B900 can be corrected based on the correction value.

Figure 57:
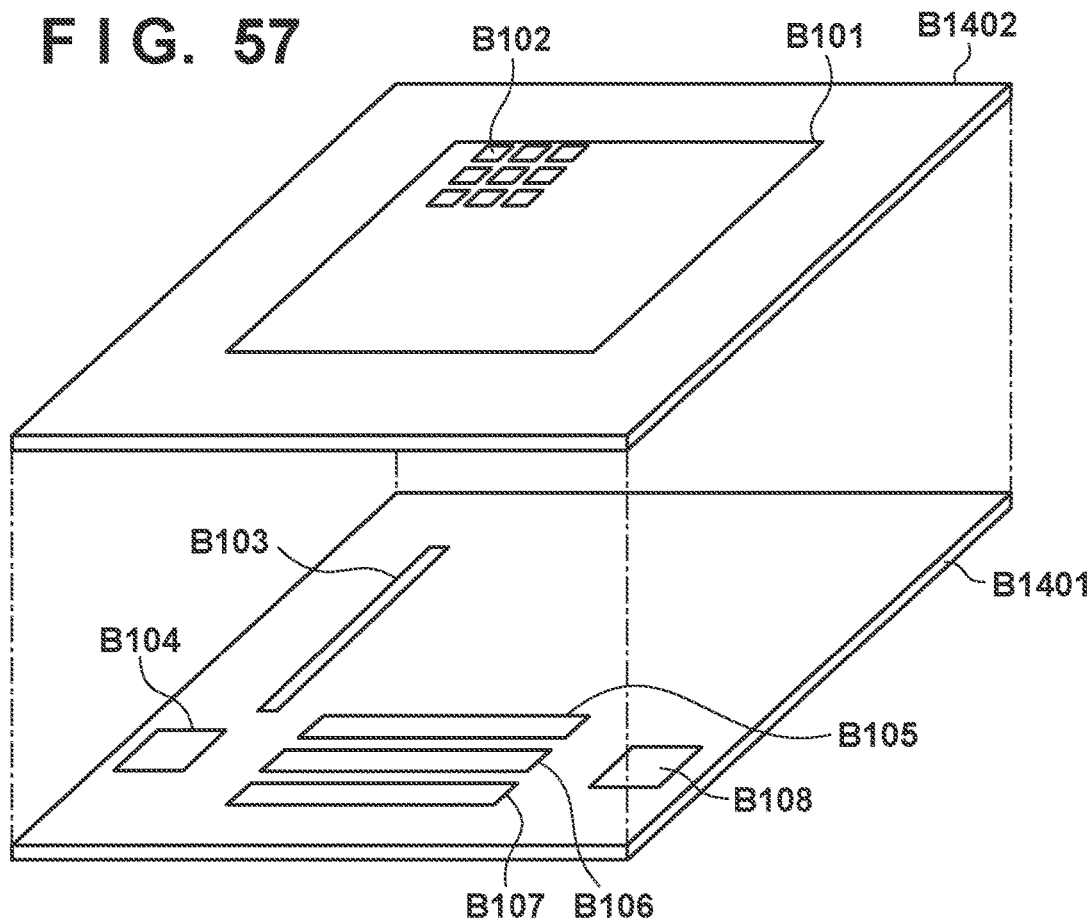
FIG. 57 is a view exemplarily showing the structure of the photoelectric conversion apparatus of the third disclosure.

FIG. 57 shows an example of the structure of the photoelectric conversion apparatus B100 exemplarily described through the first to sixth embodiments of the third disclosure. The photoelectric conversion apparatus B100 may include a first substrate B1401 and a second substrate B1402. Each of the first substrate B1401 and the second substrate B1402 can be formed by processing, for example, a semiconductor substrate such as a silicon substrate. On the first substrate B1401, for example, the signal processing unit B108, the vertical scanning unit B103, a control unit B104, the readout circuit B105, the memory unit B106, the horizontal scanning unit B107, and the like can be arranged. On the second substrate B1402, for example, a pixel array B101 including an OB pixel region B701, an effective pixel region B702, and a reference pixel region B703 can be arranged. As exemplarily shown in FIG. 57, at least a part of the first substrate B1401 and at least a part of the second substrate B1402 can be stacked. With the arrangement as described above, when manufacturing the photoelectric conversion apparatus B100, it is possible to apply a process suitable for each of an analog portion including the pixel array B101 and a logic portion including the signal processing unit B108.

FIG. 25 exemplarily shows the arrangement of an image capturing apparatus 1500 incorporating the photoelectric conversion apparatus B100. The image capturing apparatus 1500 can include an image capturing unit 1501, a signal correction unit 1502, a CPU 1503, an external input unit 1504, an optical system 1505, a video display unit 1506, a recording unit 1507, and a drive system 1508. In an example, the image capturing unit 1501 is a functional block which includes the pixel array B101, the vertical scanning unit B103, the control unit B104, the readout circuit B105, the memory unit B106, and the horizontal scanning unit B107. Such the image capturing unit 1501 may be understood as a photoelectric conversion apparatus. Alternatively, the image capturing unit 1501 may be the photoelectric conversion apparatus B100 including the signal processing unit B108 described above. In an example, the signal correction unit 1502 can include the signal processing unit B108 described above.

In the pixel array B101 of the image capturing unit 1501, an optical image is formed by the optical system 1505. The image capturing unit 1501 outputs an image signal corresponding to the optical image by photoelectric conversion. The signal correction unit 1502 corrects the image signal output from the image capturing unit 1501, and outputs the corrected image signal to the video display unit 1506 and/or the recording unit 1507. The CPU 1503 controls the respective components in the image capturing unit 1500. The drive system 1508 can, for example, drive the focusing lens of the optical system 1505 and drive the aperture. The external input unit 1504 can include various kinds of buttons and the like used by a user to input an image capturing condition and perform a shutter operation. The video display unit 1506 may be a touch panel. In this case, the video display unit 1506 can function as the external input unit 1504 (a part thereof).

The present invention can also be implemented by executing the following process. That is, software (program) for implementing the above-described functions may be supplied to the system or apparatus via a network or various kinds of storage media. One or more processors (for example, a CPU and an MPU) in the computer of the system or apparatus can read out and execute the software (program). Alternatively, the above-described function can also be implemented by a circuit (for example, ASIC) having a fixed function, or a function definable circuit (for example, FPGA).

The third disclosure includes the disclosure of the invention described below.

(Item 1)
A photoelectric conversion apparatus comprising
a pixel array including a plurality of effective pixels,
a readout circuit configured to read out a signal of the pixel array, and
a signal processing unit configured to generate a pixel signal by performing correlated double sampling on signals read out by the readout circuit from an effective pixel selected from the plurality of effective pixels, and perform shading correction on the pixel signal,
wherein
the readout circuit has a function of reading out a signal of the pixel array with a first gain, and a function of reading out a signal of the pixel array with a second gain different from the first gain,
the readout circuit reads out a noise level with the first gain and reads out an optical signal level with the first gain or the second gain from an effective pixel selected from the plurality of effective pixels for the correlated double sampling, and
in the shading correction, a pixel signal of an effective pixel from which an optical signal level has been read out with the first gain is corrected based on a first correction value, and a pixel signal of an effective pixel from which an optical signal level has been read out with the second gain is corrected based on a second correction value.

(Item 2)
The photoelectric conversion apparatus according to Item 1, further comprising
a first holding unit configured to hold a plurality of first correction values respectively corresponding to a plurality of rows of the pixel array, and
a second holding unit configured to hold a plurality of second correction values respectively corresponding to the plurality of rows, wherein
the first correction value used in the shading correction is a first correction value obtained from the plurality of first correction values, and the second correction value used in the shading correction is a second correction value obtained from the plurality of second correction values.

(Item 3)
The photoelectric conversion apparatus according to Item 1 or 2, wherein
when reading out an optical signal level from a selected effective pixel, the readout circuit selects the first gain or the second gain in accordance with the optical signal level.

(Item 4)
The photoelectric conversion apparatus according to any one of Items 1 to 3, wherein
the readout circuit includes an A/D converter, and
the readout circuit performs A/D conversion using a first reference signal, which changes at a first change rate, when reading out a signal of the pixel array with the first gain, and performs A/D conversion using a second reference signal, which changes at a second change rate larger than the first change rate, when reading out a signal of the pixel array with the second gain.

(Item 5)
The photoelectric conversion apparatus according to Item 2, wherein
the pixel array includes a reference pixel region in which a plurality of reference pixels, each of which outputs a noise level, are arranged so as to form at least one column,
each of the plurality of first correction values is generated by performing correlated double sampling, by the signal processing unit, on a signal obtained by reading out, by the readout circuit, a noise level with the first gain in a first period from a reference pixel in a selected row among the plurality of reference pixels, and a signal obtained by reading out a noise level with the first gain in a second period, and
each of the plurality of second correction values is generated by performing correlated double sampling, by the signal processing unit, on a signal obtained by reading out, by the readout circuit, a noise level with the first gain in the first period from a reference pixel in the selected row among the plurality of reference pixels, and a signal obtained by reading out a noise level with the second gain in the second period.

(Item 6)
The photoelectric conversion apparatus according to Item 2, wherein
the pixel array includes a first reference pixel region in which a plurality of reference pixels, each of which outputs a noise level, are arranged so as to form at least one column, and a second reference pixel region in which a plurality of reference pixels, each of which outputs a noise level, are arranged so as to form at least one column,
each of the plurality of first correction values is generated by performing correlated double sampling, by the signal processing unit, on a signal obtained by reading out, by the readout circuit, a noise level with the first gain in a first period from a reference pixel in a selected row among the plurality of reference pixels in the first reference pixel region, and a signal obtained by reading out a noise level with the first gain in a second period, and each of the plurality of second correction values is generated by performing correlated double sampling, by the signal processing unit, on a signal obtained by reading out, by the readout circuit, a noise level with the first gain in the first period from a reference pixel in the selected row among the plurality of reference pixels in the second reference pixel region, and a signal obtained by reading out a noise level with the second gain in the second period, (Item 7)

The photoelectric conversion apparatus according to Item 2, wherein the pixel array includes a reference pixel region in which a plurality of reference pixels, each of which outputs a noise level, are arranged so as to form at least one column, each of the plurality of first correction values is generated by performing correlated double sampling, by the signal processing unit, on a signal obtained by reading out, by the readout circuit, a noise level with the first gain in a first period from a reference pixel in a selected row among the plurality of reference pixels, and a signal obtained by reading out a noise level with the first gain in a second period, and each of the plurality of second correction values is generated by performing correlated double sampling, by the signal processing unit, on a signal obtained by reading out, by the readout circuit, a noise level with the first gain in a third period from the reference pixel in the selected row among the plurality of reference pixels, and a signal obtained by reading out a noise level with the second gain in a fourth period, and the first period, the second period, the third period, and the fourth period are periods different from each other.

(Item 8)

The photoelectric conversion apparatus according to any one of Items 1 to 7, wherein the readout circuit includes an A/D converter, and the readout circuit performs A/D conversion using a first reference signal, which changes at a first change rate, when reading out a signal of the pixel array with the first gain, and performs A/D conversion using a second reference signal, which changes at a second change rate larger than the first change rate, when reading out a signal of the pixel array with the second gain.

(Item 9)

The photoelectric conversion apparatus according to any one of Items 1 to 7, wherein the readout circuit includes an amplification circuit configured to amplify a signal output from the pixel array, and an A/D converter configured to A/D-convert a signal output from the amplification circuit, and a gain of the amplification circuit used when reading out a signal of the pixel array with the first gain and a gain of the amplification circuit used when reading out a signal of the pixel array with the second gain are different from each other.

(Item 10)

The photoelectric conversion apparatus according to any one of Items 1 to 9, wherein the pixel array includes a plurality of OB pixels each of which includes a photoelectric conversion element shielded from light, and the signal processing unit performs correction based on signals read out from the plurality of OB pixels by the readout circuit, in addition to performing the shading correction on the pixel signal.

(Item 11)

A photoelectric conversion apparatus comprising a pixel array including a plurality of effective pixels and a reference pixel, a readout circuit configured to read out a signal of the pixel array as a digital signal, and a signal processing unit configured to generate a pixel signal by performing correlated double sampling on signals read out by the readout circuit from an effective pixel selected from the plurality of effective pixels, and perform shading correction on the pixel signal, wherein the readout circuit has a function of reading out a signal of the pixel array with a first gain, and a function of reading out a signal of the pixel array with a second gain different from the first gain, the readout circuit reads out a noise level with the first gain and reads out an optical signal level with the first gain or the second gain from an effective pixel selected from the plurality of effective pixels for the correlated double sampling, in the shading correction, a pixel signal of an effective pixel from which an optical signal level has been read out with the second gain is corrected based on a correction value, and the correction value is generated by performing correlated double sampling, by the signal processing unit, on a signal obtained by reading out a noise level with the first gain in a first period from the reference pixel by the readout circuit, and a signal obtained by reading out a noise level with the second gain in a second period.

(Item 12)

A photoelectric conversion system that comprises a photoelectric conversion apparatus and a signal processing unit, wherein the photoelectric conversion apparatus comprises a pixel array including a plurality of effective pixels, and a readout circuit configured to read out a signal of the pixel array as a digital signal, the signal processing unit generates a pixel signal by performing correlated double sampling on signals read out by the readout circuit from an effective pixel selected from the plurality of effective pixels, and performs shading correction on the pixel signal, the readout circuit has a function of reading out a signal of the pixel array with a first gain, and a function of reading out a signal of the pixel array with a second gain different from the first gain, the readout circuit reads out a noise level with the first gain and reads out an optical signal level with the first gain or the second gain from an effective pixel selected from the plurality of effective pixels for the correlated double sampling, and in the shading correction, a pixel signal of an effective pixel from which an optical signal level has been read out with the first gain is corrected based on a first correction value, and a pixel signal of an effective pixel from which an optical signal level has been read out with the second gain is corrected based on a second correction value.

(Item 13)

A photoelectric conversion system that comprises a photoelectric conversion apparatus and a signal processing unit, wherein the photoelectric conversion apparatus comprises a pixel array including a plurality of effective pixels and a reference pixel, and a readout circuit configured to read out a signal of the pixel array as a digital signal, the signal processing unit generates a pixel signal by performing correlated double sampling on signals read out by the readout circuit from an effective pixel selected from the plurality of effective pixels, and performs shading correction on the pixel signal, the readout circuit has a function of reading out a signal of the pixel array with a first gain, and a function of reading out a signal of the pixel array with a second gain different from the first gain, the readout circuit reads out a noise level with the first gain and reads out an optical signal level with the first gain or the second gain from an effective pixel selected from the plurality of effective pixels for the correlated double sampling, in the shading correction, a pixel signal of an effective pixel from which an optical signal level has been read out with the second gain is corrected based on a correction value, and the correction value is generated by performing correlated double sampling, by the signal processing unit, on a signal obtained by reading out a noise level with the first gain in a first period from the reference pixel by the readout circuit, and a signal obtained by reading out a noise level with the second gain in the second period.

(Item 14)

A photoelectric conversion method comprising a step of reading out, as a digital signal, a noise level of an effective pixel in a pixel array with a first gain, a step of reading out, as a digital signal, an optical signal level of the effective pixel with the first gain or a second gain different from the first gain, a step of generating a pixel signal by performing correlated double sampling on the digital signal of the noise level and the digital signal of the optical signal level, and a step of performing shading correction on the pixel signal, wherein in the shading correction, a pixel signal of an effective pixel from which an optical signal level has been read out with the first gain is corrected based on a first correction value, and a pixel signal of an effective pixel from which an optical signal level has been read out with the second gain is corrected based on a second correction value.

(Item 15)

A photoelectric conversion method comprising a step of reading out, as a digital signal, a noise level of an effective pixel in a pixel array with a first gain, a step of reading out, as a digital signal, an optical signal level of the effective pixel with the first gain or a second gain different from the first gain, a step of generating a pixel signal by performing correlated double sampling on the digital signal of the noise level and the digital signal of the optical signal level, and a step of performing shading correction on the pixel signal, wherein in the shading correction, a pixel signal of an effective pixel from which an optical signal level has been read out with the second gain is corrected based on a correction value, and the correction value is generated by performing correlated double sampling on a signal obtained by reading out a noise level with the first gain in a first period from a reference pixel in the pixel array, and a signal obtained by reading out a noise level with the second gain in a second period.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-140207, filed Sep. 2, 2022, which is hereby incorporated by reference herein in its entirety.

What is claimed is:

1. A photoelectric conversion apparatus comprising
a pixel array including a plurality of pixel units arranged so as to form a plurality of rows and a plurality of columns, and a plurality of column signal lines; a readout circuit configured to read out signals from the pixel array via the plurality of column signal lines; a vertical scanning unit; a holding unit; and a signal processing unit configured to process signals read out by the readout circuit, wherein each pixel unit includes a predetermined number of photoelectric conversion elements, a floating diffusion, and transfer transistors of the predetermined number arranged so as to be capable of connecting the predetermined number of photoelectric conversion elements and the floating diffusion, the plurality of columns are divided into a plurality of groups, the holding unit includes one first region and a plurality of second regions, a plurality of first correction values respectively corresponding to the plurality of columns are stored in the first region, each second region is associated with a readout condition for reading out signals from each pixel unit by the readout circuit, and a plurality of second correction values respectively corresponding to the plurality of groups are stored in each second region, the vertical scanning unit selects a readout target photoelectric conversion element from the predetermined number of photoelectric conversion elements in each pixel unit arranged in a readout target row of the plurality of rows, and the signal processing unit performs, on signals read out via the plurality of column signal lines by the readout circuit from the photoelectric conversion elements selected by the vertical scanning unit, first correction based on the plurality of first correction values stored in the first region, and second correction based on the plurality of second correction values stored in the second region, of the plurality of second regions, corresponding to the readout condition for reading out signals from the selected photoelectric conversion element.

2. The apparatus according to claim 1, wherein
the second correction value is generated by interpolating at least two second correction values of the plurality of second correction values held in the second region, of the plurality of second regions, corresponding to the readout condition for reading out signals from the selected photoelectric conversion element.

3. The apparatus according to claim 1, further comprising:
a first correction value generation unit configured to generate the plurality of first correction values to be stored in the first region; and
a second correction value generation unit configured to generate the plurality of second correction values to be stored in each of the plurality of second regions.

4. The apparatus according to claim 3, wherein
the pixel array further includes a plurality of reference pixel units arranged so as to form at least one reference pixel unit row, and each reference pixel unit is configured to output a noise level, and
the second correction value generation unit generates the plurality of second correction values based on noise levels read out via the plurality of column signal lines by the readout circuit from the reference pixel units arranged in the reference pixel unit row, and stores the plurality of generated second correction values in the second region, of the plurality of second regions, corresponding to the readout condition for reading out signals from the selected photoelectric conversion element.

5. The apparatus according to claim 4, wherein
the first correction value generation unit generates the plurality of first correction values based on noise levels read out via the plurality of column signal lines by the readout circuit from the reference pixel units arranged in the reference pixel unit row, and stores the plurality of generated first correction values in the first region.

6. The apparatus according to claim 5, wherein
the second correction value generation unit generates the plurality of second correction values based on noise levels obtained by performing the first correction on noise levels read out via the plurality of column signal lines by the readout circuit from the photoelectric conversion element selected by the vertical scanning unit.

7. The apparatus according to claim 3, wherein
the second correction value generation unit generates the plurality of second correction values based on noise levels read out via the plurality of column signal lines by the readout circuit from the photoelectric conversion element selected by the vertical scanning unit, and stores the plurality of generated second correction values in the second region, of the plurality of second regions, corresponding to the readout condition for reading out signals from the selected photoelectric conversion element.

8. The apparatus according to claim 7, wherein
the first correction value generation unit generates the plurality of first correction values based on noise levels read out via the plurality of column signal lines by the readout circuit from photoelectric conversion element selected by the vertical scanning unit, and stores the plurality of generated first correction values in the first region.

9. The apparatus according to claim 5, wherein
the second correction value generation unit generates the plurality of second correction values based on noise levels obtained by performing the first correction on noise levels read out via the plurality of column signal lines by the readout circuit from the photoelectric conversion element selected by the vertical scanning unit.

10. The apparatus according to claim 1, wherein
the readout condition includes a readout order of signal from the selected photoelectric conversion element in the pixel unit arranged in the selected row.

11. The apparatus according to claim 1, wherein
the plurality of column signal lines are arranged such that at least two column signal lines are assigned to each of the plurality of columns,
the readout circuit includes a plurality of column circuits, and
the readout condition includes a designation of connection of a column signal line selected from the plurality of column signal lines with a column circuit selected from the plurality of column circuits.

12. The apparatus according to claim 1, wherein
the pixel array includes an OB pixel unit including a photoelectric conversion element shielded from light, and
the signal processing unit performs, in addition to the first correction and the second correction, correction based on a signal read out by the readout circuit from the OB pixel unit on signals read out via the plurality of column signal lines by the readout circuit from the photoelectric conversion element selected by the vertical scanning unit.

13. A photoelectric conversion system that comprises a photoelectric conversion apparatus and a signal processing unit,
the photoelectric conversion apparatus comprising a pixel array including a plurality of pixel units arranged so as to form a plurality of rows and a plurality of columns, and a plurality of column signal lines; a readout circuit configured to read out signals via the plurality of column signal lines from the pixel array; and a vertical scanning unit, and
the signal processing unit comprising a holding unit, and a signal processing unit configured to correct signals read out by the readout circuit, wherein
each pixel unit includes a predetermined number of photoelectric conversion elements, a floating diffusion, and transfer transistors of the predetermined number arranged so as to be capable of correcting the predetermined number of photoelectric conversion elements and the floating diffusion,
the plurality of columns are divided into a plurality of groups,
the holding unit includes one first region and a plurality of second regions,
a plurality of first correction values respectively corresponding to the plurality of columns are stored in the first region,
each second region is associated with a readout condition for reading out signals from each pixel unit by the readout circuit, and a plurality of second correction values respectively corresponding to the plurality of groups are stored in each second region,
the vertical scanning unit selects a readout target photoelectric conversion element from the predetermined number of photoelectric conversion elements in each pixel unit arranged in a readout target row of the plurality of rows, and
the signal processing unit performs, on signals read out via the plurality of column signal lines by the readout circuit from the photoelectric conversion elements selected by the vertical scanning unit, first correction based on the plurality of first correction values stored in the first region, and second correction based on the plurality of second correction values stored in the second region, of the plurality of second regions, corresponding to the readout condition for reading out signals from the selected photoelectric conversion element.

14. A photoelectric conversion method comprising:

reading out signals via a plurality of column signal lines from a pixel array including a plurality of pixel units arranged so as to form a plurality of rows and a plurality of columns, and the plurality of column signal lines; and correcting the signals read out from the pixel array, wherein each pixel unit includes a predetermined number of photoelectric conversion elements, a floating diffusion, and transfer transistors of the predetermined number arranged so as to be capable of connecting the predetermined number of photoelectric conversion elements and the floating diffusion, the plurality of columns are divided into a plurality of groups, a holding unit, which is referred to in the correcting, includes one first region and a plurality of second regions, a plurality of first correction values respectively corresponding to the plurality of columns are stored in the first region, each second region is associated with a readout condition for reading out signals from each pixel unit, and a plurality of second correction values respectively corresponding to the plurality of groups are stored in each second region, in the reading out, a readout target photoelectric conversion element is selected from the predetermined number of photoelectric conversion elements in each pixel unit arranged in a readout target row of the plurality of rows, and in the correcting, first correction based on the plurality of first correction values stored in the first region, and second correction based on the plurality of second correction values stored in the second region, of the plurality of second regions, corresponding to the readout condition for reading signals from the selected photoelectric conversion element are performed on signals read out via the plurality of column signal lines from the photoelectric conversion element selected in the reading out.

* * * * *